United States Patent
Huang

(10) Patent No.: US 11,579,414 B2
(45) Date of Patent: *Feb. 14, 2023

(54) PHOTOGRAPHING OPTICAL LENS SYSTEM, IMAGING APPARATUS AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 208 days.

This patent is subject to a terminal disclaimer.

(21) Appl. No.: 17/073,683

(22) Filed: Oct. 19, 2020

(65) Prior Publication Data
US 2021/0033826 A1     Feb. 4, 2021

Related U.S. Application Data

(63) Continuation of application No. 16/116,011, filed on Aug. 29, 2018, now Pat. No. 10,845,576.

(30) Foreign Application Priority Data
Mar. 28, 2018   (TW) .................................. 107110627

(51) Int. Cl.
*G02B 13/00*     (2006.01)
*G02B 9/64*      (2006.01)

(52) U.S. Cl.
CPC ........... *G02B 13/0045* (2013.01); *G02B 9/64* (2013.01)

(58) Field of Classification Search
CPC .............................. G02B 9/64; G02B 13/0045

USPC ........................................................ 359/708
See application file for complete search history.

(56) References Cited

U.S. PATENT DOCUMENTS

| | | |
|---|---|---|
| 2,959,101 A | 11/1960 | Sandback et al. |
| 3,174,396 A | 3/1965 | Ruben |
| 4,037,934 A | 7/1977 | Matsubara |
| 4,059,342 A | 11/1977 | Tojyo |
| 4,099,843 A | 7/1978 | Imai |
| 4,212,515 A | 7/1980 | Itaya |
| 4,322,136 A | 3/1982 | Nagano |
| 4,523,817 A | 6/1985 | Kikuchi |
| 4,624,535 A | 11/1986 | Kurihara et al. |
| 2012/0050892 A1 | 3/2012 | Lai et al. |
| 2016/0306140 A1* | 10/2016 | Chen ..................... G02B 3/04 |

(Continued)

FOREIGN PATENT DOCUMENTS

| | | |
|---|---|---|
| CN | 101403820 A | 4/2009 |
| CN | 101408664 A | 4/2009 |

(Continued)

*Primary Examiner* — James R Greece
(74) *Attorney, Agent, or Firm* — Locke Lord LLP; Tim Tingkang Xia, Esq.

(57) ABSTRACT

A photographing optical lens system includes seven lens elements, the seven lens elements being, in order from an object side to an image side: a first lens element, a second lens element, a third lens element, a fourth lens element, a fifth lens element, a sixth lens element, and a seventh lens element. Each of the seven lens elements has an object-side surface facing toward the object side and an image-side surface facing toward the image side. At least one lens surface of the seven lens elements has at least one inflection point thereon.

32 Claims, 26 Drawing Sheets

(56) References Cited

U.S. PATENT DOCUMENTS

| | | |
|---|---|---|
| 2017/0059833 A1 | 3/2017 | Saito |
| 2017/0131527 A1* | 5/2017 | Aoki |
| 2018/0188493 A1* | 7/2018 | Huang ................. H04N 5/2253 |
| 2018/0239115 A1* | 8/2018 | Hsu .................... G02B 13/0045 |
| 2019/0025558 A1 | 1/2019 | Chen et al. |

FOREIGN PATENT DOCUMENTS

| | | |
|---|---|---|
| JP | 2009169129 A | 7/2009 |
| JP | 2011123304 A | 6/2011 |
| JP | 2012123271 A | 6/2012 |
| JP | 2013156579 A | 8/2013 |
| JP | 2016126086 A | 7/2016 |
| JP | 2017049572 A | 3/2017 |

* cited by examiner

PHOTOGRAPHING OPTICAL LENS SYSTEM, IMAGING APPARATUS AND ELECTRONIC DEVICE

RELATED APPLICATIONS

This application is a Continuation Application of U.S. application Ser. No. 16/116,011, filed on Aug. 29, 2018, now approved and claims priority to Taiwan Application Serial Number 107110627, filed on Mar. 28, 2018, which is incorporated by reference herein in its entirety.

BACKGROUND

Technical Field

The present disclosure relates to a photographing optical lens system and an imaging apparatus, and more particularly, to a photographing optical lens system and an imaging apparatus applicable to electronic devices.

Description of Related Art

With the advancement of semiconductor process technology, performances of electronic photosensitive devices have been improved, and pixels can reach even smaller dimensions. Therefore, optical lens systems with high imaging quality have become indispensable.

With the ever-changing technology, electronic devices equipped with optical lens system have a wider range of applications. Also, the requirements for optical lens systems are more diversified. As the optical lens systems in the past couldn't meet the needs of imaging quality, sensitivity, aperture size, size or angle of view, etc. in a balanced way easily, the present invention provides a photographing optical lens system to meet the requirements.

SUMMARY

According to one aspect of the present disclosure, a photographing optical lens system includes seven lens elements, the seven lens elements being, in order from an object side to an image side: a first lens element, a second lens element, a third lens element, a fourth lens element, a fifth lens element, a sixth lens element, and a seventh lens element, wherein each of the seven lens elements has an object-side surface facing toward the object side and an image-side surface facing toward the image side, at least one lens surface of the seven lens elements has at least one inflection point thereon, an axial distance between an object-side surface of the first lens element and an image surface is TL, an f-number of the photographing optical lens system is Fno, a focal length of the photographing optical lens system is f, a maximum image height of the photographing optical lens system is ImgH, a minimum among Abbe numbers of the seven lens elements is Vmin, and the following conditions are satisfied:

$0.50 < TL*Fno/f < 2.10;$ $0.10 < ImgH/f < 0.47;$ and $10.0 < Vmin < 23.0.$

According to another aspect of the present disclosure, a photographing optical lens system includes seven lens elements, the seven lens elements being, in order from an object side to an image side: a first lens element, a second lens element, a third lens element, a fourth lens element, a fifth lens element, a sixth lens element, and a seventh lens element, wherein each of to the seven lens elements has an object-side surface facing toward the object side and an image-side surface facing toward the image side, the second lens element has positive refractive power, at least one lens surface of the seven lens elements has at least one inflection point thereon, an axial distance between an object-side surface of the first lens element and an image surface is TL, an f-number of the photographing optical lens system is Fno, a focal length of the photographing optical lens system is f, a maximum image height of the photographing optical lens system is ImgH, a minimum among Abbe numbers of the seven lens elements is Vmin, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a focal length of the first lens element is f1, a focal length of the second lens element is f2, and the following conditions are satisfied:

$0.10 < TL*Fno/f < 3.0;$ $0.10 < ImgH/f < 0.53;$ $8.0 < Vmin < 25.0;$ $1.40 < (T45+T56)/(T12+T23+T34) < 40;$ and $|f2/f1| < 0.65.$ According to another aspect of the present disclosure, a photographing optical lens system includes seven lens elements, the seven lens elements being, in order from an object side to an image side: a first lens element, a second lens element, a third lens element, a fourth lens element, a fifth lens element, a sixth lens element, and a seventh lens element, wherein each of the seven lens elements has an object-side surface facing toward the object side and an image-side surface facing toward the image side, at least one lens surface of the seven lens elements has at least one inflection point thereon, an axial distance between an object-side surface of the first lens element and an image surface is TL, an f-number of the photographing optical lens system is Fno, a focal length of the photographing optical lens system is f, a maximum image height of the photographing optical lens system is ImgH, a minimum among Abbe numbers of the seven lens elements is Vmin, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a curvature radius of an object-side surface of the second lens element is R3, a curvature radius of an image-side surface of the second lens element is R4, an axial distance between an image-side surface of the seventh lens element and the image surface is BL, an axial distance between the object-side surface of the first lens element and the image-side surface of the seventh lens element is TD, and the following conditions are satisfied:

$0.10 < TL*Fno/f < 3.0;$ $0.10 < ImgH/f < 0.53;$ $8.0 < Vmin < 25.0;$ $1.40 < (T45+T56)/(T12+T23+T34) < 40;$ $-10.0 < (R3+R4)/(R3-R4) < 1.0;$ and $0.03 < BL/TD < 0.70.$ According to another aspect of the present disclosure, an imaging apparatus includes the aforementioned photographing optical lens system and an image sensor disposed on the image surface of the photographing optical lens system.

According to another aspect of the present disclosure, an electronic device includes at least two imaging apparatuses facing toward the same direction, wherein the at least two imaging apparatuses include:
 a first imaging apparatus; and
 a second imaging apparatus,
 wherein the first imaging apparatus includes:
 a first photographing optical lens system as the aforementioned photographing optical lens system; and
 an image sensor disposed on the image surface of the first photographing optical lens system,
 the second imaging apparatus includes:
 a second photographing optical lens system; and
 an image sensor disposed on an image surface of the second photographing optical lens system,
 wherein the first imaging apparatus has an angle of view between 25 to 60 degrees, the second imaging apparatus has an angle of view between 60 to 150 degrees.

DETAILED DESCRIPTION

Figure 1A:
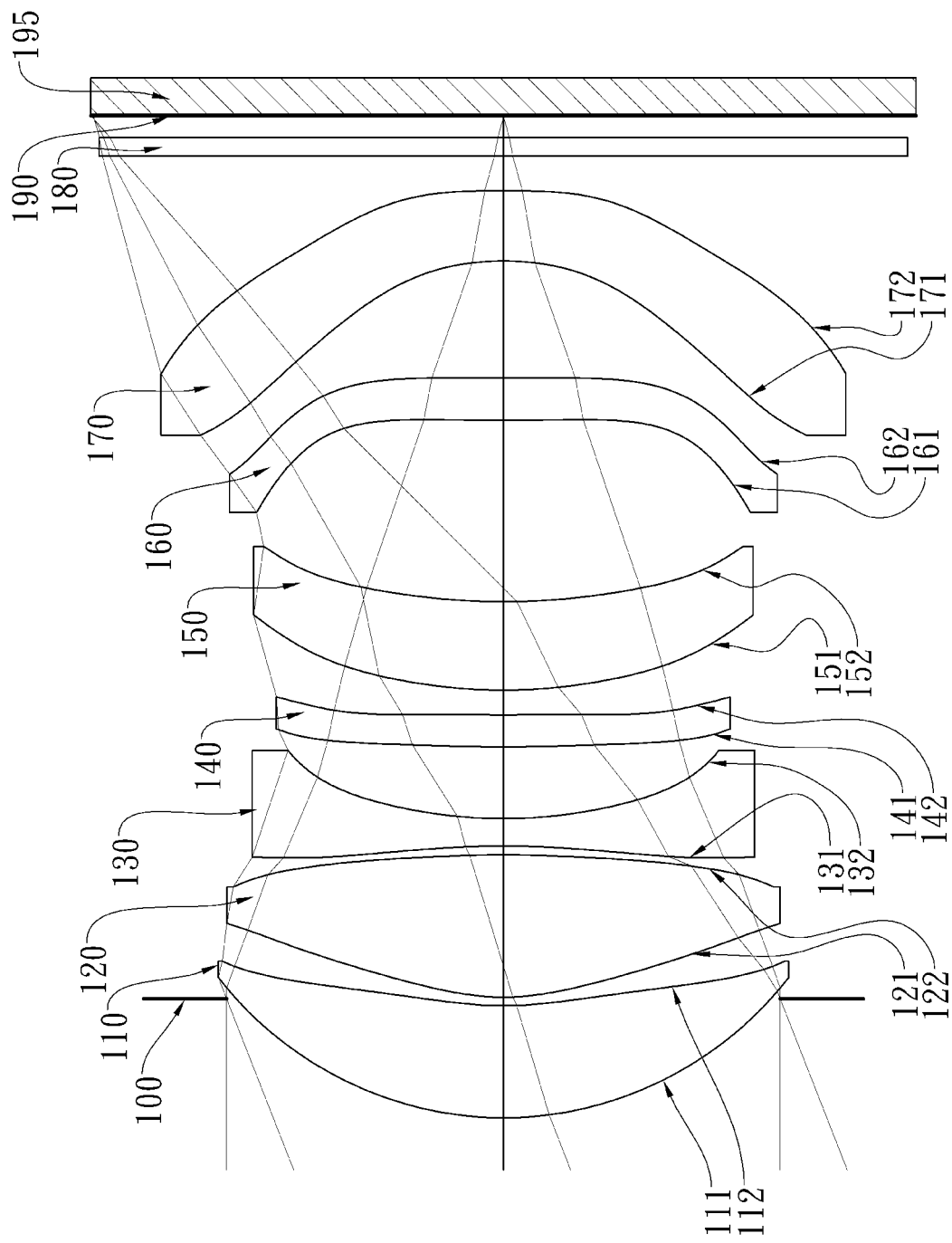
FIG. 1A is a schematic view of an imaging apparatus according to the 1st embodiment of the present disclosure.

The present disclosure provides a photographing optical lens system including seven lens elements, the seven lens elements being, in order from an object side to an image side, a first lens element, a second lens element, a third lens element, a fourth lens element, a fifth lens element, a sixth lens element, and a seventh lens element. Each of the seven lens elements has an object-side surface facing toward the object side and an image-side surface facing toward the image side.

The first lens element may have an object-side surface being convex in a paraxial region thereof and may have an image-side surface being concave in a paraxial region thereof such that optical paths in a tangential direction and a sagittal direction can be balanced in favor of correcting astigmatism of the lens system.

The second lens element may have positive refractive power to provide the main converging capability in the lens system so as to reduce the size of the lens system effectively and meet the requirements of miniaturization. The second lens element may have an object-side surface being convex in a paraxial region thereof to enhance the light retrieving capability on the object side of the lens system for meeting the light retrieving requirements of the lens system with a large aperture.

The third lens element may have negative refractive power to achieve a balance with the second lens element so as to reduce spherical aberrations of the lens system as well as to adjust the focal points of light with different wavelengths to avoid an occurrence of image overlapping.

The sixth lens element may have positive refractive power to balance the distribution of refractive power on the image side of the lens system so as to control the incident angle on an image surface and further increase the image brightness.

The seventh lens element may have negative refractive power so as to favorably reduce a back focal length to achieve miniaturization. The seventh lens element may have an image-side surface being concave in a paraxial region thereof and at least one convex surface in an off-axis region of the image-side surface thereof so as to favorably reduce the back focal length to achieve miniaturization as well as to correct field curvatures and distortions.

At least one lens surface of the seven lens elements has at least one inflection point thereon so as to favorably reduce aberrations in a peripheral region of the lens system while reducing a total track length of the lens system to achieve a good balance between the imaging quality and the size of the lens system. Preferably, at least one lens surface of the sixth lens element and the seventh lens element has at least one inflection point thereon such that aberration corrections in an off-axis region can be enhanced to further flatten the Petzval surface of the lens system.

An axial distance between the object-side surface of the first lens element and the image surface is TL, an f-number of the photographing optical lens system is Fno, and a focal length of the photographing optical lens system is f. When the following condition is satisfied: 0.10<TL*Fno/f<3.0, the light retrieving range of the lens system can be enlarged while reducing the total track length as well as controlling the angle of view of the lens system. Preferably, the following condition can be satisfied: 0.10<TL*Fno/f<2.50. Preferably, the following condition can be satisfied: 0.50<TL*Fno/f<2.10. Preferably, the following condition can be satisfied: 0.50<TL*Fno/f<1.85.

A maximum image height of the photographing optical lens system is ImgH, and the focal length of the photographing optical lens system is f. When the following condition is satisfied: 0.10<ImgH/f<0.53, the photographing range and the angle of view can be favorably controlled so as to improve resolutions in certain parts of images and further achieve better telephoto results. Preferably, the following condition can be satisfied: 0.10<ImgH/f<0.47.

A minimum among Abbe numbers of the seven lens elements is Vmin. When the following condition is satisfied: 8.0<Vmin<25.0, the converging capability of the lens system to light with different wavelengths can be balanced so as to correct chromatism. Preferably, the following condition can be satisfied: 10.0<Vmin<23.0. Preferably, the following condition can be satisfied: 10.0<Vmin<21.0

An Abbe number of a lens element with positive refractive power among the seven lens elements is Vp. When at least one lens element with positive refractive power satisfies the following condition: Vp<25.0, distributions of light scattering capability of the lens system can be effectively controlled so as to favorably achieve various photographing ranges.

A focal length of the first lens element is f1, and a focal length of the second lens element is f2. When the following condition is satisfied: |f2/f1|<1.20, the refractive power of the first lens element and the second lens element can be balanced so as to avoid excessive aberrations due to overly large curvatures of the lens surfaces. Preferably, the following condition can be satisfied: |f2/f1|<0.80. Preferably, the following condition can be satisfied: |f2/f1|<0.65. Preferably, the following condition can be satisfied: |f2/f1|<0.30.

An axial distance between an aperture stop and the image-side surface of the seventh lens element is SD, and an axial distance between the object-side surface of the first lens element and the image-side surface of the seventh lens element is TD. When the following condition is satisfied: 0.60<SD/TD<0.90, the aperture stop can be positioned to favorably control the size of the lens system.

Half of a maximal field of view is HFOV. When the following condition is satisfied: 0.10<tan(HFOV)<0.47, an imaging range of the lens system can be adjusted while strengthening clearness of telephoto. Preferably, the following condition can be satisfied: 0.14<tan(HFOV)<0.43.

A minimum among central thicknesses of the seven lens elements is CTmin, and the focal length of the photographing optical lens system is f. When the following condition is satisfied: 1.0<(CTmin/f)*100<3.70, space arrangements for thicknesses of the lens elements can be balanced so as to favorably achieve telephoto functions.

The focal length of the photographing optical lens system is f, and an entrance pupil diameter of the photographing optical lens system is EPD. When the following condition is satisfied: 1.0<f/EPD<1.90, light entrance diameter of the lens system can be effectively adjusted so as to control the amount of incident light of the lens system for increasing image brightness.

An axial distance between the image-side surface of the seventh lens element and the image surface is BL, and an axial distance between the object-side surface of the first lens element and the image-side surface of the seventh lens element is TD. When the following condition is satisfied: 0.05<BL/TD<0.35, the back focal length of the lens system can be controlled so as to minimize the size of the lens system.

An Abbe number of a lens element among the seven lens element is V (For example an Abbe number of the fourth lens element is V4, an Abbe number of the fifth lens element is V5, and an Abbe number of the sixth lens element is V6). When at least two lens elements of the seven lens elements have Abbe numbers between 10.0 and 20.0, the axial chromatism of the lens system can be balanced so as to obtain better imaging quality.

The focal length of the photographing optical lens system is f, the focal length of the first lens element is f1, the focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, and a minimum among |f/f1|, |f/f2|, |f/f3|, |f/f4|, |f/f5|, |f/f6|, and |f/f7| is |f/fi|min. When the following condition is satisfied: |f/fi|min<0.10, there is at least one correction lens arranged in the lens system so as to favorably correct aberrations.

A vertical distance between at least one inflection point and an optical axis is Yp, and the focal length of the photographing optical lens system is f. When at least one lens surface of the sixth lens element and the seventh lens element satisfies the following condition: 0.01<Yp/f<1.0, aberration correcting capability in an off-axis region can be increased so as to reduce the size of off-axis imaging points and the total track length of the lens system.

An axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56. When the following condition is satisfied: 1.40<(T45+T56)/(T12+T23+T34)<40, space arrangements can be balanced and the sensitivity can be further reduced so as to improve the performance of the lens system for applications in various fields. Preferably, the following condition can be satisfied: 2.0<(T45+T56)/(T12+T23+T34)<15.0

The axial distance between the object-side surface of the first lens element and the image surface is TL, and the focal length of the photographing optical lens system is f. When the following condition is satisfied: 0.30<TL/f<1.25, the total track length of the lens system can also be controlled while providing higher resolutions in certain parts of images. Preferably, the following condition can be satisfied: 0.50<TL/f<1.15.

A maximum among refractive indices of the seven lens elements is Nmax. When the following condition is satisfied: 1.58<Nmax<1.72, the optical paths of the lens system can be well controlled such that various shapes of the lens surfaces can be provided for correcting different off-axis aberrations.

The focal length of the photographing optical lens system is f, the focal length of the first lens element is f1, the focal length of the second lens element is f2, a focal length of the third lens element is f3, a focal length of the fourth lens element is f4, a focal length of the fifth lens element is f5, a focal length of the sixth lens element is f6, and a focal length of the seventh lens element is f7. When the following condition is satisfied: 0.10<(|f/f1|+|f/f3|+|f/f4|+|f/f5|+|f/f6|+|f/f7|)/|f/f2|<3.80, there is sufficient refractive power on the object side of the lens system so as to favorably control the total track of length to avoid an overly large device with the lens system. Preferably, the following condition can be satisfied: 0.50<(|f/f1|+1f/f3|+|f/f4|+|f/f5|+|f/f6|+f/f7|)/|f/f2|<3.0.

A maximum among central thicknesses of the seven lens elements is CTmax, and a central thickness of the second lens element is CT2. When the following condition is satisfied: 1.0<CTmax/CT2<1.20, an arrangement of the thicknesses of the lens elements can be strengthened such that the optical paths in the second lens element is effectively arranged to control aberrations of the lens system. Preferably, the following condition can be satisfied: CTmax/CT2=1.0

The curvature radius of an object-side surface of the second lens element is R3, and a curvature radius of an image-side surface of the second lens element is R4. When the following condition is satisfied: 10.0<(R3+R4)/(R3−R4)<1.0, the shape of the second lens element is favorable that the optical path controlling capability of the second lens element is concentrated on the object side and the aberrations caused by the first lens element can be favorably balanced. Preferably, the following condition can be satisfied: −2.0<(R3+R4)/(R3−R4)<0.30. Preferably, the following condition can be satisfied: −1.50<(R3+R4)/(R3−R4)<0.

The axial distance between the object-side surface of the first lens element and the image surface is TL, and the maximum image height of the photographing optical lens system is ImgH. When the following condition is satisfied: 1.50<TL/ImgH<3.30, a sufficient light retrieving area of the lens system can be provided along with miniaturization of the lens system so as to maintain sufficient image brightness. Preferably, the following condition can be satisfied: 2.0<TL/ImgH<3.0.

A maximum effective radius on the object-side surface of the first lens element is Y11, and the maximum image height of the photographing optical lens system is ImgH. When the following condition is satisfied: 0.65<Y11/ImgH<1.50, a ratio between ranges of incident light and the imaging area can be balanced such that the lens system can retrieve sufficient light to increase image brightness.

An entrance pupil diameter of the photographing optical lens system is EPD, and a maximum among maximum effective radii on object-side surfaces and image-side surfaces of the seven lens elements is Ymax. When the following condition is satisfied: 1.40<EPD/Ymax<2.50, the size difference between the aperture of the incident light and lens elements of the lens system can be balanced such that incident light in the lens system can be utilized effectively to increase image brightness.

The Abbe number of the fourth lens element is V4. When the following condition is satisfied: 8.0<V4<30.0, the density difference between the material of the fourth lens element and air can be strengthened so as to better control the optical path in limited space.

The Abbe number of the sixth lens element is V6. When the following condition is satisfied: 8.0<V6<30.0, the density difference between the material of the sixth lens element and air can be strengthened for a better control of the optical path in limited space.

A first lens group comprises the first lens element and the second lens element, and a second lens group comprises the third lens element, the fourth lens element and the fifth lens element. When there is a gap between the first lens group and the second lens group, sufficient degree of freedom lens arrangement in the lens system can be provided so as to correct different aberrations.

A composite focal length of the first lens element and the second lens element is f12, and a composite focal length of the third lens element, the fourth lens element, and the fifth lens element is f345. When the following condition is satisfied: −1.0<f12/f345<0, the refractive power from the object side and the middle section of the lens system can be balanced such that the angle of view of the lens system can be effectively controlled.

A distance in parallel with the optical axis from an axial vertex of the image-side surface of the seventh lens element to a maximum effective radius position thereof is SAG72, and a central thickness of the seventh lens element is CT7. When the following condition is satisfied: −3.50<SAG72/CT7<−0.20, the shape and the thickness of the seven lens elements can be adjusted so as to improve the manufacturing of the lens elements and aberration corrections in the off-axis region. When the fourth lens element or the fifth lens element has the smallest effective radius among the seven lens elements, the distribution of the lens elements can be favorably balanced in size so as to increase symmetry of the lens system and further avoid excessive aberrations.

Each of the aforementioned features of the photographing optical lens system can be utilized in numerous combinations, so as to achieve the corresponding effects.

According to the photographing optical lens system of the present disclosure, the definition of the inflection point is a transition point where a curvature center of a lens surface change from the object side to the image side (or from the image side to the object side) between the optical axis and a peripheral region.

According to the photographing optical lens system of the present disclosure, the lens elements thereof can be made of glass or plastic material. When the lens elements are made of glass material, the distribution of the refractive power of the photographing optical lens system may be more flexible to design. Technologies such as grinding or molding can be used for producing glass lens elements. When the lens elements are made of plastic material, manufacturing costs can be effectively reduced. Furthermore, surfaces of each lens element can be arranged to be aspheric (ASP). Since these aspheric surfaces can be easily formed into shapes other than spherical shapes so as to have more control variables for eliminating aberrations and to further decrease the required quantity of lens elements, the total track length of the photographing optical lens system can be effectively reduced. Process such as plastic injection molding or molded glass lens can be used for making the aspheric surfaces.

According to the photographing optical lens system of the present disclosure, if a surface of a lens element is aspheric, it means that the surface has an aspheric shape throughout its optically effective area, or a portion(s) thereof.

According to the photographing optical lens system of the present disclosure, the photographing optical lens system can include at least one stop, such as an aperture stop, a glare stop or a field stop, so as to favorably reduce the amount of stray light and thereby improving the image quality.

According to the photographing optical lens system of the present disclosure, the aperture stop can be configured as a front stop or a middle stop. The front stop disposed between an imaged object and the first lens element can provide a longer distance between the exit pupil and the image surface so that there is a telecentric effect for improving the image-sensing efficiency of an image sensor, such as a CCD or CMOS sensor. The middle stop disposed between the first lens element and the image surface is favorable for enlarging the field of view, thereby providing the photographing optical lens system with the advantage of a wide-angle lens.

A variable aperture apparatus may be disposed in the photographing optical lens system of the present disclosure. The variable aperture apparatus may be a mechanical part or a light moderation part, in which the size and shape of the aperture may be controlled by electricity or electronic signal. The mechanical part may include moving parts such as blades, shielding sheets, etc. The light moderation part may include shielding materials such as filters, electrochromic materials, liquid crystal layer, etc. The variable aperture apparatus can control the amount of incoming light and exposure time so as to further strengthen the capability of image adjustment. Meanwhile, the variable aperture apparatus may represent the aperture in the present disclosure that can adjust the image properties such as depth of field or exposure speed by changing the f-number of the lens system.

According to the photographing optical lens system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the photographing optical lens system of the present disclosure, the image surface of the photographing optical lens system, based on the corresponding image sensor, can be a plane or a curved surface with an arbitrary curvature, especially a curved surface being concave facing towards the object side. Meanwhile, the photographing optical lens system of the present disclosure may optionally include one or more image correction components (such as a field flattener) between the image surface and the lens element closest to the image surface for the purpose of image corrections (such as the field curvature). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and be arranged near the image surface.

According to the above descriptions of the present disclosure, the following 1st-13th specific embodiments are provided for further explanation.

1st Embodiment

Figure 1B:
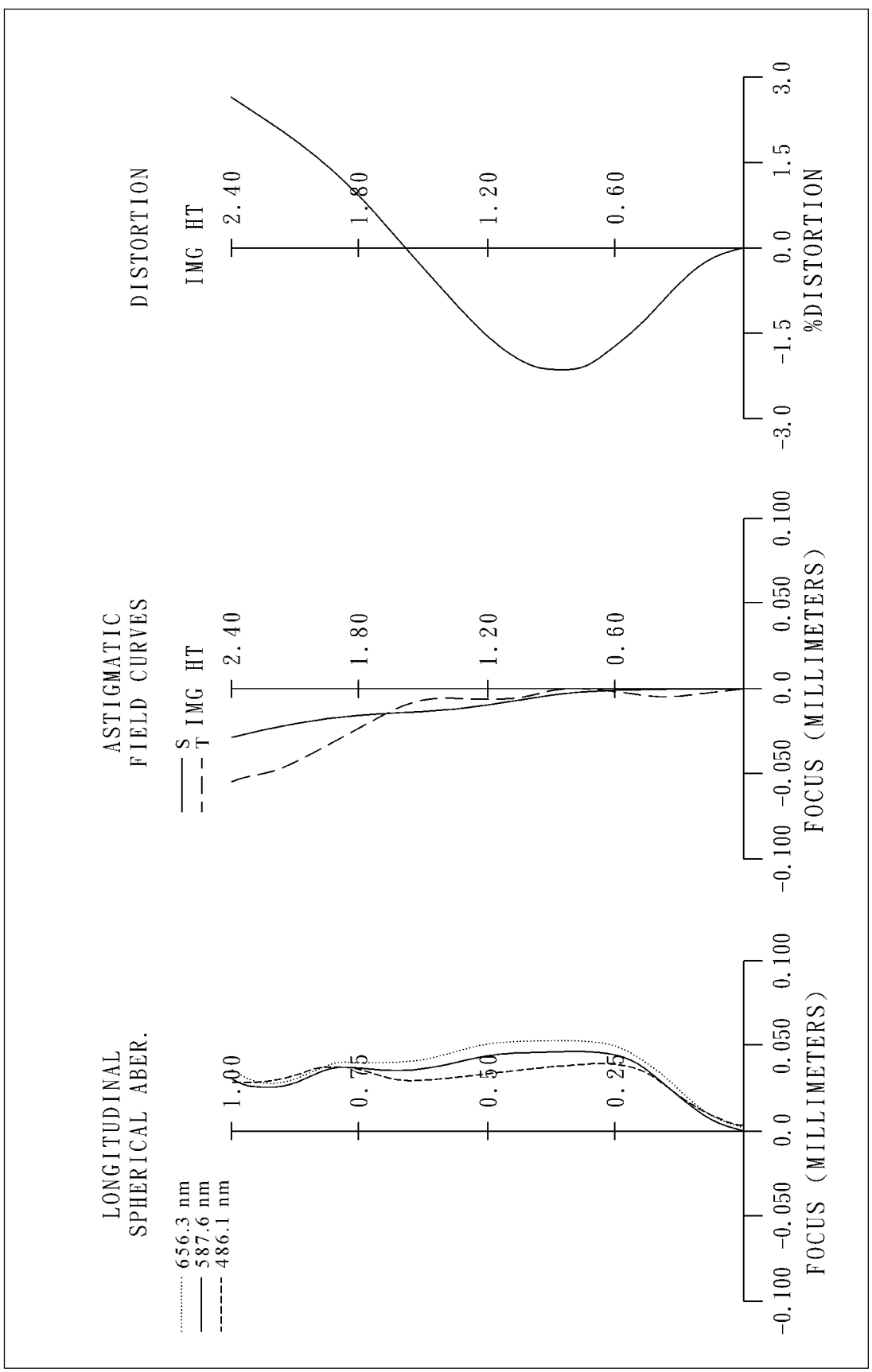
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes a photographing optical lens system (not otherwise herein labeled) of the present disclosure and an image sensor 195. The photographing optical lens system includes, in order from an object side to an image side, an aperture stop 100, a first lens element 110, a second lens element 120, a third lens element 130, a fourth lens element 140, a fifth lens element 150, a sixth lens element 160, and a seventh lens element 170. No additional lens elements are inserted between the first lens element 110 and the seventh lens element 170.

The first lens element 110 with positive refractive power has an object-side surface 111 being convex in a paraxial region thereof and an image-side surface 112 being concave in a paraxial region thereof. Both the object-side surface 111 and the image-side surface 112 are aspheric, and there is at least one inflection point on the image-side surface 112 thereof. The first lens element 110 is made of plastic material.

The second lens element 120 with positive refractive power has an object-side surface 121 being convex in a paraxial region thereof, and an image-side surface 122 being convex in a paraxial region thereof. Both the object-side surface 121 and the image-side surface 122 are aspheric, and there is at least one inflection point on the object-side surface 121 thereof. The second lens element 120 is made of glass material.

The third lens element 130 with negative refractive power has an object-side surface 131 being concave in a paraxial region thereof, and an image-side surface 132 being concave in a paraxial region thereof. Both the object-side surface 131 and the image-side surface 132 are aspheric, and there is at least one inflection point on the object-side surface 131 thereof. The third lens element 130 is made of glass material.

The fourth lens element 140 with positive refractive power has an object-side surface 141 being convex in a paraxial region thereof, and an image-side surface 142 being concave in a paraxial region thereof. Both the object-side surface 141 and the image-side surface 142 are aspheric, and there is at least one inflection point on the image-side surface 142 thereof. The fourth lens element 140 is made of plastic material.

The fifth lens element 150 with positive refractive power has an object-side surface 151 being convex in a paraxial region thereof, and an image-side surface 152 being concave in a paraxial region thereof. Both the object-side surface 151 and the image-side surface 152 are aspheric, and there are at least one inflection point on both of the object-side surface 151 and the image-side surface 152 thereof. The fifth lens element 150 is made of plastic material.

The sixth lens element 160 with positive refractive power has an object-side surface 161 being convex in a paraxial region thereof, and an image-side surface 162 being concave in a paraxial region thereof. Both the object-side surface 161 and the image-side surface 162 are aspheric, and there are one inflection point on the object-side surface 161 thereof and two inflection points on the image-side surface 162 thereof. The sixth lens element 160 is made of glass material.

The seventh lens element 170 with negative refractive power has an object-side surface 171 being concave in a paraxial region thereof, and an image-side surface 172 being convex in a paraxial region thereof. Both the object-side surface 171 and the image-side surface 172 are aspheric, and there is one inflection point on the object-side surface 171 thereof. The seventh lens element 170 is made of plastic material.

The photographing optical lens system further includes a filter 180 disposed between the seventh lens element 170 and an image surface 190. The filter 180 is made of glass material and does not affect a focal length of the photographing optical lens system. The image sensor 195 is disposed on or near the image surface 190 of the photographing optical lens system.

The fourth lens element 140 has the smallest effective radius among the seven lens elements. Also, at least two lens elements of the seven lens elements have Abbe numbers between 10.0 and 20.0. (An Abbe number V4 of the fourth lens element 140 is 19.5, and an Abbe number V5 of the fifth lens element 150 is 19.5.)

Figure 11:
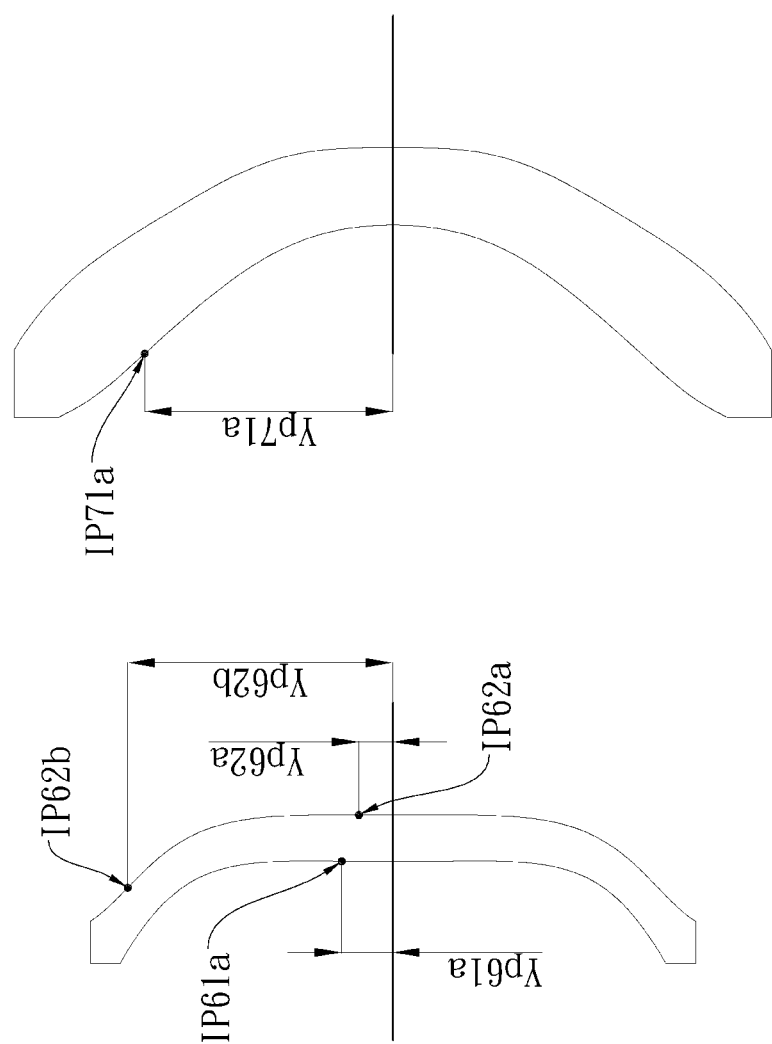
FIG. 11 is a schematic view showing parameters Yp61a, Yp62a, Yp62b, Yp71a and inflection points IP61a, IP62a, IP62b, IP71a of the 1st embodiment of the present disclosure as an example.

Please refer to FIG. 11, which is a schematic view showing the parameters Yp61a, Yp62a, Yp62b, Yp71a and inflection points IP61a, IP62a, IP62b, IP71a of the 1st embodiment of the present disclosure as an example. Please note the definitions of these characters shown in FIG. 11 are exemplary and also applicable to any one of the other embodiments of the present disclosure. The sixth lens element 160 has one inflection point IP61a on the object-side surface 161 thereof and two inflection points IP62a, IP62b on the image-side surface 162 thereof. The seventh lens element has one inflection point IP71a on the object-side surface 171 thereof. A vertical distance between the inflection point IP61a and an optical axis is Yp61a. Vertical distances between the inflection points IP62a, IP62b and the optical axis are Yp62a, Yp62b. A vertical distance between the inflection point IP71a and the optical axis is Yp71a.

The detailed optical data of the 1st embodiment are shown in TABLE 1, and the aspheric surface data are shown in TABLE 2, wherein the units of the curvature radius, the thickness and the focal length are expressed in mm, f is the focal length of the photographing optical lens system, Fno is an f-number of the photographing optical lens system, and HFOV is half of a maximal field of view, and surfaces #1 to #18 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 5.91 mm, Fno = 1.83, HFOV = 21.4 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.695 | | | | |
| 2 | Lens 1 | 2.042 | ASP | 0.654 | Plastic | 1.534 | 55.9 | 75.66 |
| 3 | | 1.911 | ASP | 0.050 | | | | |
| 4 | Lens 2 | 1.312 | ASP | 0.831 | Glass | 1.487 | 70.2 | 2.26 |
| 5 | | −5.382 | ASP | 0.051 | | | | |
| 6 | Lens 3 | −4.878 | ASP | 0.160 | Glass | 1.755 | 27.5 | −2.22 |
| 7 | | 2.591 | ASP | 0.419 | | | | |
| 8 | Lens 4 | 9.822 | ASP | 0.187 | Plastic | 1.669 | 19.5 | 16.80 |
| 9 | | 77.412 | ASP | 0.144 | | | | |
| 10 | Lens 5 | 2.825 | ASP | 0.516 | Plastic | 1.669 | 19.5 | 16.27 |
| 11 | | 3.537 | ASP | 1.059 | | | | |
| 12 | Lens 6 | 13.770 | ASP | 0.247 | Glass | 1.755 | 27.5 | 30.83 |
| 13 | | 33.434 | ASP | 0.684 | | | | |
| 14 | Lens 7 | −1.588 | ASP | 0.410 | Plastic | 1.529 | 45.4 | −3.64 |
| 15 | | −9.892 | ASP | 0.200 | | | | |
| 16 | Filter | Planar | | 0.110 | Glass | 1.517 | 64.2 | — |
| 17 | | Planar | | 0.128 | | | | |
| 18 | Image Surface | Planar | | — | | | | |

* Reference wavelength is d-line 587.6 nm.

TABLE 2

Aspheric Coefficient

| Surface # | 2 | 3 | 4 | 5 | 6 |
|---|---|---|---|---|---|
| k = | −1.9860E−01 | −2.9425E+01 | −1.2883E+01 | −9.0000E+01 | −6.1720E+01 |
| A4 = | −5.5481E−03 | −3.5780E−02 | 7.7029E−02 | 1.0772E−01 | 1.4540E−02 |
| A6 = | 8.6779E−03 | 1.7861E−02 | −1.4876E−01 | −2.4991E−01 | −3.6090E−02 |
| A8 = | −6.6374E−03 | 8.1923E−04 | 1.6158E−01 | 2.5518E−01 | 4.5039E−02 |
| A10 = | 2.4784E−03 | −1.8697E−03 | −1.0120E−01 | −1.4466E−01 | −1.5941E−02 |
| A12 = | −3.1210E−04 | 3.7924E−04 | 3.7317E−02 | 4.6132E−02 | −1.1284E−04 |
| A14 = | | | −7.5915E−03 | −7.8973E−03 | 6.2288E−04 |
| A16 = | | | 6.5285E−04 | 5.7417E−04 | |

| Surface # | 7 | 8 | 9 | 10 | 11 |
|---|---|---|---|---|---|
| k = | −1.5594E+01 | 2.6611E+00 | −6.9363E+01 | 1.6553E−01 | 4.7595E−01 |
| A4 = | 2.8998E−02 | −5.7242E−02 | −4.9444E−02 | −7.6827E−02 | −4.7445E−02 |
| A6 = | 4.5440E−02 | 6.1290E−02 | 1.1636E−01 | 9.2644E−02 | 2.7632E−02 |
| A8 = | −5.3263E−02 | −2.5190E−02 | −4.5442E−02 | −4.0712E−02 | −1.5634E−03 |
| A10 = | 4.9749E−02 | 4.6912E−03 | −1.4554E−03 | 1.0695E−02 | 6.0400E−03 |
| A12 = | −1.9856E−02 | 1.0676E−03 | 3.0830E−03 | −1.5944E−03 | −2.6109E−03 |
| A14 = | 4.1790E−03 | −1.6326E−04 | −3.5673E−04 | | |

| Surface # | 12 | 13 | 14 | 15 |
|---|---|---|---|---|
| k = | −5.0000E+01 | −2.5409E+00 | −8.0953E+00 | −2.6636E+01 |
| A4 = | −6.8787E−02 | −7.6006E−02 | −4.2105E−01 | −4.1938E−01 |
| A6 = | −5.8817E−02 | −3.3135E−02 | 3.1371E−01 | 3.4738E−01 |
| A8 = | 6.8575E−02 | 3.0599E−02 | −6.6652E−02 | −1.5319E−01 |
| A10 = | −8.0149E−02 | −2.5130E−02 | −4.6926E−02 | 4.3032E−02 |
| A12 = | 3.8104E−02 | 4.4547E−03 | 3.4249E−02 | −8.7212E−03 |
| A14 = | −6.1108E−03 | 2.8456E−03 | −8.1814E−03 | 1.1989E−03 |
| A16 = | | −7.6063E−04 | 6.8751E−04 | −7.9323E−05 |

The equation of the aspheric surface profiles is expressed as follows:

$$X(Y) = (Y^2/R)/\left(1 + \operatorname{sqrt}\left(1 - (1+k)*(Y/R)^2\right)\right) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the photographing optical lens system is f, the f-number of the photographing optical lens system is Fno, and half of the maximal field of view of the photographing optical lens system is HFOV. These parameters have the following values: f=5.91 mm; Fno=1.83; and HFOV=21.4 degrees.

In the 1st embodiment, the Abbe number of the fourth lens element 140 is V4, and it satisfies the condition: V4=19.5.

In the 1st embodiment, an Abbe number of the sixth lens element 160 is V6, and it satisfies the condition: V6=27.5.

In the 1st embodiment, a minimum among Abbe numbers of the seven lens elements is Vmin, and it satisfies the condition: Vmin=19.5, which is the Abbe number of the fourth lens element 140 or the fifth lens element 150.

In the 1st embodiment, a maximum among refractive indices of the seven lens elements is Nmax, and it satisfies the condition: Nmax=1.755, which is the refractive index of the third lens element 130 or the sixth lens element 160.

In the 1st embodiment, a maximum among central thicknesses of the seven lens elements is CTmax, and a central thickness of the second lens element 120 is CT2. They satisfy the condition: CTmax/CT2=1.00.

In the 1st embodiment, a minimum among central thicknesses of the seven lens elements is CTmin, and the focal length of the photographing optical lens system is f. They satisfy the condition: (CTmin/f)*100=2.71.

In the 1st embodiment, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56. They satisfy the condition: (T45+T56)/(T12+T23+T34)=2.31.

In the 1st embodiment, a curvature radius of the object-side surface 121 of the second lens element 120 is R3, and a curvature radius of the image-side surface 122 of the second lens element 120 is R4. They satisfy the condition: (R3+R4)/(R3−R4)=−0.61.

In the 1st embodiment, a focal length of the first lens element 110 is f1, and a focal length of the second lens element 120 is f2. They satisfy the condition: |f2/f1|=0.03.

In the 1st embodiment, the focal length of the photographing optical lens system is f, the focal length of the first lens element 110 is f1, the focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, and a focal length of the seventh lens element 170 is f7. A minimum among |f/f1|, |f/f2|, |f/f3|, |f/f4|, |f/f5|, |f/f6|, and |f/f7| is |f/fi|min, and it satisfies the condition: |f/fi|min=0.08, which is |f/f1|.

In the 1st embodiment, the focal length of the photographing optical lens system is f, the focal length of the first lens element 110 is f1, the focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, and the focal length of the seventh lens element 170 is f7. They satisfy the condition: (|f1|+|f/f3|+|f/f4|+|f/f5|+|f/f6|+|f/f7|)/|f/f2|=2.01.

In the 1st embodiment, an axial distance between the object-side surface 111 of the first lens element 110 and the image surface 190 is TL, and the focal length of the photographing optical lens system is f They satisfy the condition: TL/f=0.99.

In the 1st embodiment, an axial distance between the image-side surface 172 of the seventh lens element 170 and the image surface 190 is BL, and an axial distance between the object-side surface 111 of the first lens element 110 and the image-side surface 172 of the seventh lens element 170 is TD. They satisfy the condition: BL/TD=0.08.

In the 1st embodiment, the focal length of the photographing optical lens system is f, and a maximum image height of the photographing optical lens system is ImgH. They satisfy the condition: ImgH/f=0.41.

In the 1st embodiment, an axial distance between the aperture stop 100 and an image-side surface 172 of the seventh lens element 170 is SD, and an axial distance between the object-side surface 111 of the first lens element 110 and the image-side surface 172 of the seventh lens element 170 is TD. They satisfy the condition: SD/TD=0.87.

In the 1st embodiment, the axial distance between the object-side surface 111 of the first lens element 110 and the image surface 190 is TL, the f-number of the photographing optical lens system is Fno, and the focal length of the photographing optical lens system is f. They satisfy the condition: TL*Fno/f=1.81.

In the 1st embodiment, the axial distance between the object-side surface 111 of the first lens element 110 and the image surface 190 is TL, and the maximum image height of the photographing optical lens system is ImgH. They satisfy the condition: TL/ImgH=2.44.

In the 1st embodiment, a maximum effective radius on the object-side surface 111 of the first lens element 110 is Y11, and the maximum image height of the photographing optical lens system is ImgH. They satisfy the condition: Y11/ImgH=0.69.

In the 1st embodiment, an entrance pupil diameter of the photographing optical lens system is EPD, and a maximum among maximum effective radii on object-side surfaces and image-side surfaces of the seven lens elements is Ymax. They satisfy the condition: EPD/Ymax=1.62.

In the 1st embodiment, a distance in parallel with the optical axis from an axial vertex of the image-side surface 172 of the seventh lens element 170 to a maximum effective radius position thereof is SAG72, and a central thickness of the seventh lens element is CT7. They satisfy the condition: SAG72/CT7=−2.61.

In the 1st embodiment, half of the maximal field of view is HFOV, and it satisfies the condition: tan(HFOV)=0.39.

In the 1st embodiment, a composite focal length of the first lens element 110 and the second lens element 120 is f12, and a composite focal length of the third lens element 130, the fourth lens element 140, and the fifth lens element 150 is f345. They satisfy the condition: f12/f345=−0.79.

In the 1st embodiment, an Abbe number of a lens element with positive refractive power among the seven lens elements is Vp, and it satisfies the conditions: Vp=55.9 (the first lens element 110), 70.2 (the second lens element 120), 19.5 (the third lens element 130), 19.5 (the fifth lens element 150), or 27.5 (the sixth lens element 160).

In the 1st embodiment, the focal length of the photographing optical lens system is f, and the entrance pupil diameter of the photographing optical lens system is EPD. They satisfy the following condition: f/EPD=1.83.

In the 1st embodiment, a vertical distance between the inflection point IP61 a on the object-side surface 161 of the sixth lens element 160 and the optical axis is Yp61, and the focal length of the photographing optical lens system is f They satisfy the following condition: Yp61/f=0.05.

In the 1st embodiment, vertical distances between the inflection points IP62a, IP62b on the image-side surface 162 of the sixth lens element 160 and the optical axis are Yp62 (including Yp62a and Yp62b respectively), and the focal length of the photographing optical lens system is f They satisfy the following conditions: Yp62/f=0.030 (Yp62a corresponding to IP62a) or 0.237 (Yp62b corresponding to IP62b).

In the 1st embodiment, a vertical distance between the inflection point IP71 a on the object-side surface 171 of the seventh lens element 170 and the optical axis is Yp71, and the focal length of the photographing optical lens system is f They satisfy the following condition: Yp71/f=0.22.

2nd Embodiment

Figure 2A:
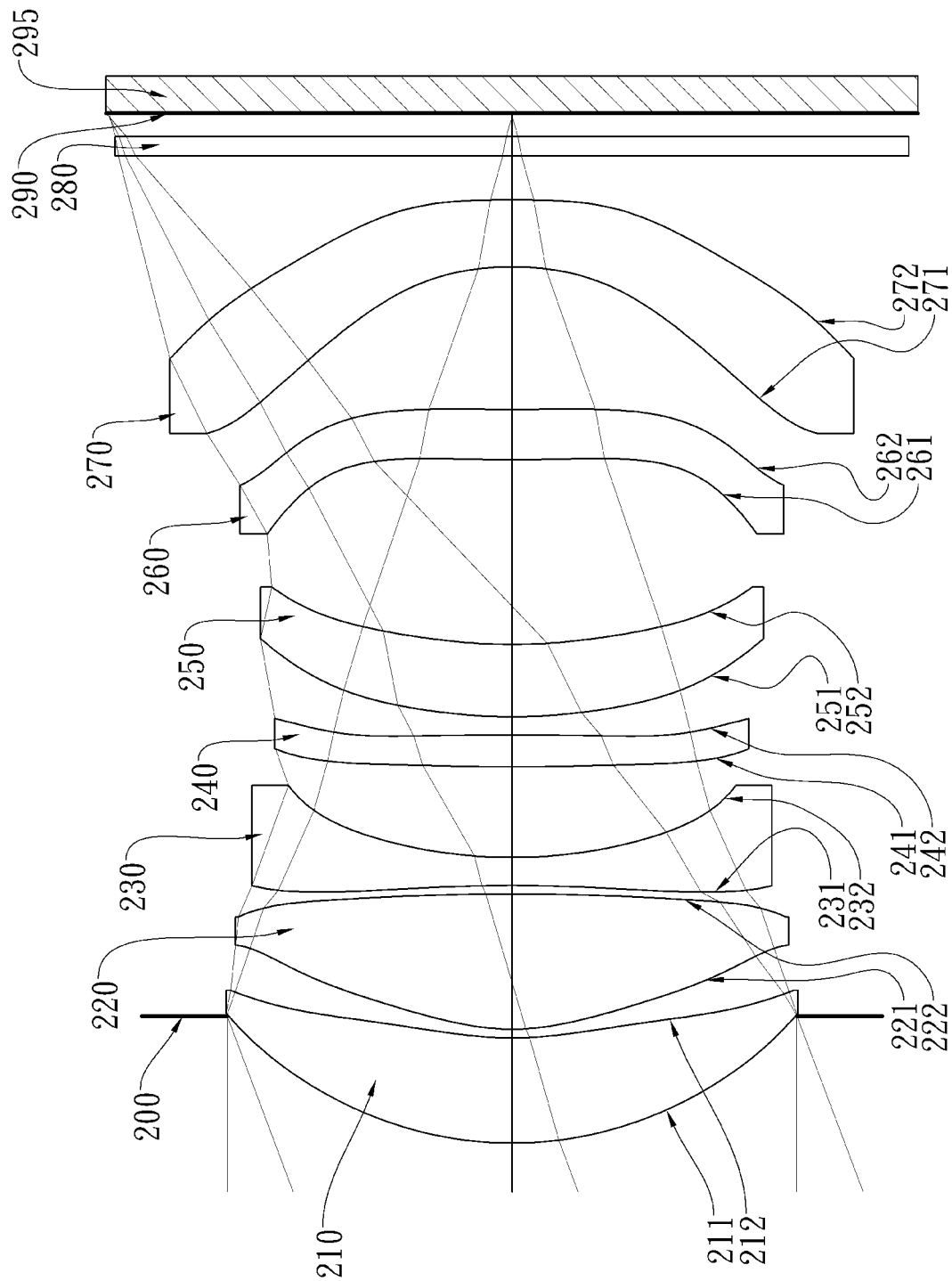
FIG. 2A is a schematic view of an imaging apparatus according to the 2nd embodiment of the present disclosure.
Figure 2B:
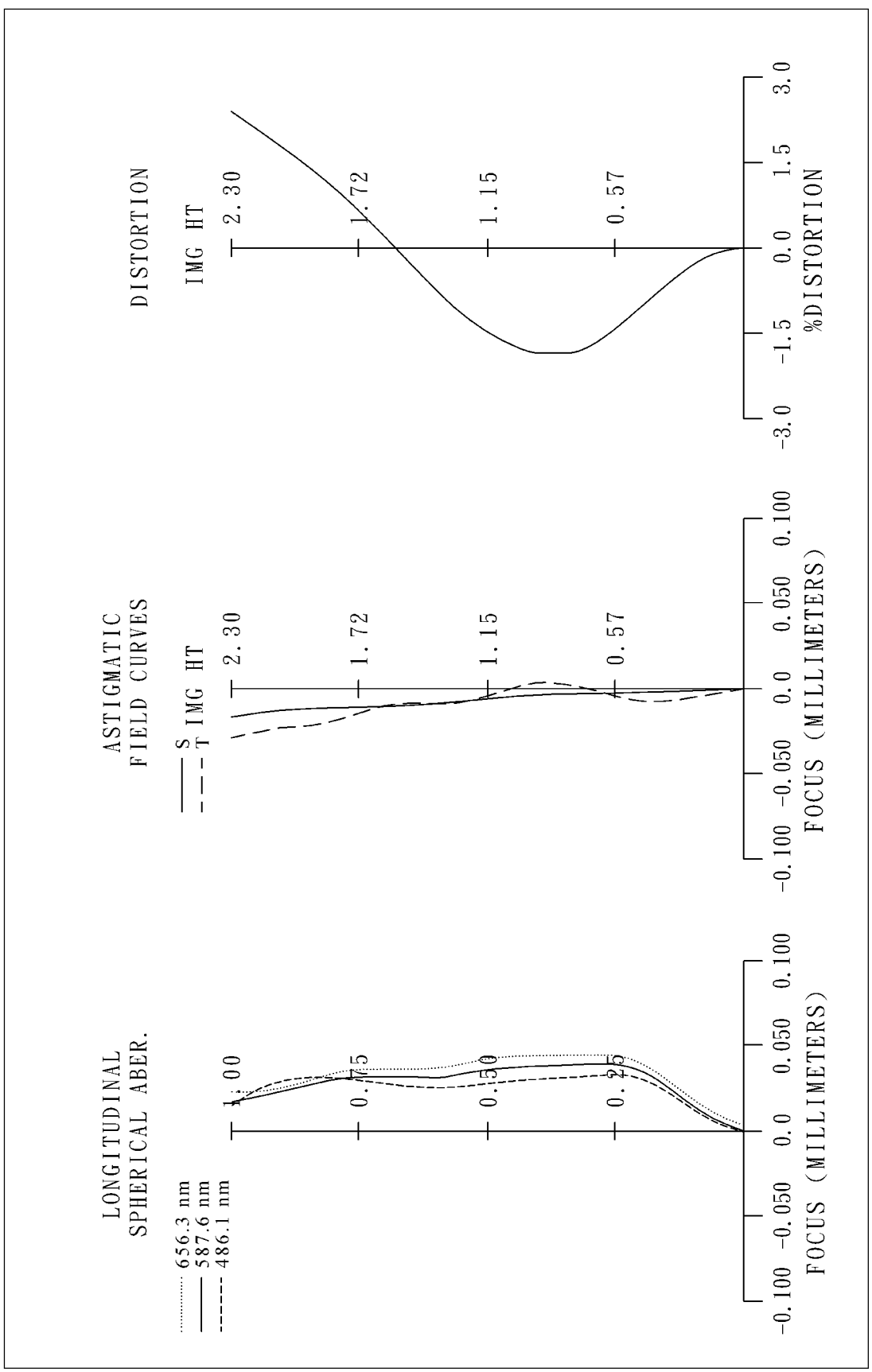
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes a photographing optical lens system (not otherwise herein labeled) of the present disclosure and an image sensor 295. The photographing optical lens system includes, in order from an object side to an image side, an aperture stop 200, a first lens element 210, a second lens element 220, a third lens element 230, a fourth lens element 240, a fifth lens element 250, a sixth lens element 260, and a seventh lens element 270. No other lens elements are inserted between the first lens element 210 and the seventh lens element 270.

The first lens element 210 with negative refractive power has an object-side surface 211 being convex in a paraxial region thereof, and an image-side surface 212 being concave in a paraxial region thereof. Both the object-side surface 211 and the image-side surface 212 are aspheric, and there is at least one inflection point on the image-side surface 212 thereof. The first lens element 210 is made of plastic material.

The second lens element 220 with positive refractive power has an object-side surface 221 being convex in a paraxial region thereof, and an image-side surface 222 being convex in a paraxial region thereof. Both the object-side surface 221 and the image-side surface 222 are aspheric, and there is at least one inflection point on the object-side surface 221 thereof. The second lens element 220 is made of glass material.

The third lens element 230 with negative refractive power has an object-side surface 231 being concave in a paraxial region thereof, and an image-side surface 232 being concave in a paraxial region thereof. Both the object-side surface 231 and the image-side surface 232 are aspheric, and there is at least one inflection point on the object-side surface 231 thereof. The third lens element 230 is made of glass material.

The fourth lens element 240 with positive refractive power has an object-side surface 241 being convex in a paraxial region thereof, and an image-side surface 242 being convex in a paraxial region thereof. Both the object-side surface 241 and the image-side surface 242 are aspheric, and there are at least one inflection point on both the object-side surface 241 and the image-side surface 242 thereof. The fourth lens element 240 is made of plastic material.

The fifth lens element 250 with positive refractive power has an object-side surface 251 being convex in a paraxial region thereof, and an image-side surface 252 being concave in a paraxial region thereof. Both the object-side surface 251 and the image-side surface 252 are aspheric. The fifth lens element 250 is made of plastic material.

The sixth lens element 260 with positive refractive power has an object-side surface 261 being convex in a paraxial region thereof, and an image-side surface 262 being concave in a paraxial region thereof. Both the object-side surface 261 and the image-side surface 262 are aspheric, and there are one inflection point on the object-side surface 261 thereof, and two inflection points on the image-side surface 262 thereof. The sixth lens element 260 is made of glass material.

The seventh lens element 270 with negative refractive power has an object-side surface 271 being concave in a paraxial region thereof, and an image-side surface 272 being convex in a paraxial region thereof. Both the object-side surface 271 and the image-side surface 272 are aspheric, and there is one inflection point on the object-side surface 271 thereof. The seventh lens element 270 is made of plastic material.

The photographing optical lens system further includes a filter 280 disposed between the seventh lens element 270 and an image surface 290. The filter 280 is made of glass material and does not affect a focal length of the photographing optical lens system. The image sensor 295 is disposed on or near the image surface 290 of the photographing optical lens system.

The fourth lens element 240 has the smallest effective radius among the seven lens elements. Also, at least two lens elements of the seven lens elements have Abbe numbers between 10.0 and 20.0. (An Abbe number V4 of the fourth lens element 240 is 19.5, and an Abbe number V5 of the fifth lens element 250 is 19.5.)

The detailed optical data of the 2nd embodiment are shown in TABLE 3, and the aspheric surface data are shown in TABLE 4.

TABLE 3

(2nd Embodiment)
f = 5.92 mm, Fno = 1.83, HFOV = 20.6 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.722 | | | | |
| 2 | Lens 1 | 2.097 | ASP | 0.597 | Plastic | 1.534 | 55.9 | −72.71 |
| 3 | | 1.793 | ASP | 0.050 | | | | |
| 4 | Lens 2 | 1.224 | ASP | 0.768 | Glass | 1.487 | 70.2 | 2.34 |
| 5 | | −12.900 | ASP | 0.048 | | | | |
| 6 | Lens 3 | −8.787 | ASP | 0.160 | Glass | 1.755 | 27.5 | −2.74 |
| 7 | | 2.728 | ASP | 0.514 | | | | |
| 8 | Lens 4 | 11.283 | ASP | 0.180 | Plastic | 1.669 | 19.5 | 15.68 |
| 9 | | −148.361 | ASP | 0.105 | | | | |
| 10 | Lens 5 | 2.837 | ASP | 0.411 | Plastic | 1.669 | 19.5 | 41.62 |
| 11 | | 2.976 | ASP | 1.049 | | | | |
| 12 | Lens 6 | 9.753 | ASP | 0.286 | Glass | 1.755 | 27.5 | 24.58 |
| 13 | | 20.290 | ASP | 0.810 | | | | |
| 14 | Lens 7 | −1.724 | ASP | 0.380 | Plastic | 1.529 | 45.4 | −3.87 |
| 15 | | −11.801 | ASP | 0.250 | | | | |
| 16 | Filter | Planar | | 0.110 | Glass | 1.517 | 64.2 | — |
| 17 | | Planar | | 0.133 | | | | |
| 18 | Image Surface | Planar | | — | | | | |

\* Reference wavelength is d-line 587.6 nm.

TABLE 4

Aspheric Coefficient

| Surface # | 2 | 3 | 4 | 5 | 6 |
|---|---|---|---|---|---|
| k = | −2.2167E−01 | −2.3975E+01 | −1.0607E+01 | −8.5323E+01 | −6.1720E+01 |
| A4 = | −4.2248E−03 | −4.1054E−02 | 8.3568E−02 | 4.0567E−02 | 5.3094E−03 |
| A6 = | 8.1169E−03 | 1.1252E−02 | −1.8445E−01 | −1.3721E−01 | 7.2042E−03 |
| A8 = | −8.3767E−03 | 1.2254E−02 | 2.1443E−01 | 1.9917E−01 | 3.5726E−03 |
| A10 = | 3.7078E−03 | −5.9570E−03 | −1.3832E−01 | −1.4845E−01 | −4.8154E−03 |
| A12 = | −5.2176E−04 | 7.6654E−04 | 5.7685E−02 | 5.9451E−02 | 1.7513E−03 |
| A14 = | | | −1.4806E−02 | −1.2542E−02 | −1.6296E−04 |
| A16 = | | | 1.6548E−03 | 1.1036E−03 | |

| Surface # | 7 | 8 | 9 | 10 | 11 |
|---|---|---|---|---|---|
| k = | −1.4030E+01 | 2.6611E+00 | −9.0000E+01 | 3.0617E−01 | −5.2773E−01 |
| A4 = | 5.6175E−02 | −4.0908E−02 | −6.3533E−02 | −1.1132E−01 | −7.6108E−02 |

TABLE 4-continued

| Aspheric Coefficient | | | | | |
|---|---|---|---|---|---|
| A6 = | 1.7197E−02 | −8.6555E−03 | 1.0880E−01 | 1.6956E−01 | 5.9331E−02 |
| A8 = | −6.1803E−02 | 6.6376E−02 | −4.4727E−03 | −1.0044E−01 | −1.5485E−02 |
| A10 = | 6.5632E−02 | −4.2053E−02 | −3.0132E−02 | 3.2518E−02 | 6.9391E−03 |
| A12 = | −2.3852E−02 | 9.1312E−03 | 9.0811E−03 | −4.6719E−03 | −1.9873E−03 |
| A14 = | 3.94315E−03 | −1.47551E−04 | −3.58567E−04 | | |

| Surface # | 12 | 13 | 14 | 15 |
|---|---|---|---|---|
| k = | −5.0000E+01 | −2.5409E+00 | −8.0953E+00 | −2.6636E+01 |
| A4 = | −7.6206E−02 | −9.1559E−02 | −4.1629E−01 | −3.8892E−01 |
| A6 = | −9.2950E−02 | −3.7319E−02 | 3.0982E−01 | 3.1239E−01 |
| A8 = | 1.5140E−01 | 5.6117E−02 | −7.3591E−02 | −1.2912E−01 |
| A10 = | −1.5700E−01 | −4.0754E−02 | −3.4148E−02 | 3.0320E−02 |
| A12 = | 7.2066E−02 | 6.3614E−03 | 2.6811E−02 | −4.1452E−03 |
| A14 = | −1.1736E−02 | 4.4764E−03 | −6.2822E−03 | 2.9021E−04 |
| A16 = | | −1.2124E−03 | 5.0911E−04 | −5.3949E−06 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 5.92 | ImgH/f | 0.39 |
| Fno. | 1.83 | SD/TD | 0.87 |
| HFOV [deg.] | 20.6 | TL*Fno/f | 1.81 |
| V4 | 19.5 | TL/ImgH | 2.55 |
| V6 | 27.5 | Y11/ImgH | 0.71 |
| Vmin | 19.5 | EPD/Ymax | 1.67 |
| Nmax | 1.755 | SAG72/CT7 | −2.37 |
| CTmax/CT2 | 1.00 | tan(HFOV) | 0.38 |
| (CTmin/f)*100 | 2.70 | f12/f345 | −0.74 |
| (T45 + T56)/(T12 + T23 + T34) | 1.89 | Vp | 70.2/19.5/19.5/27.5 |
| (R3 + R4)/(R3 − R4) | −0.83 | f/EPD | 1.83 |
| \|f2/f1\| | 0.03 | Yp61/f | 0.05 |
| \|f/fi\|min | 0.08 | Yp62/f | 0.035/0.226 |
| (\|f/f1\| + \|f/f3\| + \|f/f4\| + \|f/f5\| + \|f/f6\| + \|f/f7\|)/\|f/f2\| | 1.79 | Yp71/f | 0.22 |
| TL/f | 0.99 | Yp72/f | — |
| BL/TD | 0.09 | | |

3rd Embodiment

Figure 3A:
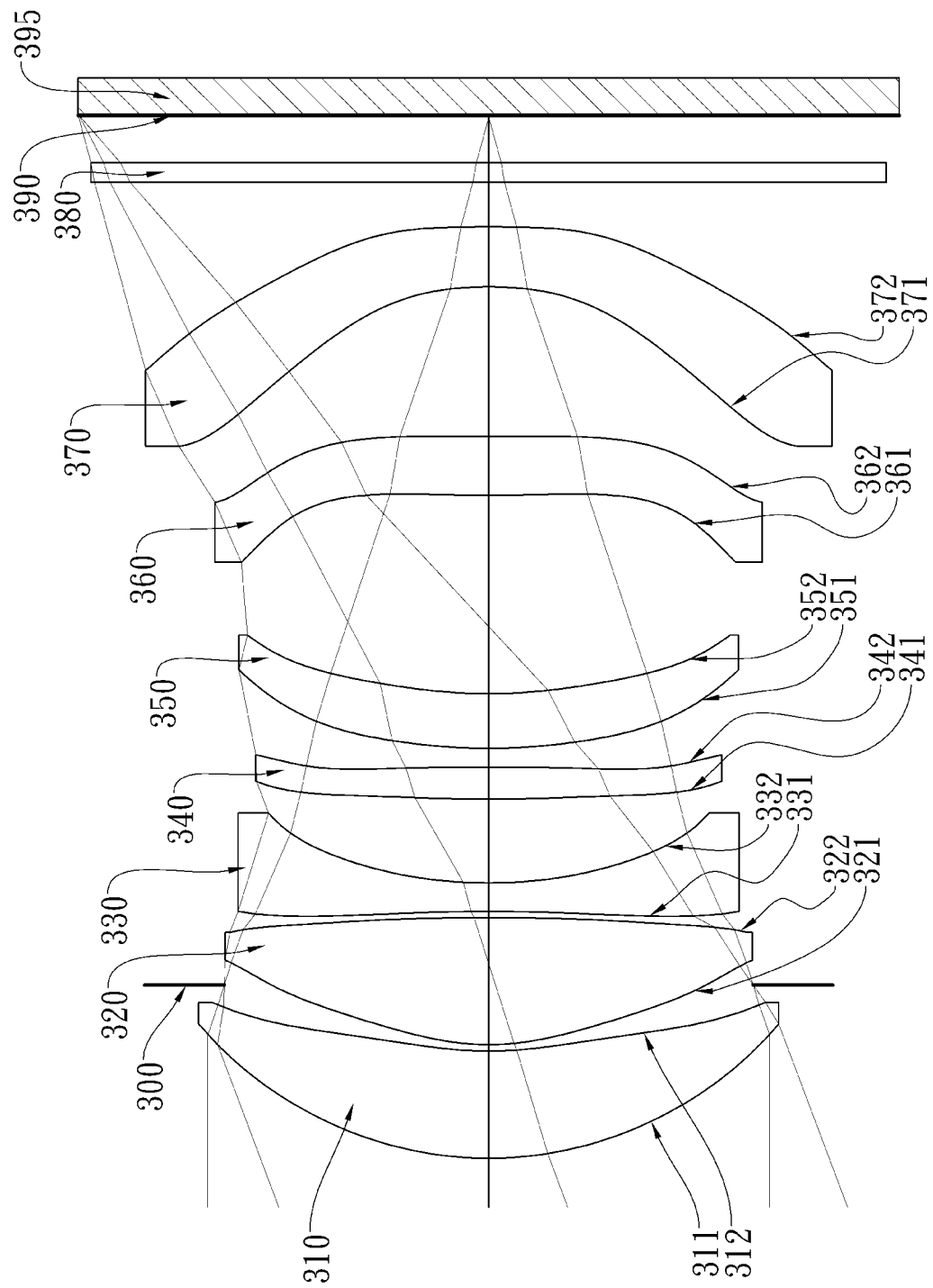
FIG. 3A is a schematic view of an imaging apparatus according to the 3rd embodiment of the present disclosure.
Figure 3B:
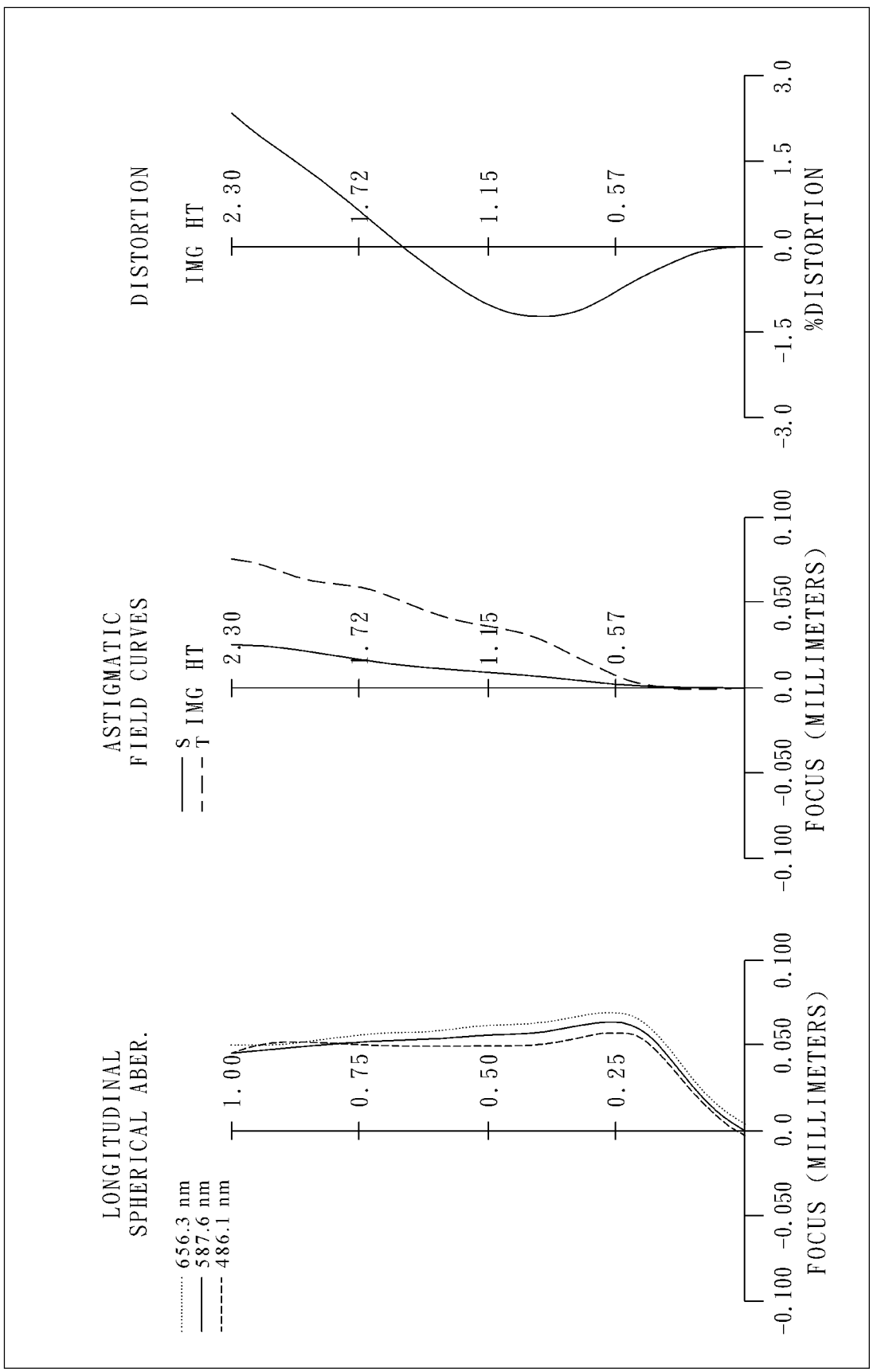
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes a photographing optical lens system (not otherwise herein labeled) of the present disclosure and an image sensor 395. The photographing optical lens system includes, in order from an object side to an image side, a first lens element 310, an aperture stop 300, a second lens element 320, a third lens element 330, a fourth lens element 340, a fifth lens element 350, a sixth lens element 360, and a seventh lens element 370. No other lens elements are inserted between the first lens element 310 and the seventh lens element 370.

The first lens element 310 with positive refractive power has an object-side surface 311 being convex in a paraxial region thereof, and an image-side surface 312 being concave in a paraxial region thereof. Both the object-side surface 311 and the image-side surface 312 are aspheric, and there is at least one inflection point on the image-side surface 312 thereof. The first lens element 310 is made of plastic material.

The second lens element 320 with positive refractive power has an object-side surface 321 being convex in a paraxial region thereof, and an image-side surface 322 being convex in a paraxial region thereof. Both the object-side surface 321 and the image-side surface 322 are aspheric, and there are at least one inflection point on both the object-side surface 321 and the image-side surface 322 thereof. The second lens element 320 is made of glass material.

The third lens element 330 with negative refractive power has an object-side surface 331 being concave in a paraxial region thereof, and an image-side surface 332 being concave in a paraxial region thereof. Both the object-side surface 331 and the image-side surface 332 are aspheric, and there is at least one inflection point on the object-side surface thereof. The third lens element 330 is made of glass material.

The fourth lens element 340 with positive refractive power has an object-side surface 341 being convex in a paraxial region thereof, and an image-side surface 342 being convex in a paraxial region thereof. Both the object-side surface 341 and the image-side surface 342 are aspheric, and there are at least one inflection point on both the object-side surface 341 and the image-side surface 342. The fourth lens element 340 is made of plastic material.

The fifth lens element 350 with negative refractive power has an object-side surface 351 being convex in a paraxial region thereof, and an image-side surface 352 being concave in a paraxial region thereof. Both the object-side surface 351 and the image-side surface 352 are aspheric. The fifth lens element 350 is made of plastic material.

The sixth lens element 360 with positive refractive power has an object-side surface 361 being convex in a paraxial region thereof, and an image-side surface 362 being concave in a paraxial region thereof. Both the object-side surface 361 and the image-side surface 362 are aspheric, and there are two inflection points on the object-side surface 361 thereof, and two inflection points on the image-side surface 362 thereof. The sixth lens element 360 is made of glass material.

The seventh lens element 370 with negative refractive power has an object-side surface 371 being concave in a paraxial region thereof, and an image-side surface 372 being convex in a paraxial region thereof. Both the object-side surface 371 and the image-side surface 372 are aspheric, and there are one inflection point on the object-side surface 371 thereof, and one inflection point on the image-side surface 372 thereof. The seventh lens element 370 is made of plastic material.

The photographing optical lens system further includes a filter 380 disposed between the seventh lens element 370 and an image surface 390. The filter 380 is made of glass material and does not affect the focal length of the photographing optical lens system. The image sensor 395 is disposed on or near the image surface 390 of the photographing optical lens system.

The fourth lens element 340 has the smallest effective radius among the seven lens elements. Also, at least two lens elements of the seven lens elements have Abbe numbers between 10.0 and 20.0. (An Abbe number V4 of the fourth lens element 340 is 19.5, and an Abbe number V5 of the fifth lens element 350 is 19.5.) The detailed optical data of the 3rd embodiment are shown in TABLE 5, and the aspheric surface data are shown in TABLE 6.

TABLE 5

(3rd Embodiment)
f = 5.89 mm, Fno = 1.87, HFOV = 20.6 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 2.098 | ASP | 0.601 | Plastic | 1.534 | 55.9 | 78.13 |
| 2 | | 1.989 | ASP | 0.371 | | | | |
| 3 | Ape. Stop | Planar | | −0.335 | | | | |
| 4 | Lens 2 | 1.313 | ASP | 0.713 | Glass | 1.487 | 70.2 | 2.49 |
| 5 | | −13.318 | ASP | 0.035 | | | | |
| 6 | Lens 3 | −9.143 | ASP | 0.160 | Glass | 1.755 | 27.5 | −2.72 |
| 7 | | 2.669 | ASP | 0.470 | | | | |
| 8 | Lens 4 | 9.288 | ASP | 0.180 | Plastic | 1.669 | 19.5 | 10.15 |
| 9 | | −25.025 | ASP | 0.105 | | | | |
| 10 | Lens 5 | 2.873 | ASP | 0.307 | Plastic | 1.669 | 19.5 | −121.21 |
| 11 | | 2.656 | ASP | 1.114 | | | | |
| 12 | Lens 6 | 9.519 | ASP | 0.329 | Glass | 1.755 | 27.5 | 22.59 |
| 13 | | 21.217 | ASP | 0.841 | | | | |
| 14 | Lens 7 | −2.057 | ASP | 0.336 | Plastic | 1.529 | 45.4 | −4.30 |
| 15 | | −22.825 | ASP | 0.250 | | | | |
| 16 | Filter | Planar | | 0.110 | Glass | 1.517 | 64.2 | — |
| 17 | | Planar | | 0.266 | | | | |
| 18 | Image Surface | Planar | | — | | | | |

\* Reference wavelength is d-line 587.6 nm.

TABLE 6

Aspheric Coefficient

| Surface # | 1 | 2 | 4 | 5 | 6 |
|---|---|---|---|---|---|
| k = | −1.9215E−01 | −2.1395E+01 | −9.8154E+00 | −8.3883E+01 | −6.1720E+01 |
| A4 = | 3.4316E−03 | −3.3721E−02 | 8.9179E−02 | 4.5536E−02 | 3.6543E−02 |
| A6 = | −4.8003E−04 | −8.0148E−03 | −1.9695E−01 | −1.8852E−01 | −6.0709E−02 |
| A8 = | −3.2984E−03 | 3.1747E−02 | 2.1240E−01 | 2.8620E−01 | 8.4434E−02 |
| A10 = | 2.2780E−03 | −1.3646E−02 | −1.2072E−01 | −2.1439E−01 | −5.6452E−02 |
| A12 = | −3.7676E−04 | 1.8432E−03 | 4.4815E−02 | 8.6252E−02 | 1.8236E−02 |
| A14 = | | | −1.0949E−02 | −1.8234E−02 | −2.2175E−03 |
| A16 = | | | 1.2138E−03 | 1.5983E−03 | |

| Surface # | 7 | 8 | 9 | 10 | 11 |
|---|---|---|---|---|---|
| k = | −1.1731E+01 | 2.6611E+00 | −8.9888E+01 | 2.6710E−01 | −1.2859E+00 |
| A4 = | 9.0756E−02 | −2.2845E−02 | −4.4149E−02 | −1.4408E−01 | −1.2066E−01 |
| A6 = | −1.8603E−02 | −6.2764E−02 | 7.1344E−02 | 2.4031E−01 | 1.2332E−01 |
| A8 = | −5.6614E−02 | 1.0722E−01 | 2.2862E−02 | −1.5930E−01 | −6.3381E−02 |
| A10 = | 8.0549E−02 | −5.1727E−02 | −3.4878E−02 | 5.7330E−02 | 2.5706E−02 |
| A12 = | −3.5151E−02 | 9.3788E−03 | 8.2071E−03 | −8.7240E−03 | −4.7217E−03 |
| A14 = | 6.7527E−03 | −1.4439E−04 | −3.9635E−04 | | |

| Surface # | 12 | 13 | 14 | 15 |
|---|---|---|---|---|
| k = | −3.3086E+01 | −2.5409E+00 | −8.0953E+00 | −2.6636E+01 |
| A4 = | −9.2523E−02 | −1.0547E−01 | −4.2162E−01 | −3.6696E−01 |
| A6 = | −5.3117E−02 | 8.1338E−04 | 3.2007E−01 | 2.8155E−01 |
| A8 = | 9.0563E−02 | 6.4156E−03 | −8.2146E−02 | −1.0654E−01 |
| A10 = | −1.0143E−01 | 1.0582E−03 | −2.8323E−02 | 1.9286E−02 |
| A12 = | 4.6775E−02 | −1.2013E−02 | 2.4208E−02 | −7.3400E−04 |
| A14 = | −7.0152E−03 | 8.3595E−03 | −5.6806E−03 | −2.8911E−04 |
| A16 = | | −1.5148E−03 | 4.5598E−04 | 3.5801E−05 |

In the 3rd embodiment, the equation of the aspheric surface profiles of the aforementioned lens elements is the same as the equation of the 1st embodiment. In the 3rd embodiment, a vertical distance between the inflection point IP72 on the image-side surface 372 of the seventh lens element 370 and an optical axis is Yp72, a focal length of the photographing optical lens system is f, and they satisfy the following condition: Yp72/f=0.314. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 5.89 | ImgH/f | 0.39 |
| Fno. | 1.87 | SD/TD | 0.81 |
| HFOV [deg.] | 20.6 | TL*Fno/f | 1.86 |
| V4 | 19.5 | TL/ImgH | 2.55 |
| V6 | 27.5 | Y11/ImgH | 0.71 |
| Vmin | 19.5 | EPD/Ymax | 1.64 |
| Nmax | 1.755 | SAG72/CT7 | −2.40 |
| CTmax/CT2 | 1.00 | tan(HFOV) | 0.38 |
| (CTmin/f)*100 | 2.72 | f12/f345 | −0.73 |
| (T45 + T56)/(T12 + T23 + T34) | 2.25 | Vp | 55/70.2/19.5/27.5 |
| (R3 + R4)/(R3 − R4) | −0.82 | f/EPD | 1.87 |
| \|f2/f1\| | 0.03 | Yp61/f | 0.049/0.229 |
| \|f/fi\|min | 0.05 | Yp62/f | 0.032/0.223 |
| (\|f/f1\| + \|f/f3\| + \|f/f4\| + \|f/f5\| + \|f/f6\| + \|f/f7\|)/\|f/f2\| | 1.90 | Yp71/f | 0.22 |
| TL/f | 0.99 | Yp72/f | 0.314 |
| BL/TD | 0.12 | | |

4th Embodiment

Figure 4A:
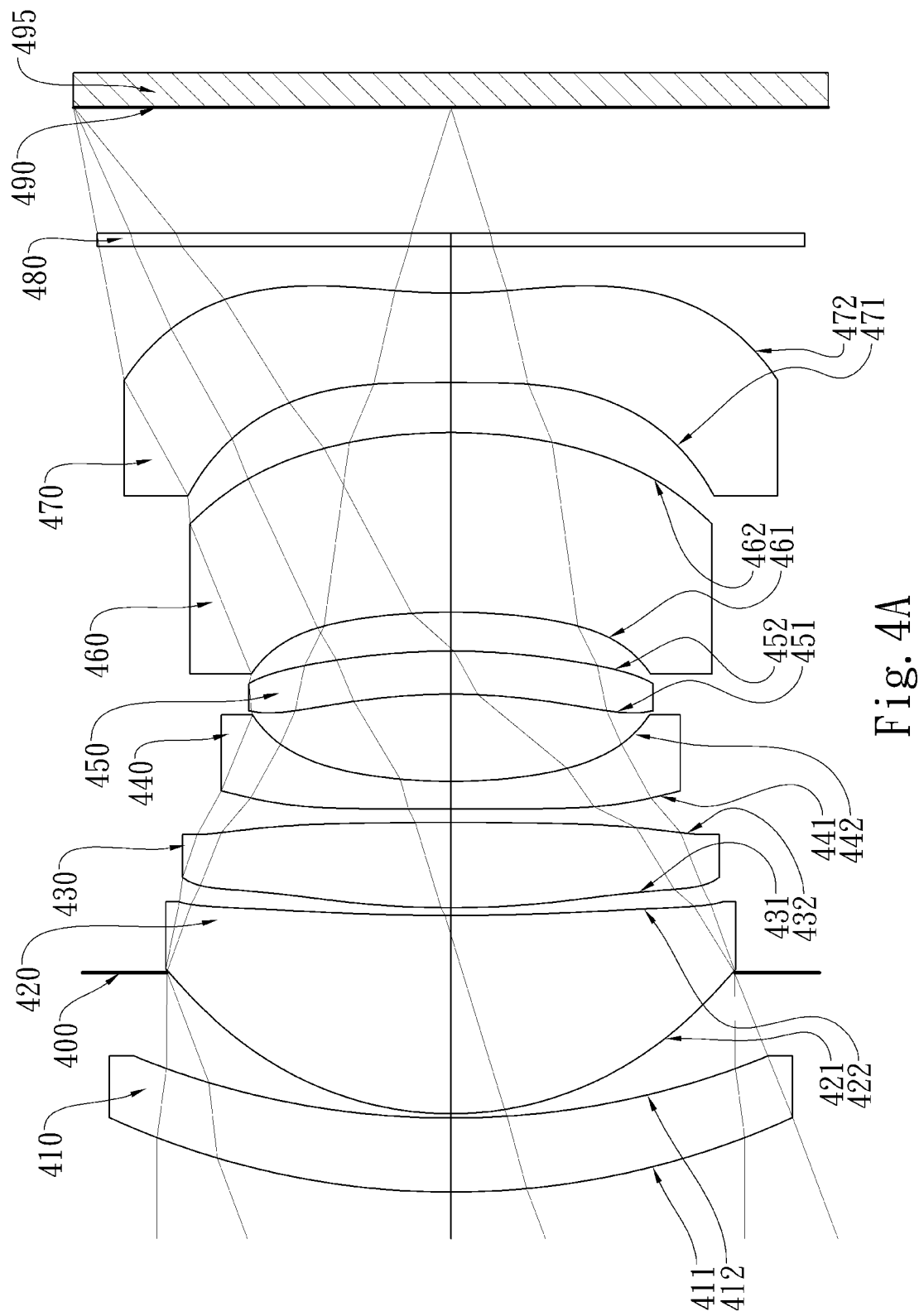
FIG. 4A is a schematic view of an imaging apparatus according to the 4th embodiment of the present disclosure.
Figure 4B:
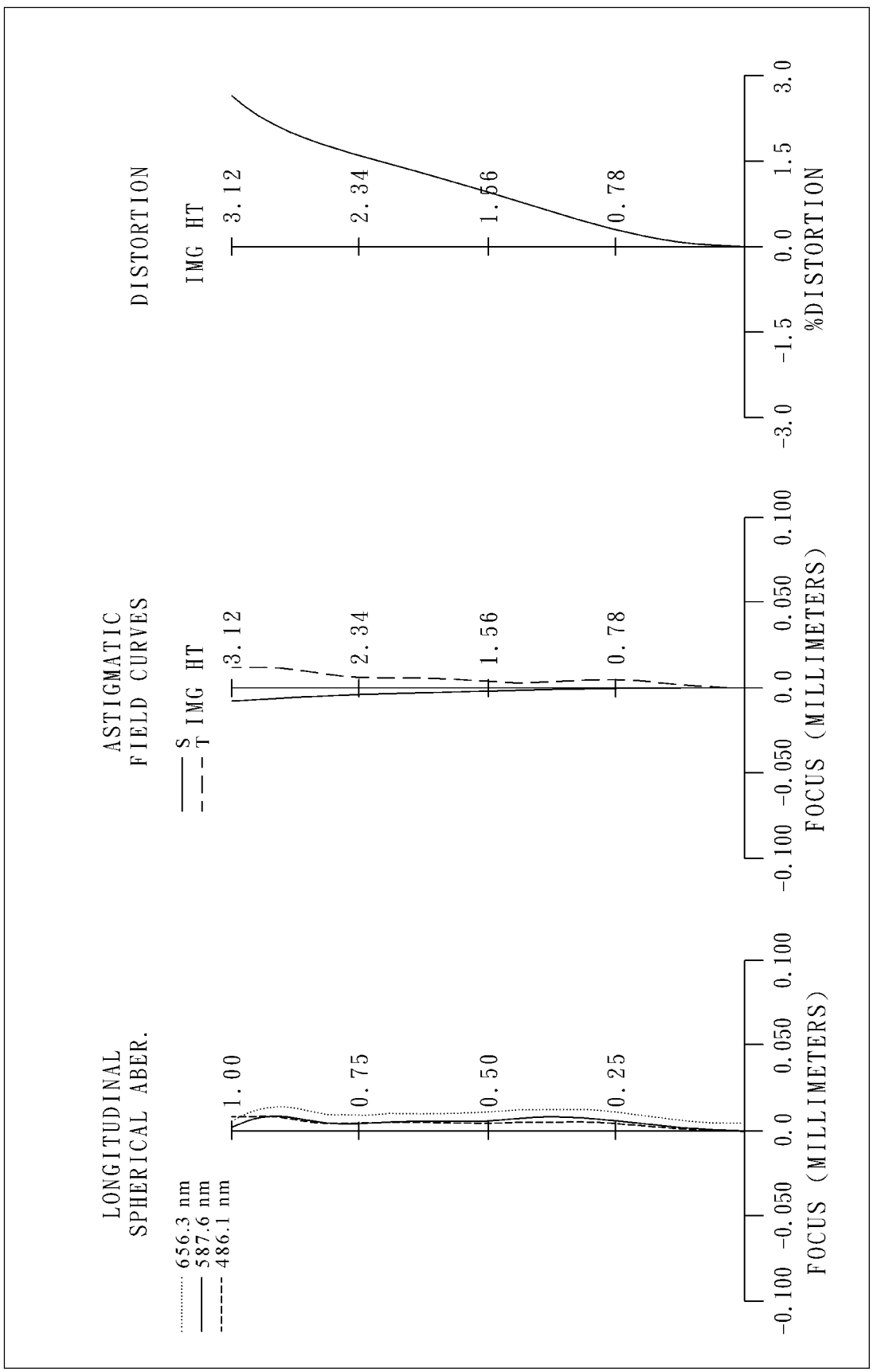
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes a photographing optical lens system (not otherwise herein labeled) of the present disclosure and an image sensor 495. The photographing optical lens system includes, in order from an object side to an image side, a first lens element 410, an aperture stop 400, a second lens element 420, a third lens element 430, a fourth lens element 440, a fifth lens element 450, a sixth lens element 460, and a seventh lens element 470. No other lens elements are inserted between the first lens element 410 and the seventh lens element 470.

The first lens element 410 with positive refractive power has an object-side surface 411 being convex in a paraxial region thereof, and an image-side surface 412 being concave in a paraxial region thereof. Both the object-side surface 411 and the image-side surface 412 are aspheric. The first lens element 410 is made of plastic material.

The second lens element 420 with positive refractive power has an object-side surface 421 being convex in a paraxial region thereof, and an image-side surface 422 being concave in a paraxial region thereof. Both the object-side surface 421 and the image-side surface 422 are aspheric, and there are at least one inflection point on both the object-side surface 421 and the image-side surface 422 thereof. The second lens element 420 is made of plastic material.

The third lens element 430 with positive refractive power has an object-side surface 431 being convex in a paraxial region thereof, and an image-side surface 432 being convex in a paraxial region thereof. Both the object-side surface 431 and the image-side surface 432 are aspheric, and there are at least one inflection point on both the object-side surface 431 and the image-side surface 432 thereof. The third lens element 430 is made of plastic material.

The fourth lens element 440 with negative refractive power has an object-side surface 441 being convex in a paraxial region thereof, and an image-side surface 442 being concave in a paraxial region thereof. Both the object-side surface 441 and the image-side surface 442 are aspheric, and there is at least one inflection point on the object-side surface 441 thereof. The fourth lens element 440 is made of plastic material.

The fifth lens element 450 with negative refractive power has an object-side surface 451 being concave in a paraxial region thereof, and an image-side surface 452 being convex in a paraxial region thereof. Both the object-side surface 451 and the image-side surface 452 are aspheric, and there is at least one inflection point on the object-side surface 451 thereof. The fifth lens element 450 is made of plastic material.

The sixth lens element 460 with positive refractive power has an object-side surface 461 being concave in a paraxial region thereof, and an image-side surface 462 being convex in a paraxial region thereof. Both the object-side surface 461 and the image-side surface 462 are aspheric. The sixth lens element 460 is made of plastic material.

The seventh lens element 470 with negative refractive power has an object-side surface 471 being convex in a paraxial region thereof, an image-side surface 472 being concave in a paraxial region thereof, and at least one convex surface in an off-axis region of the image-side surface 472 thereof. Both the object-side surface 471 and the image-side surface 472 are aspheric, and there are one inflection point on the object-side surface 471 thereof, and one inflection point on the image-side surface 472 thereof. The seventh lens element 470 is made of plastic material.

The photographing optical lens system further includes a filter 480 disposed between the seventh lens element 470 and an image surface 490. The filter 480 is made of glass material and does not affect a focal length of the photographing optical lens system. The image sensor 495 is disposed on or near the image surface 490 of the photographing optical lens system.

The fifth lens element 450 has the smallest effective radius among the seven lens elements. Also, at least two lens elements of the seven lens elements have Abbe numbers between 10.0 and 20.0. (An Abbe number V4 of the fourth lens element 440 is 18.7, and an Abbe number V6 of the sixth lens element 460 is 18.7.)

The detailed optical data of the 4th embodiment are shown in TABLE 7, and the aspheric surface data are shown in TABLE 8.

TABLE 7

(4th Embodiment)
f = 8.12 mm, Fno = 1.67, HFOV = 20.5 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 6.720 | ASP | 0.614 | Plastic | 1.545 | 56.0 | 163.24 |
| 2 | | 7.036 | ASP | 1.205 | | | | |
| 3 | Ape. Stop | Planar | | −1.170 | | | | |
| 4 | Lens 2 | 2.773 | ASP | 1.644 | Plastic | 1.545 | 56.0 | 5.64 |
| 5 | | 22.409 | ASP | 0.064 | | | | |
| 6 | Lens 3 | 8.244 | ASP | 0.706 | Plastic | 1.545 | 56.0 | 12.44 |
| 7 | | −36.864 | ASP | 0.111 | | | | |
| 8 | Lens 4 | 103.256 | ASP | 0.230 | Plastic | 1.688 | 18.7 | −6.94 |
| 9 | | 4.558 | ASP | 0.723 | | | | |
| 10 | Lens 5 | −5.498 | ASP | 0.358 | Plastic | 1.544 | 56.0 | −412.20 |
| 11 | | −5.766 | ASP | 0.322 | | | | |
| 12 | Lens 6 | −5.692 | ASP | 1.489 | Plastic | 1.688 | 18.7 | 23.67 |
| 13 | | −4.667 | ASP | 0.413 | | | | |
| 14 | Lens 7 | 340.995 | ASP | 0.743 | Plastic | 1.544 | 56.0 | −8.11 |
| 15 | | 4.351 | ASP | 0.386 | | | | |
| 16 | Filter | Planar | | 0.110 | Glass | 1.517 | 64.2 | — |
| 17 | | Planar | | 1.044 | | | | |
| 18 | Image Surface | Planar | | — | | | | |

\* Reference wavelength is d-line 587.6 nm.

TABLE 8

Aspheric Coefficient

| Surface # | 1 | 2 | 4 | 5 | 6 |
|---|---|---|---|---|---|
| k= | −2.1060E−01 | 2.3248E−01 | −3.1590E−01 | 1.7179E+01 | −3.1282E+00 |
| A4= | −1.6246E−05 | 1.5063E−05 | 6.5324E−04 | 6.4811E−03 | 1.0171E−02 |
| A6= | −1.0131E−05 | 9.9693E−06 | 2.8037E−04 | −5.9609E−03 | −7.8709E−03 |
| A8= | 1.6588E−06 | −5.3980E−07 | −2.2820E−05 | 1.4779E−03 | 3.3273E−04 |
| A10= | | | | −1.7096E−05 | −4.1290E−06 | 6.2290E−04 |
| A12= | | | | 7.3407E−06 | −5.3373E−05 | −1.7501E−04 |
| A14= | | | | −8.8608E−07 | 6.3772E−06 | 1.6393E−05 |

| Surface # | 7 | 8 | 9 | 10 | 11 |
|---|---|---|---|---|---|
| k= | 6.3626E+01 | −6.1720E+01 | −3.0457E+01 | 2.6604E+00 | 9.6274E+00 |
| A4= | 1.2811E−02 | −8.7587E−04 | 3.1314E−02 | −6.7765E−03 | 4.5147E−03 |
| A6= | −1.4929E−02 | 6.7873E−03 | −1.7262E−03 | 1.4205E−02 | 1.3802E−02 |
| A8= | 6.1878E−03 | −2.1661E−04 | 6.6667E−03 | −4.3416E−03 | −8.6866E−03 |
| A10= | −1.3705E−03 | −4.8752E−04 | −3.0568E−03 | 5.1478E−04 | 2.5133E−03 |
| A12= | 1.5047E−04 | 1.0468E−04 | 6.6313E−04 | 2.0202E−04 | −4.0205E−04 |
| A14= | −5.0392E−06 | −8.8018E−06 | | −2.2550E−05 | 3.8912E−05 |

| Surface # | 12 | 13 | 14 | 15 |
|---|---|---|---|---|
| k= | 8.8085E+00 | −2.2827E+00 | −8.0953E+00 | −2.6636E+01 |
| A4= | −4.0821E−02 | −1.9740E−02 | −8.9336E−02 | −4.1166E−02 |
| A6= | 2.4256E−03 | 1.1515E−02 | 3.8457E−02 | 1.0929E−02 |
| A8= | −6.5941E−03 | −6.4544E−03 | −1.5649E−02 | −2.9434E−03 |
| A10= | 2.8172E−03 | 2.0280E−03 | 4.5536E−03 | 5.3191E−04 |
| A12= | −9.1086E−04 | −4.1727E−04 | −9.3594E−04 | −6.3658E−05 |

TABLE 8-continued

Aspheric Coefficient

| A14= | 1.1036E−04 | 5.0514E−05 | 1.1521E−04 | 4.4870E−06 |
| A16= | | −2.5840E−06 | −6.3029E−06 | −1.4326E−07 |

In the 4th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 8.12 | ImgH/f | 0.38 |
| Fno. | 1.67 | SD/TD | 0.76 |
| HFOV [deg.] | 20.5 | TL*Fno/f | 1.85 |
| V4 | 18.7 | TL/ImgH | 2.88 |
| V6 | 18.7 | Y11/ImgH | 0.91 |
| Vmin | 18.7 | EPD/Ymax | 1.72 |
| Nmax | 1.688 | SAG72/CT7 | −0.97 |
| CTmax/CT2 | 1.00 | tan(HFOV) | 0.37 |
| (CTmin/f)*100 | 2.83 | f12/f345 | −0.32 |
| (T45 + T56)/(T12 + T23 + T34) | 4.98 | Vp | 56.0/56.0/56.0/18.7 |
| (R3 + R4)/(R3 − R4) | −1.28 | f/EPD | 1.67 |
| \|f2/f1\| | 0.03 | Yp61/f | — |
| \|f/fi\|min | 0.02 | Yp62/f | — |
| (\|f/f1\| + \|f/f3\| + \|f/f4\| + \|f/f5\| + \|f/f6\| + \|f/f7\|)/\|f/f2\| | 2.25 | Yp71/f | 0.01 |
| TL/f | 1.11 | Yp72/f | 0.007 |
| BL/TD | 0.21 | | |

5th Embodiment

Figure 5A:
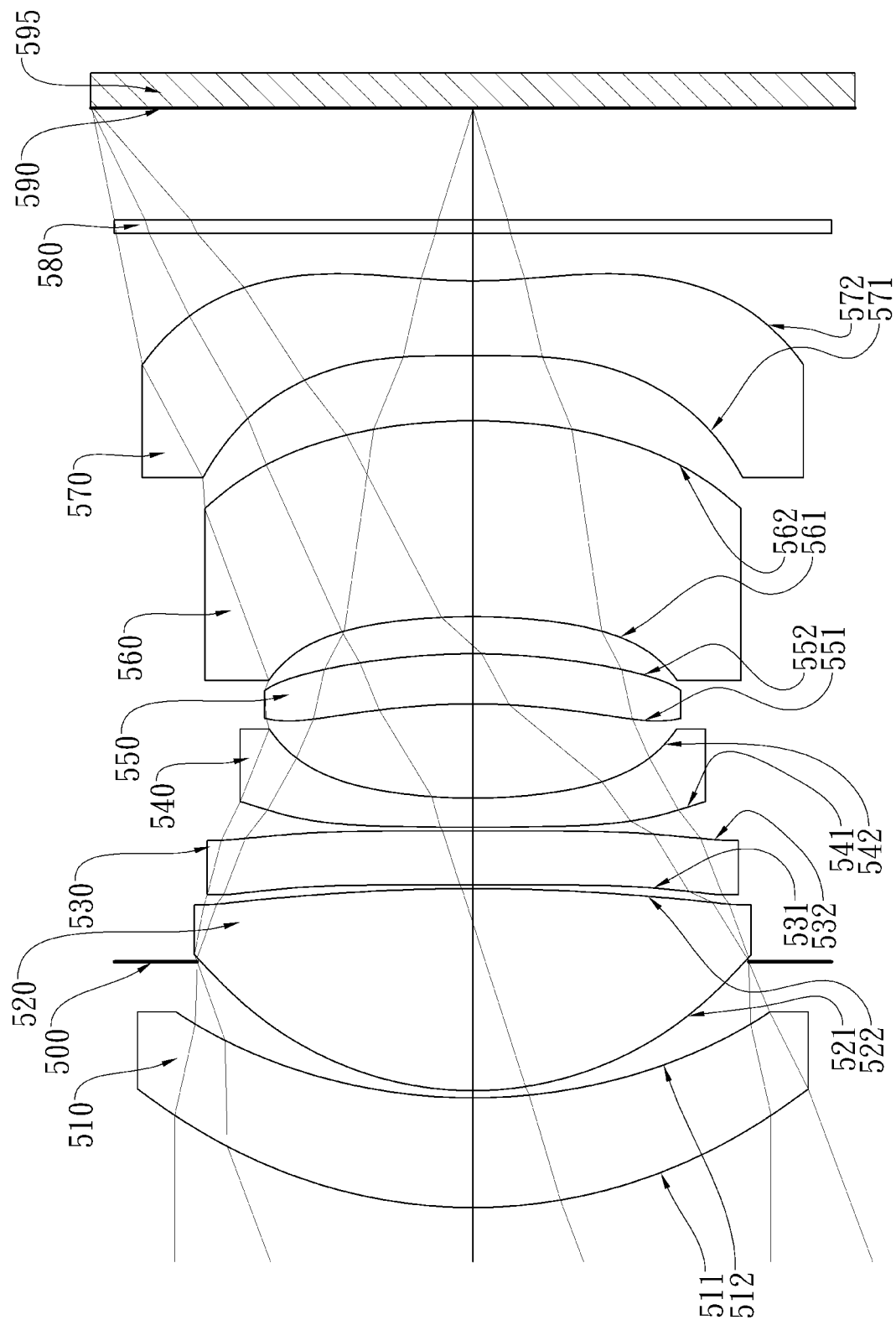
FIG. 5A is a schematic view of an imaging apparatus according to the 5th embodiment of the present disclosure.

FIG. 5A is a schematic view of an imaging apparatus according to the 5th embodiment of the present disclosure.

Figure 5B:
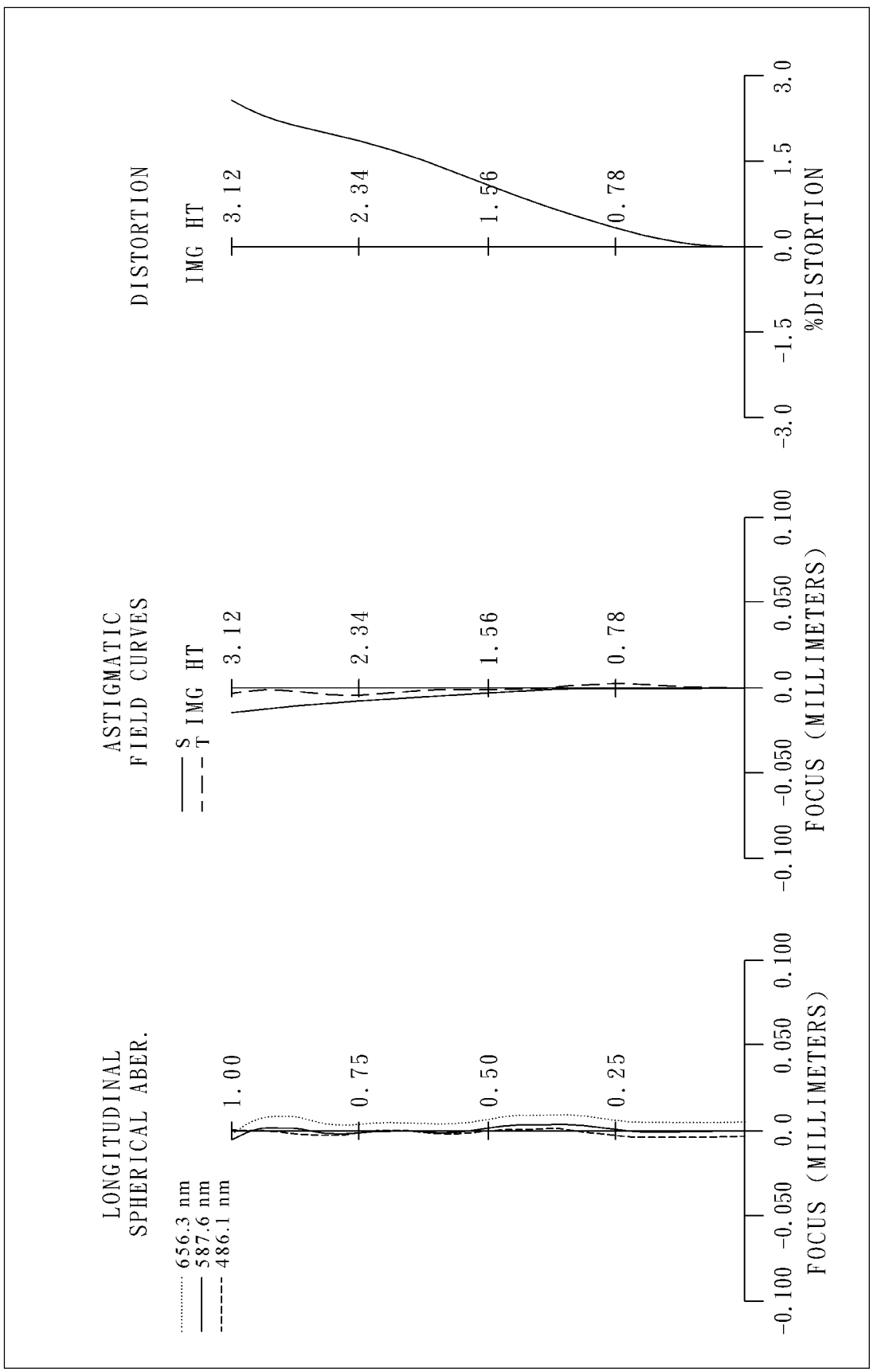
FIG. 5B shows longitudinal spherical aberration curves, astigmatic field curves and a distortion curve of the imaging apparatus according to the 5th embodiment.

FIG. 5B shows, in order from left to right, longitudinal spherical aberration curves, astigmatic field curves and a distortion curve of the imaging apparatus according to the 5th embodiment.

In FIG. 5A, the imaging apparatus includes a photographing optical lens system (not otherwise herein labeled) of the present disclosure and an image sensor 595. The photographing optical lens system includes, in order from an object side to an image side, a first lens element 510, an aperture stop 500, a second lens element 520, a third lens element 530, a fourth lens element 540, a fifth lens element 550, a sixth lens element 560, and a seventh lens element 570. No other lens elements are inserted between the first lens element 510 and the seventh lens element 570.

The first lens element 510 with positive refractive power has an object-side surface 511 being convex in a paraxial region thereof, and an image-side surface 512 being concave in a paraxial region thereof. Both the object-side surface 511 and the image-side surface 512 are aspheric. The first lens element 510 is made of plastic material.

The second lens element 520 with positive refractive power has an object-side surface 521 being convex in a paraxial region thereof, and an image-side surface 522 being convex in a paraxial region thereof. Both the object-side surface 521 and the image-side surface 522 are aspheric, and there are at least one inflection point on both the object-side surface 521 and the image-side surface 522 thereof. The second lens element 520 is made of plastic material.

The third lens element 530 with negative refractive power has an object-side surface 531 being concave in a paraxial region thereof, and an image-side surface 532 being convex in a paraxial region thereof. Both the object-side surface 531 and the image-side surface 532 are aspheric, and there are at least one inflection point on both the object-side surface 531 and the image-side surface 532 thereof. The third lens element 530 is made of plastic material.

The fourth lens element 540 with negative refractive power has an object-side surface 541 being convex in a paraxial region thereof, and an image-side surface 542 being concave in a paraxial region thereof. Both the object-side surface 541 and the image-side surface 542 are aspheric, and there is at least one inflection point on the object-side surface 541 thereof. The fourth lens element 540 is made of plastic material.

The fifth lens element 550 with positive refractive power has an object-side surface 551 being concave in a paraxial region thereof, and an image-side surface 552 being convex in a paraxial region thereof. Both the object-side surface 551 and the image-side surface 552 are aspheric, and there is at least one inflection point on the object-side surface 551 thereof. The fifth lens element 550 is made of plastic material.

The sixth lens element 560 with positive refractive power has an object-side surface 561 being concave in a paraxial region thereof, and an image-side surface 562 being convex in a paraxial region thereof. Both the object-side surface 561 and the image-side surface 562 are aspheric. The sixth lens element 560 is made of plastic material.

The seventh lens element 570 with negative refractive power has an object-side surface 571 being concave in a paraxial region thereof, an image-side surface 572 being concave in a paraxial region thereof, and at least one convex surface in an off-axis region of the image-side surface 572 thereof. Both the object-side surface 571 and the image-side surface 572 are aspheric, and there is one inflection point on the image-side surface 572 thereof. The seventh lens element 570 is made of plastic material.

The photographing optical lens system further includes a filter 580 disposed between the seventh lens element 570 and an image surface 590. The filter 580 is made of glass material and does not affect the focal length of the photographing optical lens system. The image sensor 595 is disposed on or near the image surface 590 of the photographing optical lens system.

The fifth lens element 550 has the smallest effective radius among the seven lens elements. Also, at least two lens elements of the seven lens elements have Abbe numbers between 10.0 and 20.0. (An Abbe number V4 of the fourth lens element 540 is 18.7, and an Abbe number V6 of the sixth lens element 560 is 18.7.)

The detailed optical data of the 5th embodiment are shown in TABLE 9, and the aspheric surface data are shown in TABLE 10.

TABLE 9

(5th Embodiment)
f = 8.13 mm, Fno = 1.67, HFOV = 20.5 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 4.223 | ASP | 0.896 | Plastic | 1.545 | 56.0 | 48.12 |
| 2 | | 4.658 | ASP | 1.111 | | | | |
| 3 | Ape. Stop | Planar | | −1.052 | | | | |
| 4 | Lens 2 | 2.786 | ASP | 1.650 | Plastic | 1.545 | 56.0 | 4.46 |
| 5 | | −15.071 | ASP | 0.030 | | | | |
| 6 | Lens 3 | −94.943 | ASP | 0.440 | Plastic | 1.545 | 56.0 | −54149448.34 |
| 7 | | −95.099 | ASP | 0.030 | | | | |
| 8 | Lens 4 | 23.931 | ASP | 0.239 | Plastic | 1.688 | 18.7 | −8.11 |
| 9 | | 4.505 | ASP | 0.769 | | | | |
| 10 | Lens 5 | −5.899 | ASP | 0.410 | Plastic | 1.544 | 56.0 | 112.63 |
| 11 | | −5.512 | ASP | 0.303 | | | | |
| 12 | Lens 6 | −5.665 | ASP | 1.600 | Plastic | 1.688 | 18.7 | 33.95 |
| 13 | | −5.084 | ASP | 0.532 | | | | |
| 14 | Lens 7 | −117.561 | ASP | 0.611 | Plastic | 1.544 | 56.0 | −7.43 |
| 15 | | 4.191 | ASP | 0.386 | | | | |
| 16 | Filter | Planar | | 0.110 | Glass | 1.517 | 64.2 | — |
| 17 | | Planar | | 0.916 | | | | |
| 18 | Image Surface | Planar | | — | | | | |

\* Reference wavelength is d-line 587.6 nm.

TABLE 10

Aspheric Coefficient

| Surface # | 1 | 2 | 4 | 5 | 6 |
|---|---|---|---|---|---|
| k= | −1.7810E−01 | 1.9830E−01 | −2.8910E−01 | −8.0649E+01 | −3.1282E+00 |
| A4= | 8.8947E−05 | −1.2242E−04 | 8.8729E−04 | −1.4454E−03 | 6.2793E−03 |
| A6= | −2.3778E−05 | 1.6835E−05 | −2.8078E−04 | 1.0611E−03 | −4.8483E−03 |
| A8= | −1.9887E−06 | 8.3884E−06 | 4.5237E−04 | −1.0923E−03 | −1.0869E−03 |
| A10= | | | −2.0033E−04 | 5.3117E−04 | 1.0819E−03 |
| A12= | | | 4.4692E−05 | −1.1679E−04 | −2.4164E−04 |
| A14= | | | −3.8929E−06 | 9.5093E−06 | 1.9106E−05 |

| Surface # | 7 | 8 | 9 | 10 | 11 |
|---|---|---|---|---|---|
| k= | 9.0000E+01 | −6.1720E+01 | −3.0457E+01 | 2.6604E+00 | 8.5289E+00 |
| A4= | 1.3250E−02 | −1.1478E−02 | 2.4505E−02 | 5.3358E−03 | 1.5711E−02 |
| A6= | −1.7426E−02 | 1.8699E−02 | 6.7223E−03 | 9.0156E−04 | −3.1449E−03 |
| A8= | 6.8534E−03 | −6.9198E−03 | 1.5540E−03 | 1.1136E−03 | 2.9209E−04 |
| A10= | −1.2787E−03 | 1.9652E−03 | −1.1781E−03 | −4.0210E−04 | 5.9736E−05 |
| A12= | 1.1314E−04 | −3.9474E−04 | 3.2439E−04 | 2.4032E−04 | 1.1137E−04 |
| A14= | −3.4336E−06 | 3.2070E−05 | | −2.9468E−05 | −3.0211E−05 |

| Surface # | 12 | 13 | 14 | 15 |
|---|---|---|---|---|
| k= | 8.3021E+00 | −2.2827E+00 | −8.0953E+00 | −2.6636E+01 |
| A4= | −3.4928E−03 | −1.5491E−02 | −9.3581E−02 | −4.6708E−02 |
| A6= | −4.5184E−03 | 5.9964E−03 | 3.8063E−02 | 1.4127E−02 |
| A8= | −3.6071E−04 | −3.0334E−03 | −1.4138E−02 | −3.8573E−03 |
| A10= | −3.1495E−04 | 8.5625E−04 | 3.8527E−03 | 7.1369E−04 |
| A12= | 2.0692E−04 | −1.5410E−04 | −7.3894E−04 | −8.8022E−05 |
| A14= | −6.1234E−05 | 1.5036E−05 | 8.2668E−05 | 6.3567E−06 |
| A16= | | −5.2401E−07 | −4.0194E−06 | −2.0232E−07 |

In the 5th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 8.13 | ImgH/f | 0.38 |
| Fno. | 1.67 | SD/TD | 0.73 |
| HFOV [deg.] | 20.5 | TL*Fno/f | 1.85 |
| V4 | 18.7 | TL/ImgH | 2.88 |
| V6 | 18.7 | Y11/ImgH | 0.88 |
| Vmin | 18.7 | EPD/Ymax | 1.78 |
| Nmax | 1.688 | SAG72/CT7 | −1.12 |
| CTmax/CT2 | 1.00 | tan(HFOV) | 0.37 |
| (CTmin/f)*100 | 2.94 | f12/f345 | −0.49 |
| (T45 + T56)/(T12 + T23 + T34) | 9.01 | Vp | 56.0/56.0/56.0/18.7 |
| (R3 + R4)/(R3 − R4) | −0.69 | f/EPD | 1.67 |
| \|f2/f1\| | 0.09 | Yp61/f | — |
| \|f/fi\|min | 0.00 | Yp62/f | — |
| (\|f/f1\| + \|f/f3\| + \|f/f4\| + \|f/f5\| + \|f/f6\| + \|f/f7\|)/\|f/f2\| | 1.42 | Yp71/f | — |
| TL/f | 1.10 | Yp72/f | 0.068 |
| BL/TD | 0.19 | | |

6th Embodiment

Figure 6A:
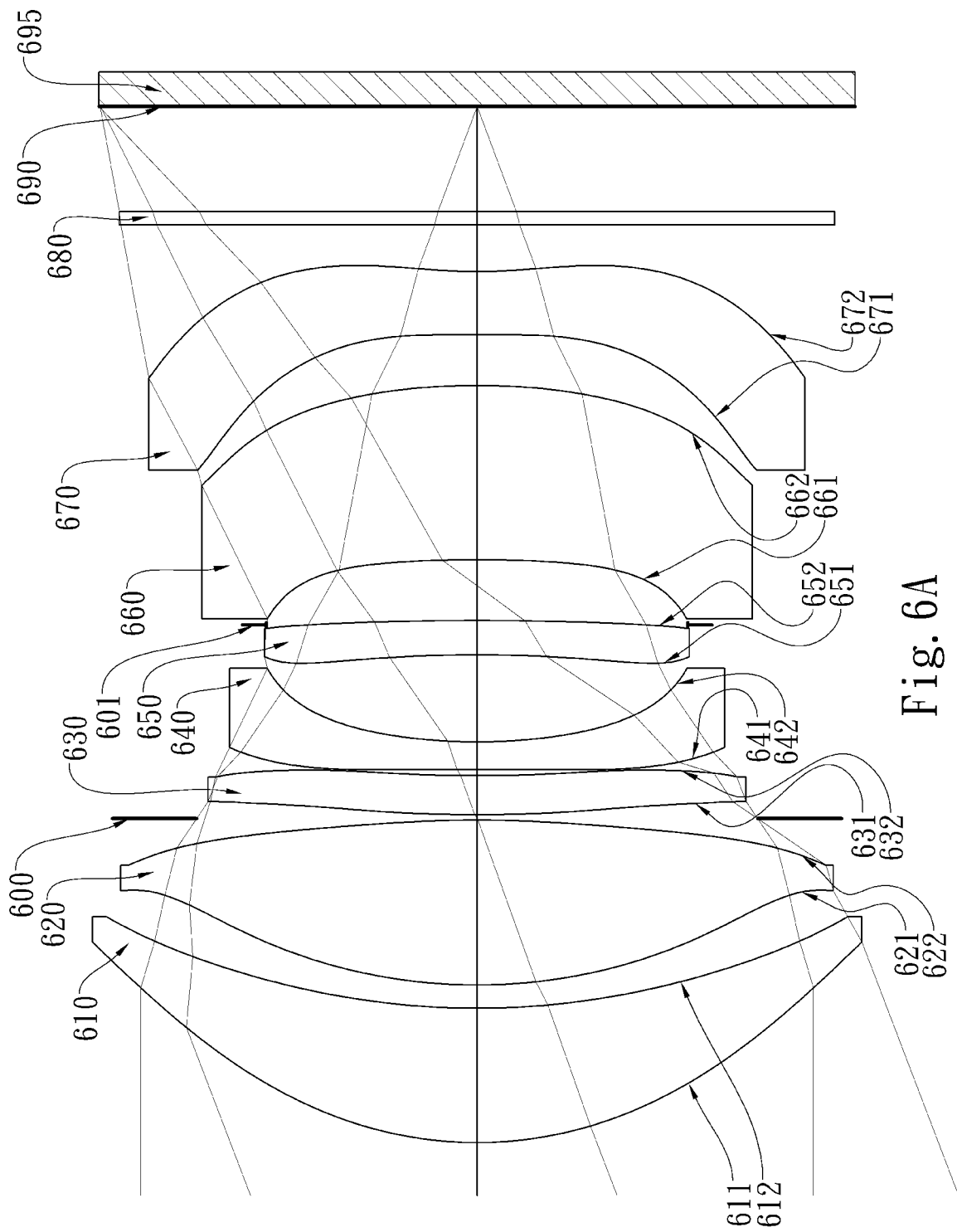
FIG. 6A is a schematic view of an imaging apparatus according to the 6th embodiment of the present disclosure.
Figure 6B:
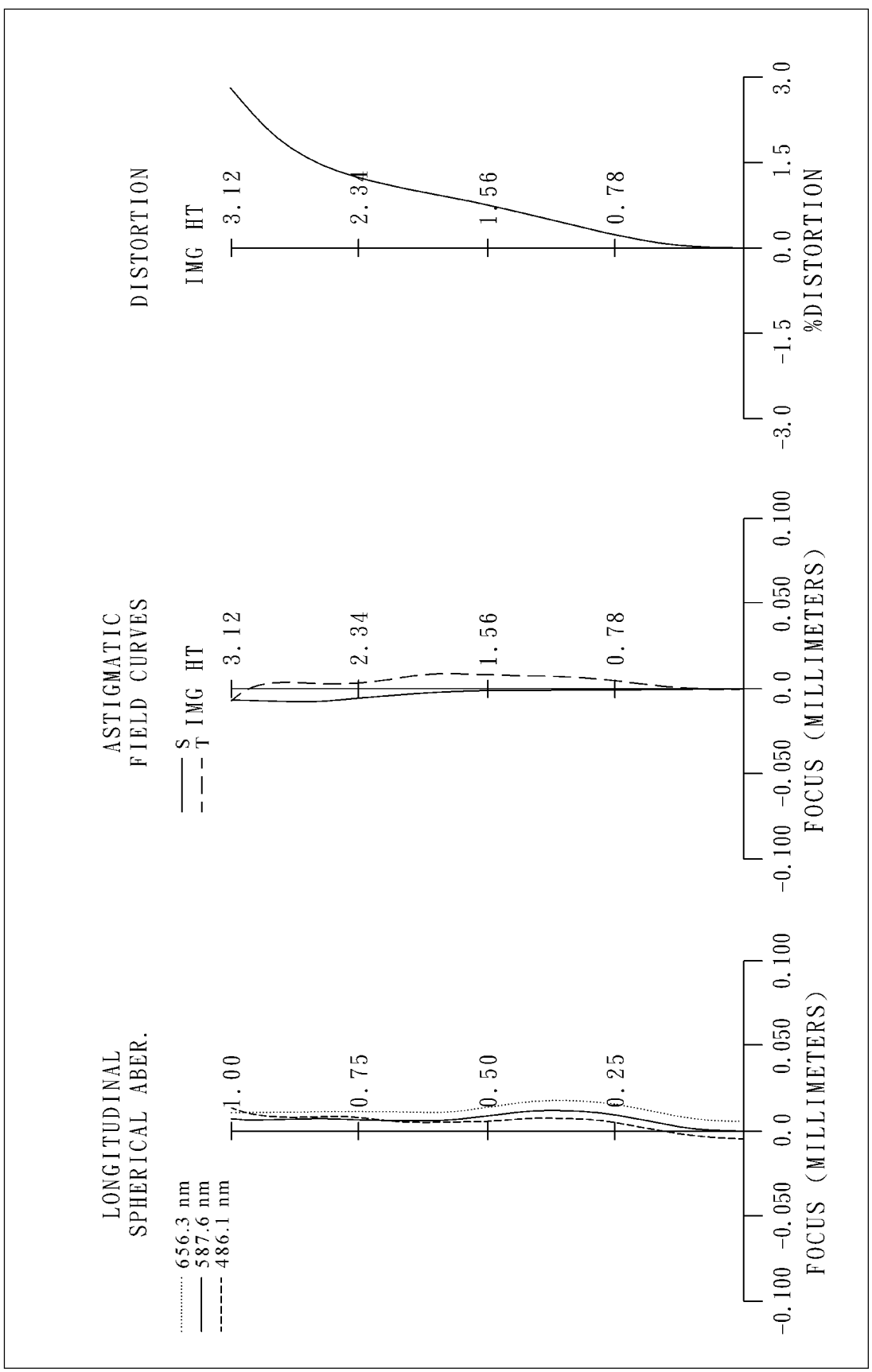
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes a photographing optical lens system (not otherwise herein labeled) of the present disclosure and an image sensor 695. The photographing optical lens system includes, in order from an object side to an image side, a first lens element 610, a second lens element 620, an aperture stop 600, a third lens element 630, a fourth lens element 640, a fifth lens element 650, a stop 601, a sixth lens element 660, and a seventh lens element 670. No other lens elements are inserted between the first lens element 610 and the seventh lens element 670.

The first lens element 610 with positive refractive power has an object-side surface 611 being convex in a paraxial region thereof, and an image-side surface 612 being concave in a paraxial region thereof. Both the object-side surface 611 and the image-side surface 612 are aspheric. The first lens element 610 is made of plastic material.

The second lens element 620 with positive refractive power has an object-side surface 621 being convex in a paraxial region thereof, and an image-side surface 622 being convex in a paraxial region thereof. Both the object-side surface 621 and the image-side surface 622 are aspheric, and there is at least one inflection point on the object-side surface 621 thereof. The second lens element 620 is made of plastic material.

The third lens element 630 with negative refractive power has an object-side surface 631 being convex in a paraxial region thereof, and an image-side surface 632 being concave in a paraxial region thereof. Both the object-side surface 631 and the image-side surface 632 are aspheric, and there are at least one inflection point on both the object-side surface 631 and the image-side surface 632 thereof. The third lens element 630 is made of plastic material.

The fourth lens element 640 with negative refractive power has an object-side surface 641 being convex in a paraxial region thereof, and an image-side surface 642 being concave in a paraxial region thereof. Both the object-side surface 641 and the image-side surface 642 are aspheric, and there is at least one inflection point on the object-side surface 641 thereof. The fourth lens element 640 is made of plastic material.

The fifth lens element 650 with negative refractive power has an object-side surface 651 being concave in a paraxial region thereof, and an image-side surface 652 being convex in a paraxial region thereof. Both the object-side surface 651 and the image-side surface 652 are aspheric, and there is at least one inflection point on the object-side surface 651 thereof. The fifth lens element 650 is made of plastic material.

The sixth lens element 660 with positive refractive power has an object-side surface 661 being concave in a paraxial region thereof, and an image-side surface 662 being convex in a paraxial region thereof. Both the object-side surface 661 and the image-side surface 662 are aspheric, and there is one inflection point on the image-side surface 662 thereof. The sixth lens element 660 is made of plastic material.

The sixth lens element 670 with negative refractive power has an object-side surface 671 being convex in a paraxial region thereof, an image-side surface 672 being concave in a paraxial region thereof, and at least one convex surface in an off-axis region of the image-side surface 672 thereof. Both the object-side surface 671 and the image-side surface 672 are aspheric, and there are three inflection points on the object-side surface 671 thereof, and one inflection point 672 in the image-side surface 672 thereof. The seventh lens element 670 is made of plastic material.

The photographing optical lens system further includes a filter 680 disposed between the seventh lens element 670 and an image surface 690. The filter 680 is made of glass material and does not affect a focal length of the photographing optical lens system. The image sensor 695 is disposed on or near the image surface 690 of the photographing optical lens system.

The fifth lens element 650 has the smallest effective radius among the seven lens elements. Also, at least two lens elements of the seven lens elements have Abbe numbers between 10.0 and 20.0. (An Abbe number V4 of the fourth lens element 640 is 18.7, and an Abbe number V6 of the sixth lens element 660 is 18.7.)

The detailed optical data of the 6th embodiment are shown in TABLE 11, and the aspheric surface data are shown in TABLE 12.

TABLE 11

(6th Embodiment)
f = 7.94 mm, Fno = 1.43, HFOV = 20.8 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 3.228 | ASP | 1.114 | Plastic | 1.545 | 56.0 | 10.68 |
| 2 | | 6.369 | ASP | 0.194 | | | | |
| 3 | Lens 2 | 4.521 | ASP | 1.367 | Plastic | 1.545 | 56.0 | 5.81 |
| 4 | | −9.430 | ASP | 0.012 | | | | |
| 5 | Ape. Stop | Planar | | 0.033 | | | | |
| 6 | Lens 3 | 13.398 | ASP | 0.323 | Plastic | 1.545 | 56.0 | −264.04 |
| 7 | | 12.152 | ASP | 0.050 | | | | |
| 8 | Lens 4 | 497.913 | ASP | 0.230 | Plastic | 1.688 | 18.7 | −6.47 |
| 9 | | 4.412 | ASP | 0.722 | | | | |
| 10 | Lens 5 | −12.192 | ASP | 0.285 | Plastic | 1.544 | 56.0 | −45.62 |
| 11 | | −24.163 | ASP | −0.037 | | | | |
| 12 | Stop | Planar | | 0.541 | | | | |
| 13 | Lens 6 | −11.825 | ASP | 1.445 | Plastic | 1.688 | 18.7 | 15.74 |
| 14 | | −5.934 | ASP | 0.421 | | | | |
| 15 | Lens 7 | 89.420 | ASP | 0.524 | Plastic | 1.544 | 56.0 | −7.76 |
| 16 | | 4.025 | ASP | 0.386 | | | | |
| 17 | Filter | Planar | | 0.110 | Glass | 1.517 | 64.2 | — |
| 18 | | Planar | | 0.872 | | | | |
| 19 | Image Surface | Planar | | — | | | | |

\* Reference wavelength is d-line 587.6 nm.
Remark: The effective radius of the stop, Surface 12, is 1.746 mm.

TABLE 12

Aspheric Coefficient

| Surface # | 1 | 2 | 3 | 4 | 6 |
|---|---|---|---|---|---|
| k= | −3.3898E−01 | −2.1652E−01 | −2.0915E−01 | −9.0000E+01 | −3.4924E+00 |
| A4= | −3.7829E−04 | −6.8204E−04 | 5.2706E−05 | −1.1232E−03 | 1.1218E−02 |
| A6= | −6.1501E−05 | −4.3418E−05 | 3.5141E−04 | 1.2599E−03 | −9.5834E−03 |
| A8= | −1.9370E−05 | 1.0010E−05 | −8.5755E−05 | −5.7329E−04 | 1.9267E−03 |
| A10= | | | 3.0395E−05 | 1.0580E−04 | 1.9073E−05 |
| A12= | | | −7.2610E−06 | −9.9711E−06 | −4.2544E−05 |
| A14= | | | 4.2701E−07 | 3.7495E−07 | 3.1135E−06 |

| Surface # | 7 | 8 | 9 | 10 | 11 |
|---|---|---|---|---|---|
| k= | −5.7870E+01 | −6.1782E+01 | −3.0482E+01 | 2.6279E+00 | 9.0000E+01 |
| A4= | 1.0029E−02 | −1.6937E−02 | 1.8747E−02 | −3.0033E−03 | 6.7666E−03 |
| A6= | −1.8875E−02 | 2.6238E−02 | 1.3179E−02 | 4.1745E−03 | −2.3893E−03 |
| A8= | 8.1896E−03 | −1.3082E−02 | −4.5757E−03 | −2.5278E−03 | −1.2601E−03 |
| A10= | −1.7140E−03 | 3.8031E−03 | 2.7771E−04 | 1.3223E−03 | 8.0280E−04 |
| A12= | 1.7275E−04 | −5.8813E−04 | 2.3795E−04 | −1.7399E−04 | −3.9308E−05 |

TABLE 12-continued

| Aspheric Coefficient | | | | |
|---|---|---|---|---|
| A14= | −6.8044E−06 | 3.7484E−05 | 1.0775E−05 | −2.4244E−05 |

| Surface # | 13 | 14 | 15 | 16 |
|---|---|---|---|---|
| k= | 1.4036E+01 | −2.2109E+00 | −9.1238E+00 | −2.8585E+01 |
| A4= | −7.5121E−03 | −1.4527E−02 | −1.0774E−01 | −5.7285E−02 |
| A6= | −6.5636E−03 | 5.4823E−03 | 4.5621E−02 | 1.7594E−02 |
| A8= | 9.0733E−04 | −3.1242E−03 | −1.6443E−02 | −4.9504E−03 |
| A10= | −1.3636E−03 | 6.3171E−04 | 3.8443E−03 | 9.2146E−04 |
| A12= | 5.5246E−04 | −3.0931E−05 | −5.5820E−04 | −1.0759E−04 |
| A14= | −1.0977E−04 | −9.6354E−06 | 4.1655E−05 | 6.9977E−06 |
| A16= | | 1.3129E−06 | −8.4620E−07 | −1.8992E−07 |

In the 6th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 7.94 | ImgH/f | 0.39 |
| Fno. | 1.43 | SD/TD | 0.63 |
| HFOV [deg.] | 20.8 | TL*Fno/f | 1.54 |
| V4 | 18.7 | TL/ImgH | 2.75 |
| V6 | 18.7 | Y11/ImgH | 1.02 |
| Vmin | 18.7 | EPD/Ymax | 1.75 |
| Nmax | 1.688 | SAG72/CT7 | −1.69 |
| CTmax/CT2 | 1.06 | tan(HFOV) | 0.38 |
| (CTmin/f)*100 | 2.90 | f12/f345 | −0.76 |
| (T45 + T56)/(T12 + T23 + T34) | 4.24 | Vp | 56.0/56.0/18.7 |
| (R3 + R4)/(R3 − R4) | −0.35 | f/EPD | 1.43 |
| \|f2/f1\| | 0.54 | Yp61/f | — |
| \|f/fi\|min | 0.03 | Yp62/f | 0.27 |
| (\|f/f1\| + \|f/f3\| + \|f/f4\| + \|f/f5\| + \|f/f6\| + \|f/f7\|)/\|f/f2\| | 2.71 | Yp71/f | 0.01/0.27/0.64 |
| TL/f | 1.08 | Yp72/f | 0.064 |
| BL/TD | 0.19 | | |

7th Embodiment

Figure 7A:
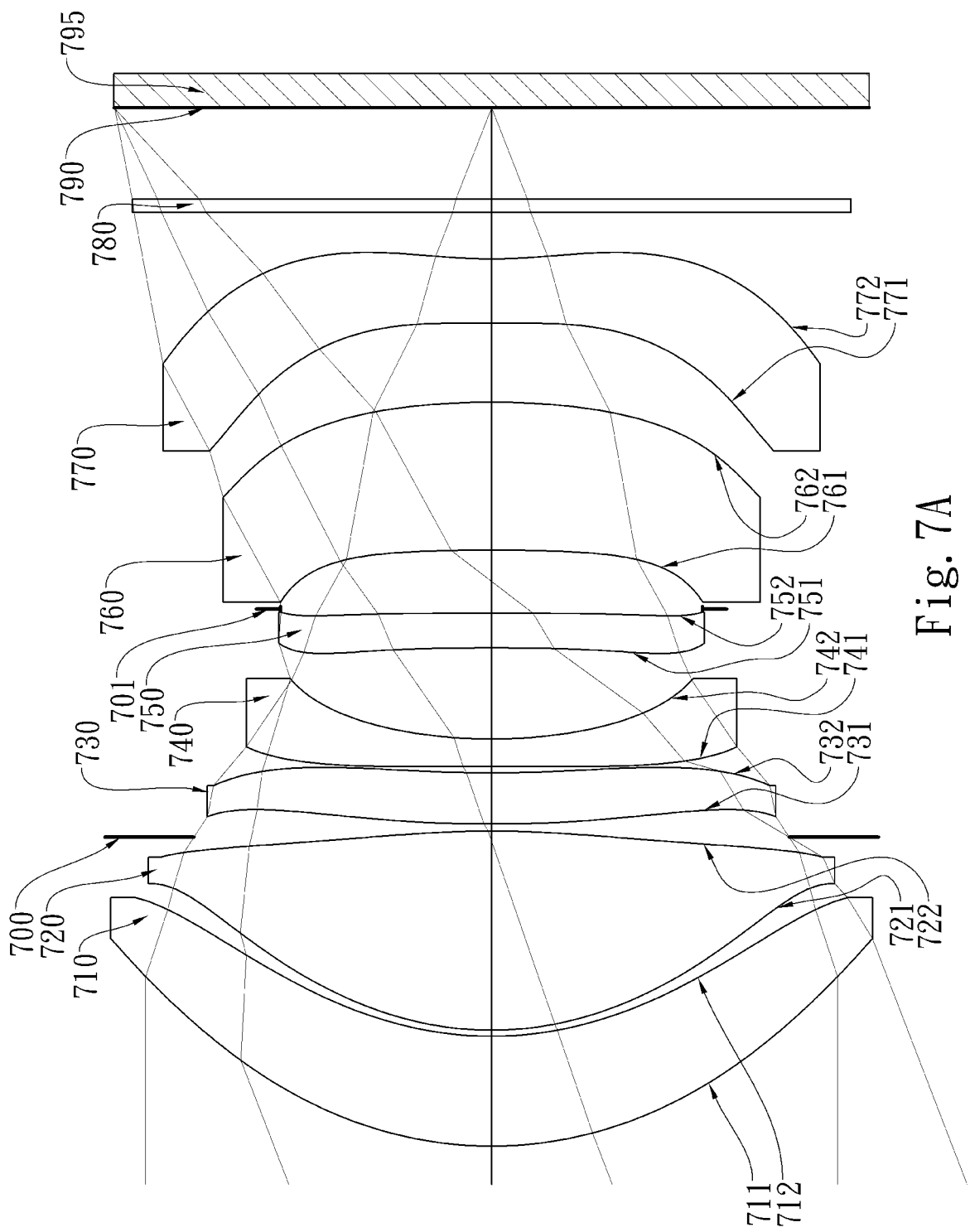
FIG. 7A is a schematic view of an imaging apparatus according to the 7th embodiment of the present disclosure.
Figure 7B:
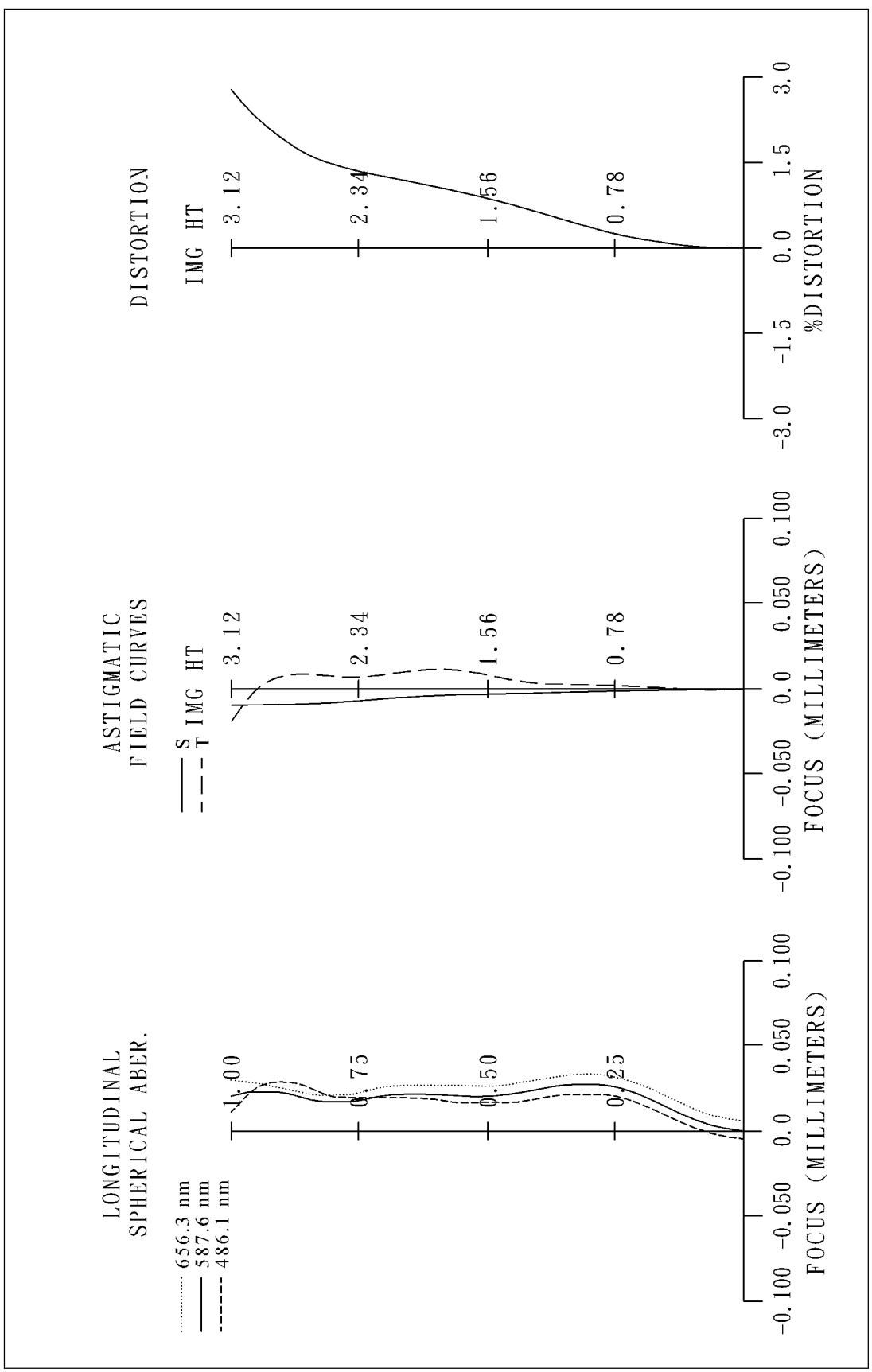
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes a photographing optical lens system (not otherwise herein labeled) of the present disclosure and an image sensor 795. The photographing optical lens system includes, in order from an object side to an image side, a first lens element 710, a second lens element 720, an aperture stop 700, a third lens element 730, a fourth lens element 740, a fifth lens element 750, a stop 701, a sixth lens element 760, and a seventh lens element 770. No other lens elements are inserted between the first lens element 710 and the seventh lens element 770.

The first lens element 710 with positive refractive power has an object-side surface 711 being convex in a paraxial region thereof, and an image-side surface 712 being concave in a paraxial region thereof. Both the object-side surface 711 and the image-side surface 712 are aspheric, and there is at least one inflection point on the image-side surface 712 thereof. The first lens element 710 is made of plastic material.

The second lens element 720 with positive refractive power has an object-side surface 721 being convex in a paraxial region thereof, and an image-side surface 722 being convex in a paraxial region thereof. Both the object-side surface 721 and the image-side surface 722 are aspheric, and there are at least one inflection point on both the object-side surface 721 and the image-side surface 722 thereof. The second lens element 720 is made of plastic material.

The third lens element 730 with negative refractive power has an object-side surface 731 being convex in a paraxial region thereof, and an image-side surface 732 being concave in a paraxial region thereof. Both the object-side surface 731 and the image-side surface 732 are aspheric, and there are at least one inflection point on both the object-side surface 731 and the image-side surface 732 thereof. The third lens element 730 is made of plastic material.

The fourth lens element 740 with negative refractive power has an object-side surface 741 being convex in a paraxial region thereof, and an image-side surface 742 being concave in a paraxial region thereof. Both the object-side surface 741 and the image-side surface 742 are aspheric. The fourth lens element 740 is made of plastic material.

The fifth lens element 750 with negative refractive power has an object-side surface 751 being concave in a paraxial region thereof, and an image-side surface 752 being concave in a paraxial region thereof. Both the object-side surface 751 and the image-side surface 752 are aspheric, and there are at least one inflection point on both the object-side surface 751 and the image-side surface 752 thereof. The fifth lens element 750 is made of plastic material.

The sixth lens element 760 with positive refractive power has an object-side surface 761 being concave in a paraxial region thereof, and an image-side surface 762 being convex in a paraxial region thereof. Both the object-side surface 761 and the image-side surface 762 are aspheric, and there is one inflection point on the image-side surface 762 thereof. The sixth lens element 760 is made of plastic material.

The seventh lens element 770 with negative refractive power has an object-side surface 771 being convex in a paraxial region thereof, an image-side surface 772 being concave in a paraxial region thereof, and at least one convex surface in an off-axis region of the image-side surface 772 thereof. Both the object-side surface 771 and the image-side surface 772 are aspheric, and there are two inflection points on the object-side surface 771 thereof, and one inflection point on the image-side surface 772 thereof. The seventh lens element 770 is made of plastic material.

The photographing optical lens system further includes a filter 780 disposed between the seventh lens element 770 and an image surface 790. The filter 780 is made of glass material and does not affect the focal length of the photographing optical lens system. The image sensor 795 is disposed on or near the image surface 790 of the photographing optical lens system.

The fifth lens element 750 has the smallest effective radius among the seven lens elements. Also, at least two lens elements of the seven lens elements have Abbe numbers between 10.0 and 20.0. (An Abbe number V4 of the fourth lens element 740 is 18.7, and an Abbe number V6 of the sixth lens element 760 is 18.7.)

The detailed optical data of the 7th embodiment are shown in TABLE 13, and the aspheric surface data are shown in TABLE 14.

TABLE 13

(7th Embodiment)
f = 7.84 mm, Fno = 1.37, HFOV = 21.1 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 3.252 | ASP | 0.910 | Plastic | 1.545 | 56.0 | 1069.73 |
| 2 | | 2.948 | ASP | 0.050 | | | | |
| 3 | Lens 2 | 2.694 | ASP | 1.650 | Plastic | 1.545 | 56.0 | 3.86 |
| 4 | | −7.508 | ASP | −0.050 | | | | |
| 5 | Ape. Stop | Planar | | 0.109 | | | | |
| 6 | Lens 3 | 13.130 | ASP | 0.423 | Plastic | 1.545 | 56.0 | −131.00 |
| 7 | | 10.963 | ASP | 0.050 | | | | |
| 8 | Lens 4 | 263.621 | ASP | 0.230 | Plastic | 1.688 | 18.7 | −6.03 |
| 9 | | 4.080 | ASP | 0.754 | | | | |
| 10 | Lens 5 | −35.711 | ASP | 0.287 | Plastic | 1.544 | 56.0 | −51.92 |
| 11 | | 135.580 | ASP | 0.036 | | | | |
| 12 | Stop | Planar | | 0.487 | | | | |
| 13 | Lens 6 | −22.206 | ASP | 1.226 | Plastic | 1.688 | 18.7 | 13.96 |
| 14 | | −6.856 | ASP | 0.654 | | | | |
| 15 | Lens 7 | 41.156 | ASP | 0.533 | Plastic | 1.544 | 56.0 | −8.08 |
| 16 | | 3.955 | ASP | 0.386 | | | | |
| 17 | Filter | Planar | | 0.110 | Glass | 1.517 | 64.2 | — |
| 18 | | Planar | | 0.757 | | | | |
| 19 | Image Surface | Planar | | — | | | | |

* Reference wavelength is d-line 587.6 nm.
Remark: The effective radius of the stop, Surface 12, is 1.746 mm.

TABLE 14

Aspheric Coefficient

| Surface # | 1 | 2 | 3 | 4 | 6 |
|---|---|---|---|---|---|
| k= | −2.7338E−01 | −5.6431E−01 | −4.9848E−01 | −9.0000E+01 | −3.4924E+00 |
| A4= | 6.9117E−05 | −2.1780E−03 | −3.4080E−03 | 5.4663E−04 | 1.3104E−02 |
| A6= | −5.9664E−05 | −3.0545E−04 | 6.4941E−04 | 9.4744E−04 | −9.1910E−03 |
| A8= | −1.8702E−05 | −2.9863E−05 | −3.9540E−04 | −3.7239E−04 | 2.4355E−03 |
| A10= | | | 1.0939E−04 | 6.2206E−05 | −3.2670E−04 |
| A12= | | | −1.6191E−05 | −5.3267E−06 | 1.3190E−05 |
| A14= | | | 7.6311E−07 | 1.6618E−07 | 2.6738E−07 |

| Surface # | 7 | 8 | 9 | 10 | 11 |
|---|---|---|---|---|---|
| k= | −8.2345E+01 | −6.1782E+01 | −3.0482E+01 | 2.6279E+00 | −1.0482E+01 |
| A4= | −1.7969E−04 | −5.9183E−03 | 4.0854E−02 | −2.0485E−02 | −1.7869E−02 |
| A6= | −6.7623E−03 | 1.5008E−02 | −9.0820E−03 | 1.2606E−02 | 1.2461E−02 |
| A8= | 2.7092E−03 | −7.9733E−03 | 5.4665E−03 | −5.4660E−03 | −8.6760E−03 |
| A10= | −5.8598E−04 | 2.2752E−03 | −2.2167E−03 | 2.0986E−03 | 4.2022E−03 |
| A12= | 6.1757E−05 | −3.2326E−04 | 4.8717E−04 | −3.1405E−04 | −1.0029E−03 |
| A14= | −2.5921E−06 | 1.9161E−05 | | 3.1650E−05 | 1.0592E−04 |

TABLE 14-continued

Aspheric Coefficient

| Surface # | 13 | 14 | 15 | 16 |
|---|---|---|---|---|
| k= | 7.0619E+01 | −2.2109E+00 | −9.1238E+00 | −2.8585E+01 |
| A4= | −1.4710E−02 | −1.6396E−02 | −1.0402E−01 | −5.2357E−02 |
| A6= | −2.5667E−03 | 4.7526E−03 | 4.4936E−02 | 1.4884E−02 |
| A8= | −2.2237E−04 | −2.7662E−03 | −1.8586E−02 | −4.1980E−03 |
| A10= | −8.9274E−04 | 5.7770E−04 | 5.7282E−03 | 8.3480E−04 |
| A12= | 3.9579E−04 | −3.4192E−05 | −1.2082E−03 | −1.1267E−04 |
| A14= | −8.2062E−05 | −9.8321E−06 | 1.4594E−04 | 8.9689E−06 |
| A16= | | 1.5202E−06 | −7.2367E−06 | −3.0708E−07 |

In the 7th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 7.84 | ImgH/f | 0.40 |
| Fno. | 1.37 | SD/TD | 0.65 |
| HFOV [deg.] | 21.1 | TL*Fno/f | 1.50 |
| V4 | 18.7 | TL/ImgH | 2.76 |
| V6 | 18.7 | Y11/ImgH | 1.01 |
| Vmin | 18.7 | EPD/Ymax | 1.82 |
| Nmax | 1.688 | SAG72/CT7 | −1.63 |
| CTmax/CT2 | 1.00 | tan(HFOV) | 0.39 |
| (CTmin/f)*100 | 2.93 | f12/f345 | −0.83 |
| (T45 + T56)/(T12 + T23 + T34) | 8.03 | Vp | 56.0/56.0/18.7 |

-continued

| 7th Embodiment | | | |
|---|---|---|---|
| (R3 + R4)/(R3 − R4) | −0.47 | f/EPD | 1.37 |
| \|f2/f1\| | 0.00 | Yp61/f | — |
| \|f/fi\|min | 0.01 | Yp62/f | 0.28 |
| (\|f/f1\| + \|f/f3\| + \|f/f4\| + \|f/f5\| + \|f/f6\| + \|f/f7\|)/\|f/f2\| | 1.50 | Yp71/f | 0.018/0.277 |
| TL/f | 1.10 | Yp72/f | 0.066 |
| BL/TD | 0.17 | | |

8th Embodiment

Figure 8A:
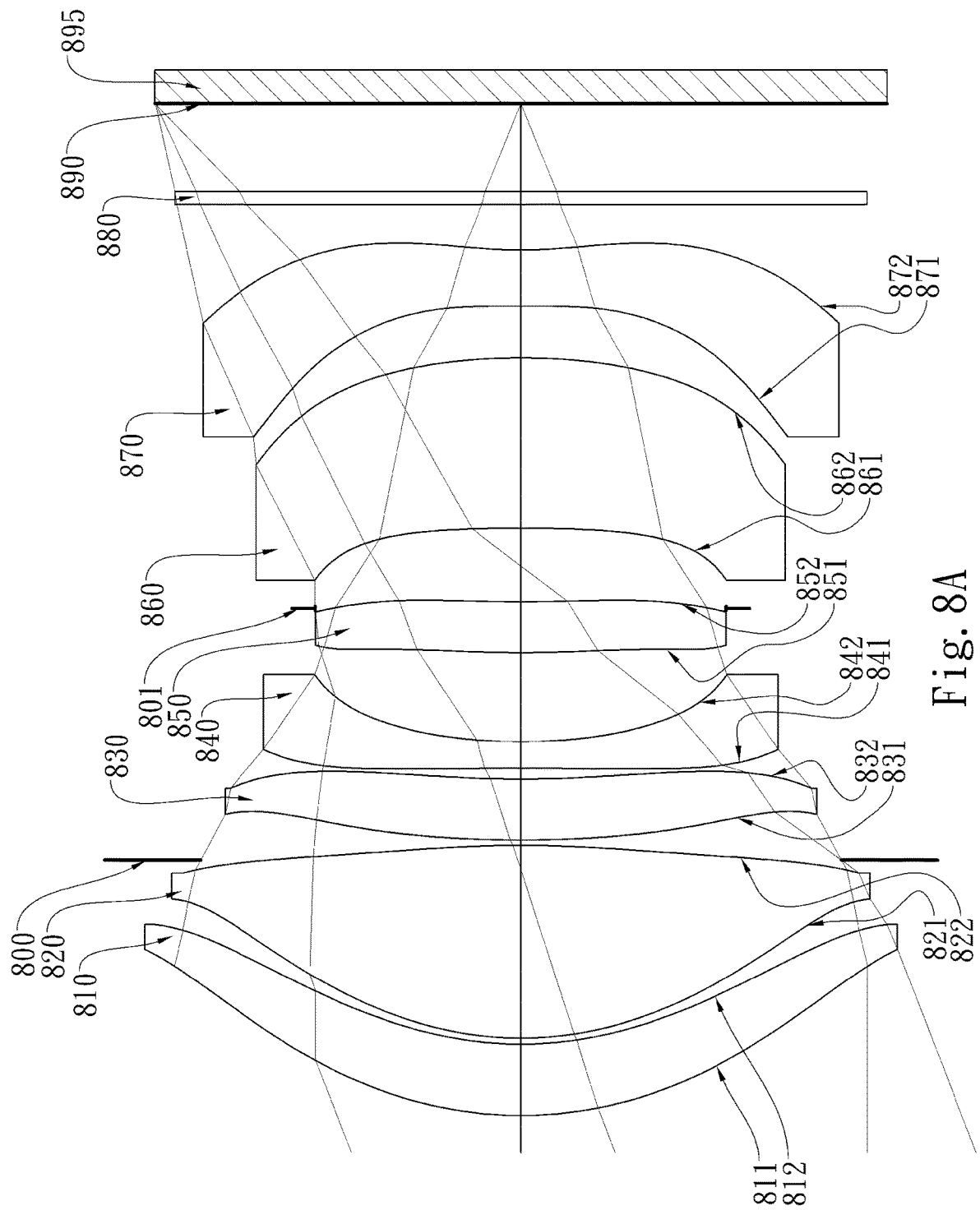
FIG. 8A is a schematic view of an imaging apparatus according to the 8th embodiment of the present disclosure.
Figure 8B:
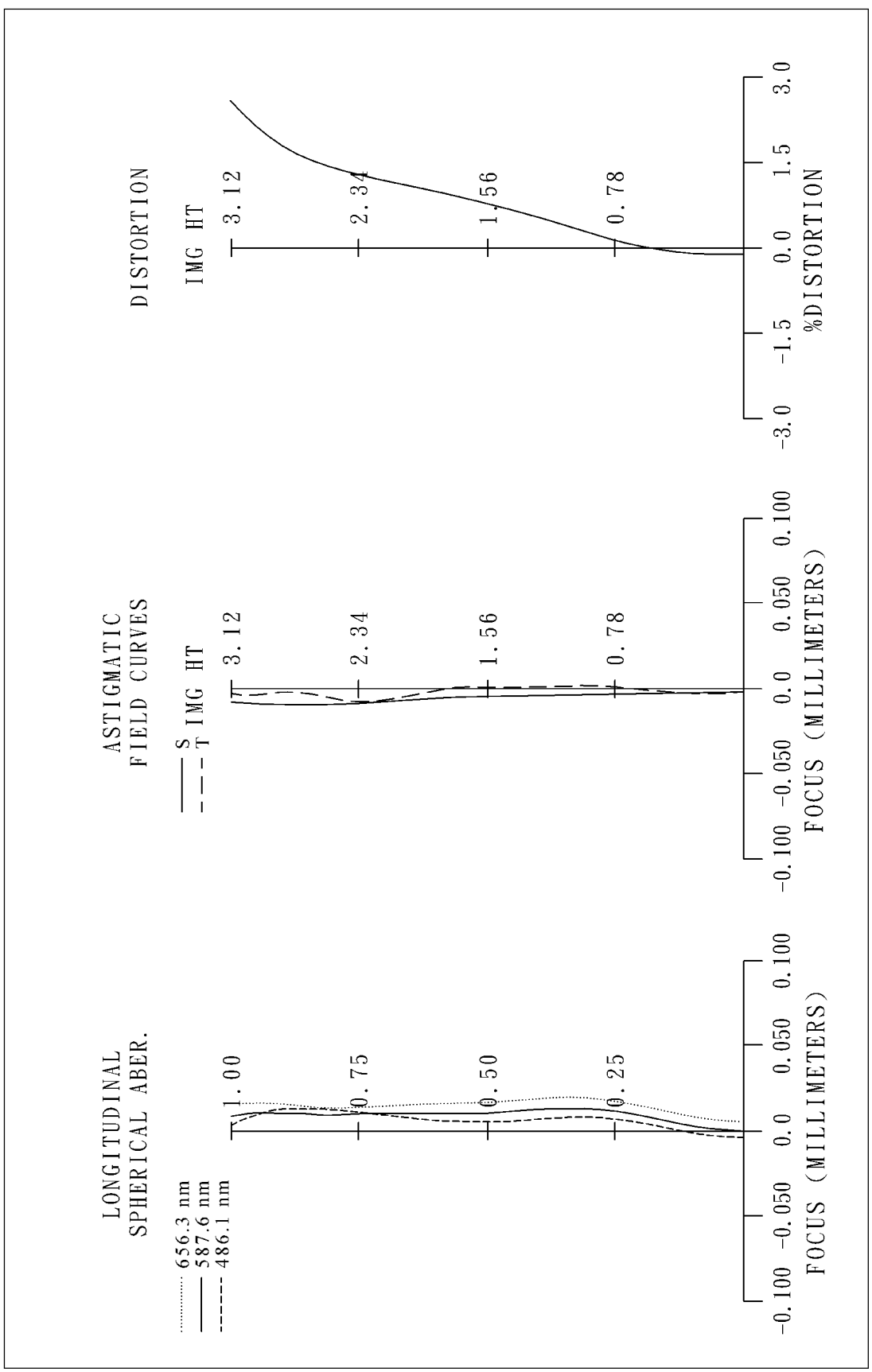
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes a photographing optical lens system (not otherwise herein labeled) of the present disclosure and an image sensor 895. The photographing optical lens system includes, in order from an object side to an image side, a first lens element 810, a second lens element 820, an aperture stop 800, a third lens element 830, a fourth lens element 840, a fifth lens element 850, a stop 801, a sixth lens element 860, and a seventh lens element 870. No other lens elements are inserted between the first lens element 810 and the seventh lens element 870.

The first lens element 810 with positive refractive power has an object-side surface 811 being convex in a paraxial region thereof, and an image-side surface 812 being concave in a paraxial region thereof. Both the object-side surface 811 and the image-side surface 812 are aspheric, and there are at least one inflection point on both the object-side surface 811 and the image-side surface 812 thereof. The first lens element 810 is made of plastic material.

The second lens element 820 with positive refractive power has an object-side surface 821 being convex in a paraxial region thereof, and an image-side surface 822 being convex in a paraxial region thereof. Both the object-side surface 821 and the image-side surface 822 are aspheric, and there are at least one inflection point on both the object-side surface 821 and the image-side surface 822 thereof. The second lens element 820 is made of plastic material.

The third lens element 830 with negative refractive power has an object-side surface 831 being convex in a paraxial region thereof, and an image-side surface 832 being concave in a paraxial region thereof. Both the object-side surface 831 and the image-side surface 832 are aspheric, and there are at least one inflection point on both the object-side surface 831 and the image-side surface 832 thereof. The third lens element 830 is made of plastic material.

The fourth lens element 840 with negative refractive power has an object-side surface 841 being concave in a paraxial region thereof, and an image-side surface 842 being concave in a paraxial region thereof. Both the object-side surface 841 and the image-side surface 842 are aspheric, and there is at least one inflection point on the object-side surface 841 thereof. The fourth lens element 840 is made of plastic material.

The fifth lens element 850 with positive refractive power has an object-side surface 851 being convex in a paraxial region thereof, and an image-side surface 852 being concave in a paraxial region thereof. Both the object-side surface 851 and the image-side surface 852 are aspheric, and there are at least one inflection point on both the object-side surface 851 and the image-side surface 852 thereof. The fifth lens element 850 is made of plastic material.

The sixth lens element 860 with positive refractive power has an object-side surface 861 being concave in a paraxial region thereof, and an image-side surface 862 being convex in a paraxial region thereof. Both the object-side surface 861 and the image-side surface 862 are aspheric. The sixth lens element 860 is made of plastic material.

The seventh lens element 870 with negative refractive power has an object-side surface 871 being concave in a paraxial region thereof, an image-side surface 872 being concave in a paraxial region thereof, and at least one convex surface in an off-axis region of the image-side surface 872 thereof. Both the object-side surface 871 and the image-side surface 872 are aspheric, and there is one inflection point on the image-side surface 872. The seventh lens element 870 is made of plastic material.

The photographing optical lens system further includes a filter 880 disposed between the seventh lens element 870 and an image surface 890. The filter 880 is made of glass material and does not affect the focal length of the photographing optical lens system. The image sensor 895 is disposed on or near the image surface 890 of the photographing optical lens system.

The fifth lens element 850 has the smallest effective radius among the seven lens elements. Also, at least two lens elements of the seven lens elements have Abbe numbers between 10.0 and 20.0. (An Abbe number V4 of the fourth lens element 840 is 18.7, and an Abbe number V6 of the sixth lens element 860 is 18.7.)

The detailed optical data of the 8th embodiment are shown in TABLE 15, and the aspheric surface data are shown in TABLE 16.

TABLE 15

(8th Embodiment)
f = 7.82 mm, Fno = 1.32, HFOV = 21.2 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 3.358 | ASP | 0.610 | Plastic | 1.582 | 30.2 | 342.59 |
| 2 | | 3.187 | ASP | 0.050 | | | | |
| 3 | Lens 2 | 2.902 | ASP | 1.650 | Plastic | 1.545 | 56.0 | 4.24 |
| 4 | | −9.022 | ASP | −0.125 | | | | |
| 5 | Ape. Stop | Planar | | 0.170 | | | | |
| 6 | Lens 3 | 9.918 | ASP | 0.521 | Plastic | 1.530 | 55.8 | −134.86 |
| 7 | | 8.552 | ASP | 0.091 | | | | |
| 8 | Lens 4 | −59.264 | ASP | 0.230 | Plastic | 1.688 | 18.7 | −6.15 |

TABLE 15-continued (8th Embodiment)
f = 7.82 mm, Fno = 1.32, HFOV = 21.2 deg.

| Surface # | | Curvature Radius | | Thickness | Material | Index | Abbe # | Focal Length |
|---|---|---|---|---|---|---|---|---|
| 9 | | 4.565 | ASP | 0.761 | | | | |
| 10 | Lens 5 | 9.824 | ASP | 0.434 | Plastic | 1.544 | 56.0 | 58.39 |
| 11 | | 14.000 | ASP | −0.056 | | | | |
| 12 | Stop | Planar | | 0.684 | | | | |
| 13 | Lens 6 | −15.767 | ASP | 1.458 | Plastic | 1.688 | 18.7 | 11.88 |
| 14 | | −5.585 | ASP | 0.442 | | | | |
| 15 | Lens 7 | −77.856 | ASP | 0.484 | Plastic | 1.544 | 56.0 | −6.42 |
| 16 | | 3.666 | ASP | 0.386 | | | | |
| 17 | Filter | Planar | | 0.110 | Glass | 1.517 | 64.2 | — |
| 18 | | Planar | | 0.753 | | | | |
| 19 | Image Surface | Planar | | — | | | | |

* Reference wavelength is d-line 587.6 nm.
Remark: The effective radius of the stop, Surface 12, is 1.754 mm.

TABLE 16

Aspheric Coefficient

| Surface # | 1 | 2 | 3 | 4 | 6 |
|---|---|---|---|---|---|
| k= | −3.2907E−01 | −6.9178E−01 | −4.6233E−01 | −9.0000E+01 | −3.4924E+00 |
| A4= | −6.1904E−04 | −3.2407E−03 | −3.3633E−03 | 2.1518E−03 | 2.6024E−03 |
| A6= | −4.5733E−05 | −2.9429E−04 | −5.4016E−05 | 3.5550E−04 | 1.9680E−04 |
| A8= | −3.1350E−05 | −6.3799E−06 | −1.1079E−04 | −2.8272E−04 | 1.8336E−04 |
| A10= | | | 3.7408E−05 | 5.1919E−05 | −1.5257E−04 |
| A12= | | | −6.0087E−06 | −4.5789E−06 | 2.3599E−05 |
| A14= | | | 2.8039E−07 | 1.5804E−07 | −1.2324E−06 |

| Surface # | 7 | 8 | 9 | 10 | 11 |
|---|---|---|---|---|---|
| k= | −4.7761E+01 | −6.1782E+01 | −3.0482E+01 | 2.6279E+00 | −8.9970E+01 |
| A4= | −1.2284E−02 | 2.3955E−03 | 4.2160E−02 | −2.6754E−02 | −2.0554E−02 |
| A6= | 3.9227E−03 | 4.7323E−04 | −1.7294E−02 | 2.3947E−03 | −3.3048E−03 |
| A8= | −1.0920E−03 | 4.3981E−04 | 9.5079E−03 | −4.3072E−04 | 2.3078E−03 |
| A10= | 1.3459E−04 | −8.2183E−05 | −2.4704E−03 | 1.0215E−03 | −4.2608E−04 |
| A12= | −7.1433E−06 | 6.0206E−06 | 3.4984E−04 | −2.8784E−04 | 8.1187E−05 |
| A14= | 4.2922E−08 | −8.2470E−08 | | 3.3985E−05 | −1.4754E−05 |

| Surface # | 13 | 14 | 15 | 16 |
|---|---|---|---|---|
| k= | 9.9364E+00 | −2.2109E+00 | −9.1238E+00 | −2.8585E+01 |
| A4= | −1.3570E−02 | −1.4899E−02 | −1.1679E−01 | −5.3266E−02 |
| A6= | −6.0419E−03 | 4.1779E−03 | 5.5664E−02 | 1.6594E−02 |
| A8= | 1.7489E−03 | −3.0348E−03 | −2.4235E−02 | −4.6158E−03 |
| A10= | −1.3345E−03 | 9.2048E−04 | 7.5394E−03 | 8.9557E−04 |
| A12= | 4.8548E−04 | −1.5572E−04 | −1.5354E−03 | −1.1383E−04 |
| A14= | −8.9398E−05 | 1.1163E−05 | 1.7708E−04 | 8.4561E−06 |
| A16= | | −5.1625E−08 | −8.5018E−06 | −2.7356E−07 |

In the 8th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 7.82 | ImgH/f | 0.40 |
| Fno. | 1.32 | SD/TD | 0.70 |
| HFOV [deg.] | 21.2 | TL*Fno/f | 1.46 |
| V4 | 18.7 | TL/ImgH | 2.77 |
| V6 | 18.7 | Y11/ImgH | 1.03 |
| Vmin | 18.7 | EPD/Ymax | 1.84 |
| Nmax | 1.688 | SAG72/CT7 | −1.30 |
| CTmax/CT2 | 1.00 | tan(HFOV) | 0.39 |
| (CTmin/f)*100 | 2.94 | f12/f345 | −0.67 |
| (T45 + T56)/(T12 + T23 + T34) | 7.47 | Vp | 30.2/56.0/56.0/18.7 |
| (R3 + R4)/(R3 − R4) | −0.51 | f/EPD | 1.32 |
| \|f2/f1\| | 0.01 | Yp61/f | — |
| \|f/fi\|min | 0.02 | Yp62/f | — |
| (\|f/f1\| + \|f/f3\| + \|f/f4\| + \|f/f5\| + \|f/f6\| + \|f/f7\|)/\|f/f2\| | 1.82 | Yp71/f | — |
| TL/f | 1.11 | Yp72/f | 0.066 |
| BL/TD | 0.17 | | |

9th Embodiment

Figure 9A:
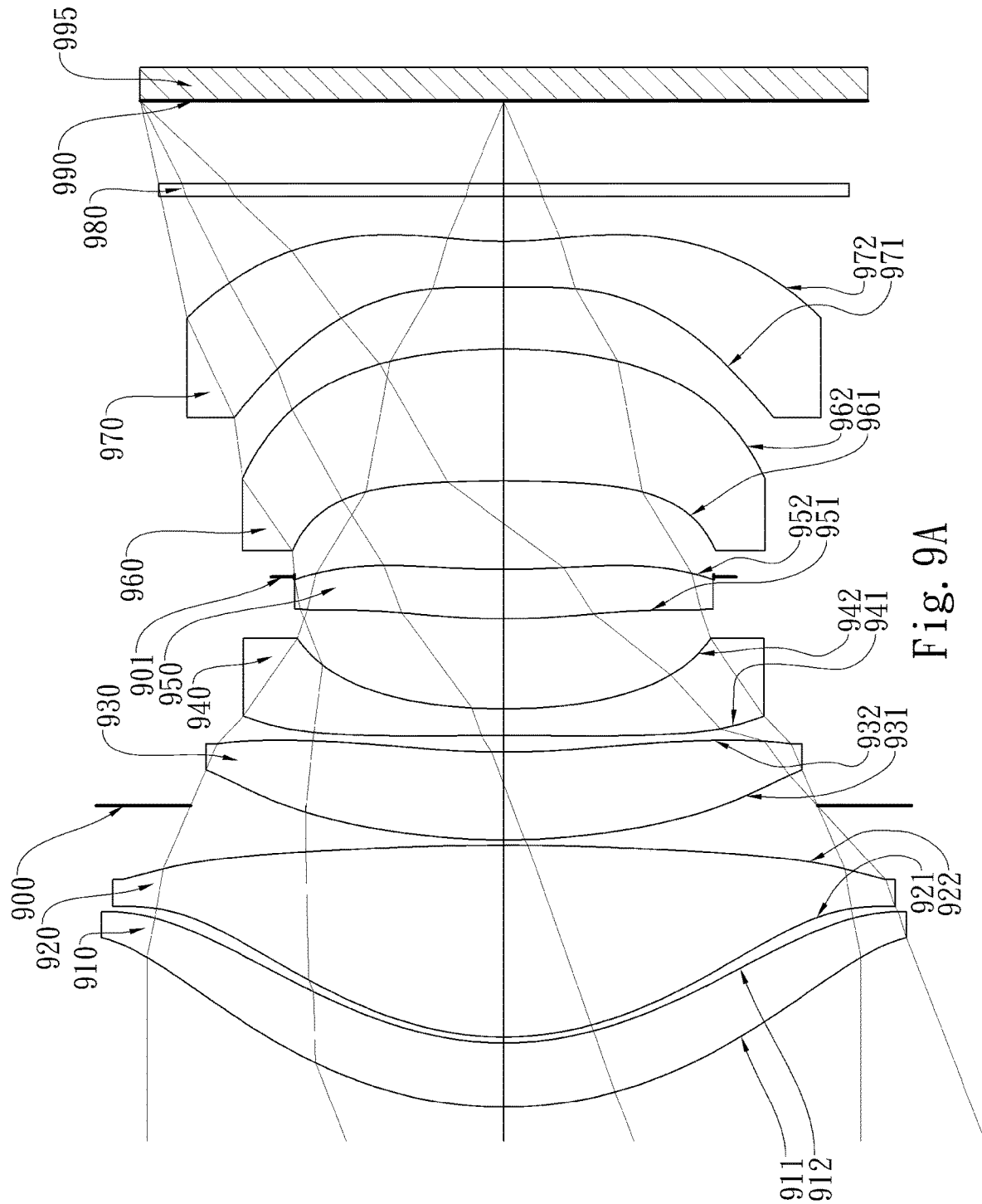
FIG. 9A is a schematic view of an imaging apparatus according to the 9th embodiment of the present disclosure.
Figure 9B:
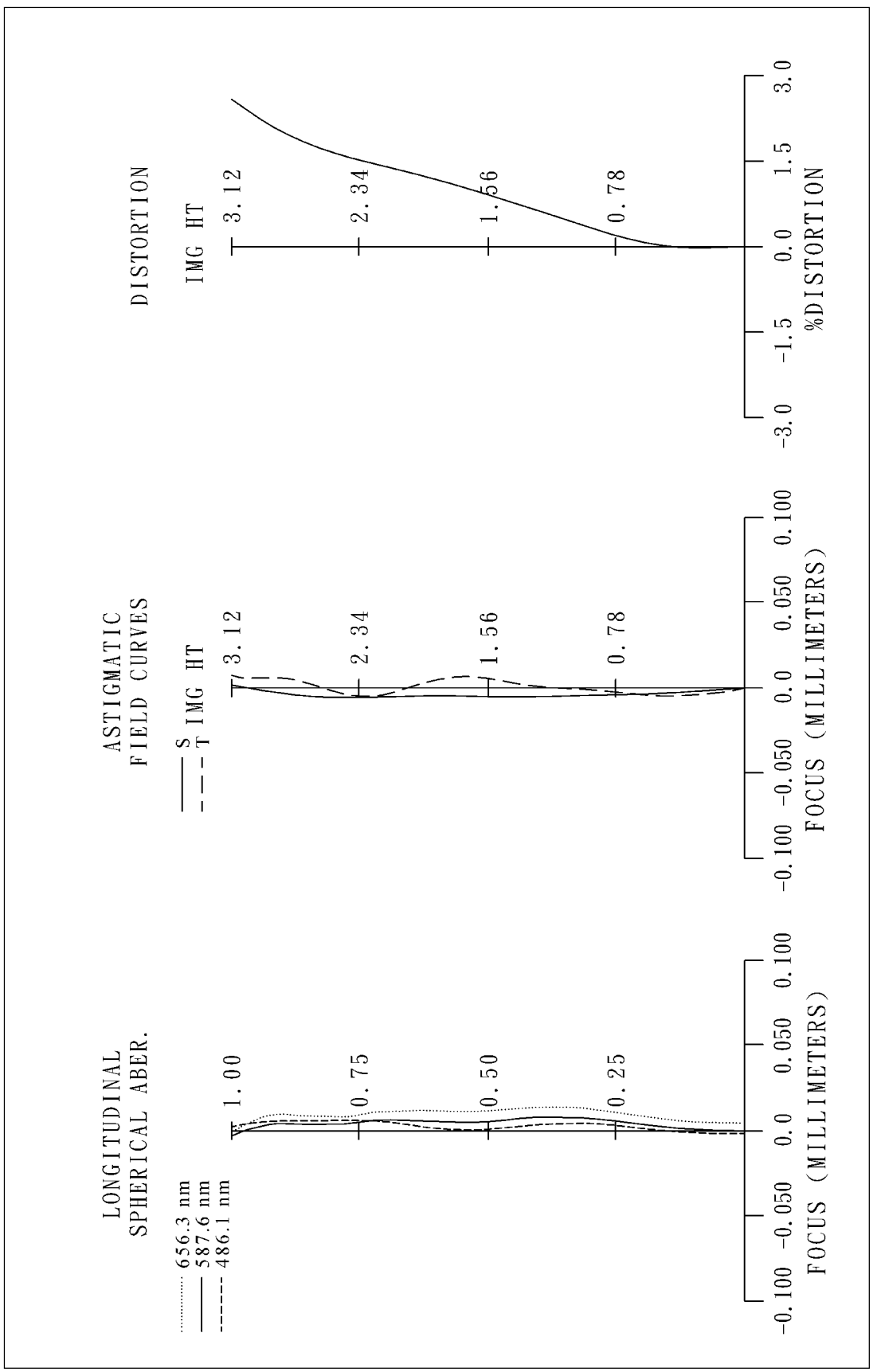
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes a photographing optical lens system (not otherwise herein labeled) of the present disclosure and an image sensor 995. The photographing optical lens system includes, in order from an object side to an image side, a first lens element 910, a second lens element 920, an aperture stop 900, a third lens element 930, a fourth lens element 940, a fifth lens element 950, a stop 901, a sixth lens element 960, and a seventh lens element 970. No other lens elements are inserted between the first lens element 910 and the seventh lens element 970.

The first lens element 910 with negative refractive power has an object-side surface 911 being convex in a paraxial region thereof, and an image-side surface 912 being concave in a paraxial region thereof. Both the object-side surface 911 and the image-side surface 912 are aspheric, and there are at least one inflection point on both the object-side surface 911 and the image-side surface 912 thereof. The first lens element 910 is made of plastic material.

The second lens element 920 with positive refractive power has an object-side surface 921 being convex in a paraxial region thereof, and an image-side surface 922 being convex in a paraxial region thereof. Both the object-side surface 921 and the image-side surface 922 are aspheric, and there are at least one inflection point on both the object-side surface 921 and the image-side surface 922 thereof. The second lens element 920 is made of plastic material.

The third lens element 930 with positive refractive power has an object-side surface 931 being convex in a paraxial region thereof, and an image-side surface 932 being concave in a paraxial region thereof. Both the object-side surface 931 and the image-side surface 932 are aspheric, and there are at least one inflection point on both the object-side surface 931 and the image-side surface 932 thereof. The third lens element 930 is made of plastic material.

The fourth lens element 940 with negative refractive power has an object-side surface 941 being concave in a paraxial region thereof, and an image-side surface 942 being concave in a paraxial region thereof. Both the object-side surface 941 and the image-side surface 942 are aspheric, and there is at least one inflection point on the object-side surface 941 thereof. The fourth lens element 940 is made of plastic material.

The fifth lens element 950 with positive refractive power has an object-side surface 951 being convex in a paraxial region thereof, and an image-side surface 952 being concave in a paraxial region thereof. Both the object-side surface 951 and the image-side surface 952 are aspheric, and there are at least one inflection point on both the object-side surface 951 and the image-side surface 952 thereof. The fifth lens element 950 is made of plastic material.

The sixth lens element 960 with positive refractive power has an object-side surface 961 being concave in a paraxial region thereof, and an image-side surface 962 being convex in a paraxial region thereof. Both the object-side surface 961 and the image-side surface 962 are aspheric. The sixth lens element 960 is made of plastic material.

The seventh lens element 970 with negative refractive power has an object-side surface 971 being convex in a paraxial region thereof, an image-side surface 972 being concave in a paraxial region thereof, and at least one convex surface in an off-axis region of the image-side surface 972 thereof. Both the object-side surface 971 and the image-side surface 972 are aspheric, and there are one inflection point on the object-side surface 971 thereof, and one inflection point on the image-side surface 972 thereof. The seventh lens element 970 is made of plastic material.

The photographing optical lens system further includes a filter 980 disposed between the sixth lens element 970 and an image surface 990. The filter 980 is made of glass material and does not affect the focal length of the photographing optical lens system. The image sensor 995 is disposed on or near the image surface 990 of the photographing optical lens system.

The fifth lens element 950 has the smallest effective radius among the seven lens elements. Also, at least two lens elements of the seven lens elements have Abbe numbers between 10.0 and 20.0. (An Abbe number V4 of the fourth lens element 940 is 18.7, and an Abbe number V6 of the sixth lens element 960 is 18.7.)

The detailed optical data of the 9th embodiment are shown in TABLE 17, and the aspheric surface data are shown in TABLE 18.

TABLE 18

(9th Embodiment)
f = 7.83 mm, Fno = 1.28, HFOV = 21.2 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 3.436 | ASP | 0.555 | Plastic | 1.582 | 30.2 | −41.22 |
| 2 | | 2.827 | ASP | 0.050 | | | | |
| 3 | Lens 2 | 2.722 | ASP | 1.650 | Plastic | 1.545 | 56.0 | 4.52 |
| 4 | | −20.263 | ASP | 0.340 | | | | |
| 5 | Ape. Stop | Planar | | −0.295 | | | | |
| 6 | Lens 3 | 5.984 | ASP | 0.752 | Plastic | 1.530 | 55.8 | 82.23 |
| 7 | | 6.634 | ASP | 0.142 | | | | |
| 8 | Lens 4 | −43.549 | ASP | 0.230 | Plastic | 1.688 | 18.7 | −6.67 |
| 9 | | 5.142 | ASP | 0.776 | | | | |
| 10 | Lens 5 | 5.405 | ASP | 0.425 | Plastic | 1.544 | 56.0 | 32.15 |
| 11 | | 7.606 | ASP | −0.064 | | | | |
| 12 | Stop | Planar | | 0.822 | | | | |
| 13 | Lens 6 | −15.238 | ASP | 1.137 | Plastic | 1.688 | 18.7 | 11.09 |
| 14 | | −5.237 | ASP | 0.532 | | | | |
| 15 | Lens 7 | 75.183 | ASP | 0.391 | Plastic | 1.544 | 56.0 | −6.30 |
| 16 | | 3.270 | ASP | 0.386 | | | | |
| 17 | Filter | Planar | | 0.110 | Glass | 1.517 | 64.2 | — |
| 18 | | Planar | | 0.714 | | | | |
| 19 | Image Surface | Planar | | — | | | | |

* Reference wavelength is d-line 587.6 nm.
Remark: The effective radius of the stop, Surface 12, is 1.797 mm.

TABLE 18

Aspheric Coefficient

| Surface # | 1 | 2 | 3 | 4 | 6 |
|---|---|---|---|---|---|
| k= | -3.9885E-01 | -8.8585E-01 | -5.7455E-01 | -8.1709E+01 | -5.2800E-01 |
| A4= | -1.3235E-03 | -4.4416E-03 | -4.4029E-03 | 1.1057E-03 | -4.8380E-03 |
| A6= | 3.0683E-05 | -3.8759E-04 | -7.1225E-04 | 7.7790E-05 | 1.7424E-03 |
| A8= | -2.6662E-05 | 1.0132E-05 | 6.1627E-05 | -1.1308E-04 | -1.8926E-04 |
| A10= |  |  | -1.2986E-05 | 1.9071E-05 | 5.4396E-05 |
| A12= |  |  | 8.3026E-07 | -1.6128E-06 | -1.0727E-05 |
| A14= |  |  | -1.0163E-08 | 5.5998E-08 | 5.7868E-07 |

| Surface # | 7 | 8 | 9 | 10 | 11 |
|---|---|---|---|---|---|
| k= | -2.7467E+01 | -6.1782E+01 | -3.0482E+01 | 2.9276E-01 | -9.0000E+01 |
| A4= | -7.7862E-03 | 1.4265E-02 | 4.8688E-02 | -3.2519E-02 | -6.5602E-03 |
| A6= | -1.7445E-03 | -4.8017E-03 | -1.5925E-02 | 1.0406E-03 | -1.7707E-02 |
| A8= | 1.1045E-03 | 1.1975E-03 | 7.5039E-03 | -6.5255E-04 | 9.2212E-03 |
| A10= | -2.1394E-04 | -8.4249E-05 | -1.9534E-03 | 7.7798E-04 | -2.9559E-03 |
| A12= | 1.7930E-05 | -1.6187E-06 | 3.0082E-04 | -1.3541E-04 | 6.5201E-04 |
| A14= | -5.6829E-07 | 1.1742E-07 |  | 1.0638E-05 | -6.9157E-05 |

| Surface # | 13 | 14 | 15 | 16 |
|---|---|---|---|---|
| k= | 4.1229E+01 | -2.2109E+00 | -9.1238E+00 | -2.8585E+01 |
| A4= | -1.3052E-02 | -1.8099E-02 | -1.5197E-01 | -6.8487E-02 |
| A6= | -9.3175E-03 | 3.1341E-03 | 8.1502E-02 | 2.5511E-02 |
| A8= | 5.4878E-03 | -2.5699E-03 | -3.7349E-02 | -7.6881E-03 |
| A10= | -3.8490E-03 | 7.3191E-04 | 1.2322E-02 | 1.6431E-03 |
| A12= | 1.3344E-03 | -9.3592E-05 | -2.6086E-03 | -2.3214E-04 |
| A14= | -2.0145E-04 | -8.1061E-07 | 3.0824E-04 | 1.8950E-05 |
| A16= |  | 6.6624E-07 | -1.5190E-05 | -6.6383E-07 |

In the 9th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 9th embodiment, so an explanation in this regard will not be provided again.

Moreover, these parameters can be calculated from TABLE 17 and TABLE 18 and satisfy the conditions stated in table below.

9th Embodiment

| | | | |
|---|---|---|---|
| f [mm] | 7.83 | ImgH/f | 0.40 |
| Fno. | 1.28 | SD/TD | 0.65 |
| HFOV [deg.] | 21.2 | TL*Fno/f | 1.41 |
| V4 | 18.7 | TL/ImgH | 2.77 |
| V6 | 18.7 | Y11/ImgH | 1.11 |
| Vmin | 18.7 | EPD/Ymax | 1.78 |
| Nmax | 1.688 | SAG72/CT7 | -1.68 |
| CTmax/CT2 | 1.00 | tan(HFOV) | 0.39 |
| (CTmin/f)*100 | 2.94 | f12/f345 | -0.54 |

-continued

9th Embodiment

| | | | |
|---|---|---|---|
| (T45 + T56)/(T12 + T23 + T34) | 6.47 | Vp | 56.0/ 55.8/56.0/ 18.7 |
| (R3 + R4)/(R3 − R4) | -0.76 | f/EPD | 1.28 |
| \|f2/f1\| | 0.11 | Yp61/f | — |
| \|f/fi\|min | 0.10 | Yp62/f | — |
| (\|f/f1\| + \|f/f3\| + \|f/f4\| + \|f/f5\| + \|f/f6\| + \|f/f7\|)/\|f/f2\| | 2.11 | Yp71/f | 0.01 |
| TL/f | 1.11 | Yp72/f | 0.061 |
| BL/TD | 0.16 |  |  |

10th Embodiment

Figure 10A:
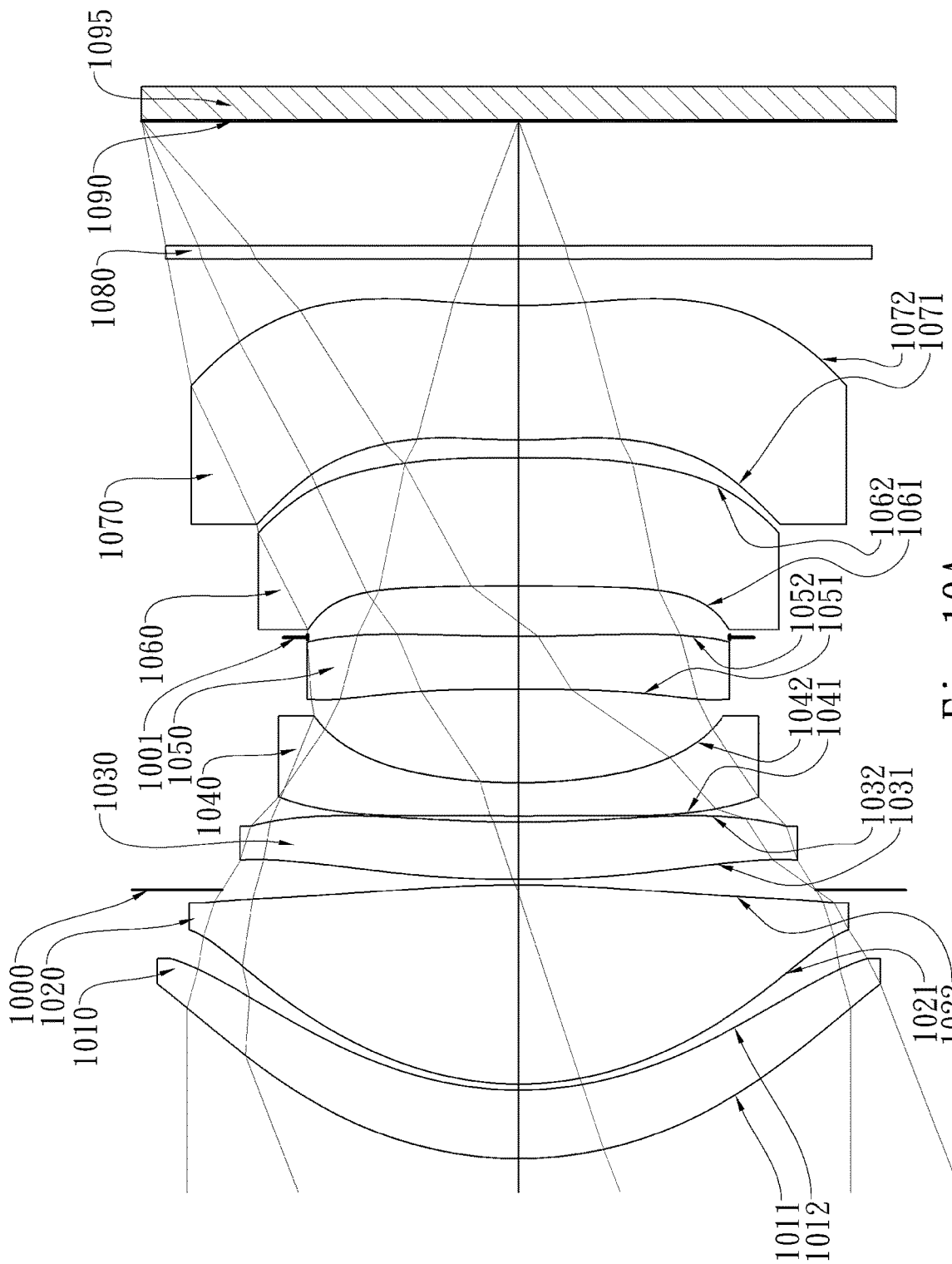
FIG. 10A is a schematic view of an imaging apparatus according to the 10th embodiment of the present disclosure.
Figure 10B:
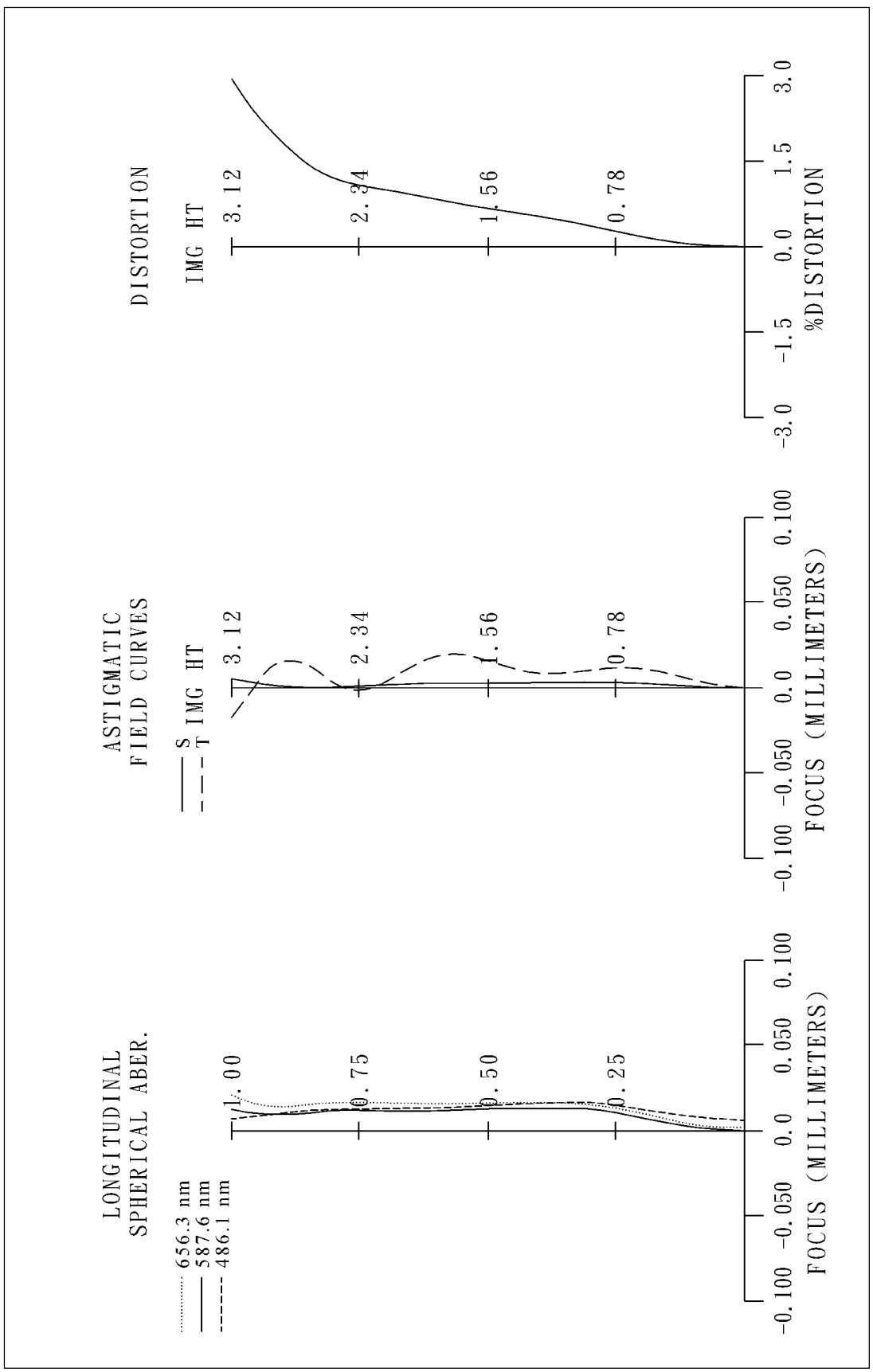
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes a photographing optical lens system (not otherwise herein labeled) of the present disclosure and an image sensor 1095. The photographing optical lens system includes, in order from an object side to an image side, a first lens element 1010, a second lens element 1020, an aperture stop 1000, a third lens element 1030, a fourth lens element 1040, a fifth lens element 1050, a stop 1001, a sixth lens element 1060, and a seventh lens element 1070. No other lens elements are inserted between the first lens element 1010 and the seventh lens element 1070.

The first lens element 1010 with positive refractive power has an object-side surface 1011 being convex in a paraxial region thereof, and an image-side surface 1012 being concave in a paraxial region thereof. Both the object-side surface 1011 and the image-side surface 1012 are aspheric, and there are at least one inflection point on both the object-side surface 1011 and the image-side surface 1012. The first lens element 1010 is made of plastic material.

The second lens element 1020 with positive refractive power has an object-side surface 1021 being convex in a paraxial region thereof, and an image-side surface 1022 being convex in a paraxial region thereof. Both the object-side surface 1021 and the image-side surface 1022 are aspheric, and there are at least one inflection point on both the object-side surface 1021 and the image-side surface 1022. The second lens element 1020 is made of plastic material.

The third lens element 1030 with negative refractive power has an object-side surface 1031 being convex in a paraxial region thereof, and an image-side surface 1032 being concave in a paraxial region thereof. Both the object-side surface 1031 and the image-side surface 1032 are aspheric, and there are at least one inflection point on both the object-side surface 1031 and the image-side surface 1032 thereof. The third lens element 1030 is made of plastic material.

The fourth lens element 1040 with negative refractive power has an object-side surface 1041 being convex in a paraxial region thereof, and an image-side surface 1042 being concave in a paraxial region thereof. Both the object-side surface 1041 and the image-side surface 1042 are aspheric, and there are at least one inflection point on the object-side surface 1041. The fourth lens element 1040 is made of plastic material.

The fifth lens element 1050 with negative refractive power has an object-side surface 1051 being concave in a paraxial region thereof, and an image-side surface 1052 being concave in a paraxial region thereof. Both the object-side surface 1051 and the image-side surface 1052 are aspheric, and there are at least one inflection point on the object-side surface 1051 and the image-side surface 1052 thereof. The fifth lens element 1050 is made of plastic material.

The fifth lens element 1050 has the smallest effective radius among the seven lens elements. Also, at least two lens elements of the seven lens elements have Abbe numbers between 10.0 and 20.0. (An Abbe number V4 of the fourth lens element 1040 is 18.7, and an Abbe number V6 of the sixth lens element 1060 is 18.7.)

The detailed optical data of the 10th embodiment are shown in TABLE 19, and the aspheric surface data are shown in TABLE 20.

TABLE 19

(10th Embodiment)
f = 7.85 mm, Fno = 1.43, HFOV = 21.1 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 3.176 | ASP | 0.571 | Plastic | 1.545 | 56.0 | 1702.59 |
| 2 | | 2.985 | ASP | 0.050 | | | | |
| 3 | Lens 2 | 2.704 | ASP | 1.650 | Plastic | 1.545 | 56.0 | 3.99 |
| 4 | | −8.695 | ASP | −0.045 | | | | |
| 5 | Ape. Stop | Planar | | 0.090 | | | | |
| 6 | Lens 3 | 11.062 | ASP | 0.475 | Plastic | 1.545 | 56.0 | −305.27 |
| 7 | | 10.215 | ASP | 0.050 | | | | |
| 8 | Lens 4 | 155.791 | ASP | 0.275 | Plastic | 1.688 | 18.7 | −6.35 |
| 9 | | 4.247 | ASP | 0.771 | | | | |
| 10 | Lens 5 | −107.726 | ASP | 0.443 | Plastic | 1.544 | 56.0 | −19.54 |
| 11 | | 11.810 | ASP | −0.007 | | | | |
| 12 | Stop | Planar | | 0.424 | | | | |
| 13 | Lens 6 | −77.355 | ASP | 1.058 | Plastic | 1.688 | 18.7 | −41.99 |
| 14 | | 46.359 | ASP | 0.148 | | | | |
| 15 | Lens 7 | 4.430 | ASP | 1.115 | Plastic | 1.544 | 56.0 | 65.79 |
| 16 | | 4.608 | ASP | 0.386 | | | | |
| 17 | Filter | Planar | | 0.110 | Glass | 1.517 | 64.2 | — |
| 18 | | Planar | | 1.035 | | | | |
| 19 | Image Surface | Planar | | — | | | | |

* Reference wavelength is d-line 587.6 nm.
Remark: The effective radius of the stop, Surface 12, is 1.746 mm.

The sixth lens element 1060 with negative refractive power has an object-side surface 1061 being concave in a paraxial region thereof, and an image-side surface 1062 being concave in a paraxial region thereof. Both the object-side surface 1061 and the image-side surface 1062 are aspheric, and there is one inflection point on the image-side surface 1062 thereof. The sixth lens element 1060 is made of plastic material.

The seventh lens element 1070 with positive refractive power has an object-side surface 1071 being convex in a paraxial region thereof, an image-side surface 1072 being concave in a paraxial region thereof, and at least one convex surface in an off-axis region of the image-side surface 1072. Both the object-side surface 1071 and the image-side surface 1072 are aspheric, and there are one inflection point on the object-side surface 1071 thereof, and one inflection point on the image-side surface 1072 thereof. The seventh lens element 1070 is made of plastic material.

The photographing optical lens system further includes a filter 1080 disposed between the sixth lens element 1070 and an image surface 1090. The filter 1080 is made of glass material and does not affect the focal length of the photographing optical lens system. The image sensor 1095 is disposed on or near the image surface 1090 of the photographing optical lens system.

TABLE 20

Aspheric Coefficient

| Surface # | 1 | 2 | 3 | 4 | 6 |
|---|---|---|---|---|---|
| k= | −3.3226E−01 | −5.9668E−01 | −4.6632E−01 | −9.0000E+01 | −3.4924E+00 |
| A4= | 1.9372E−04 | −2.5319E−03 | −3.3684E−03 | 2.4599E−03 | 1.3414E−02 |
| A6= | −8.8246E−05 | −3.0999E−04 | 1.2275E−04 | −4.8045E−04 | −7.9712E−03 |
| A8= | −3.4938E−05 | −2.4311E−05 | −7.9469E−05 | 1.7554E−04 | 1.5109E−03 |
| A10= | | | 2.4589E−05 | −4.4841E−05 | −8.1549E−05 |
| A12= | | | −3.7152E−06 | 5.4970E−06 | −9.7661E−06 |
| A14= | | | 6.6104E−08 | −2.7753E−07 | 8.6628E−07 |

| Surface # | 7 | 8 | 9 | 10 | 11 |
|---|---|---|---|---|---|
| k= | −6.7512E+01 | −6.1782E+01 | −3.0482E+01 | 2.6279E+00 | −9.0000E+01 |
| A4= | 3.2776E−03 | −1.5531E−02 | 2.5341E−02 | −4.0883E−02 | −3.2044E−02 |
| A6= | −1.0495E−02 | 2.3233E−02 | 6.2465E−03 | 2.0790E−02 | 2.2821E−02 |

TABLE 20-continued

| Aspheric Coefficient | | | | | |
|---|---|---|---|---|---|
| A8= | 4.2829E-03 | -1.0245E-02 | 6.8389E-04 | -7.0719E-03 | -1.4278E-02 |
| A10= | -8.9991E-04 | 2.5080E-03 | -1.5172E-03 | 1.7592E-03 | 5.1287E-03 |
| A12= | 9.4965E-05 | -3.2233E-04 | 4.4311E-04 | -1.7685E-04 | -9.9200E-04 |
| A14= | -4.1075E-06 | 1.7514E-05 | | 7.5608E-06 | 7.7387E-05 |

| Surface # | 13 | 14 | 15 | 16 |
|---|---|---|---|---|
| k= | 9.0000E+01 | -2.2109E+00 | -9.1238E+00 | -2.8585E+01 |
| A4= | -1.5264E-02 | -1.2834E-01 | -2.0040E-01 | -3.6622E-02 |
| A6= | 6.8541E-03 | 1.1149E-01 | 1.3795E-01 | 6.1516E-03 |
| A8= | -5.3775E-03 | -6.4582E-02 | -7.2470E-02 | -7.5168E-04 |
| A10= | -1.6204E-05 | 2.4259E-02 | 2.6967E-02 | -3.4212E-05 |
| A12= | 3.7689E-04 | -5.8756E-03 | -6.6860E-03 | 2.0834E-05 |
| A14= | -9.4275E-05 | 8.0529E-04 | 9.4413E-04 | -2.1101E-06 |
| A16= | | -4.6247E-05 | -5.5574E-05 | 6.8816E-08 |

In the 10th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 7.85 | ImgH/f | 0.40 |
| Fno. | 1.43 | SD/TD | 0.69 |
| HFOV [deg.] | 21.1 | TL*Fno/f | 1.57 |
| V4 | 18.7 | TL/ImgH | 2.76 |
| V6 | 18.7 | Y11/ImgH | 0.96 |
| Vmin | 18.7 | EPD/Ymax | 1.84 |
| Nmax | 1.688 | SAG72/CT7 | -0.59 |
| CTmax/CT2 | 1.00 | tan(HFOV) | 0.38 |
| (CTmin/f)*100 | 3.50 | f12/f345 | -0.92 |
| (T45 + T56)/(T12 + T23 + T34) | 8.19 | Vp | 56.0/56.0/56.0 |
| (R3 + R4)/(R3 - R4) | -0.53 | f/EPD | 1.43 |
| \|f2/f1\| | 0.00 | Yp61/f | — |
| \|f/fi\|min | 0.00 | Yp62/f | 0.02 |
| (\|f/f1\| + \|f/f3\| + \|f/f4\| + \|f/f5\| + \|f/f6\| + \|f/f7\|)/\|f/f2\| | 1.00 | Yp71/f | 0.04 |
| TL/f | 1.10 | Yp72/f | 0.073 |
| BL/TD | 0.22 | | |

11th Embodiment

Figure 12:
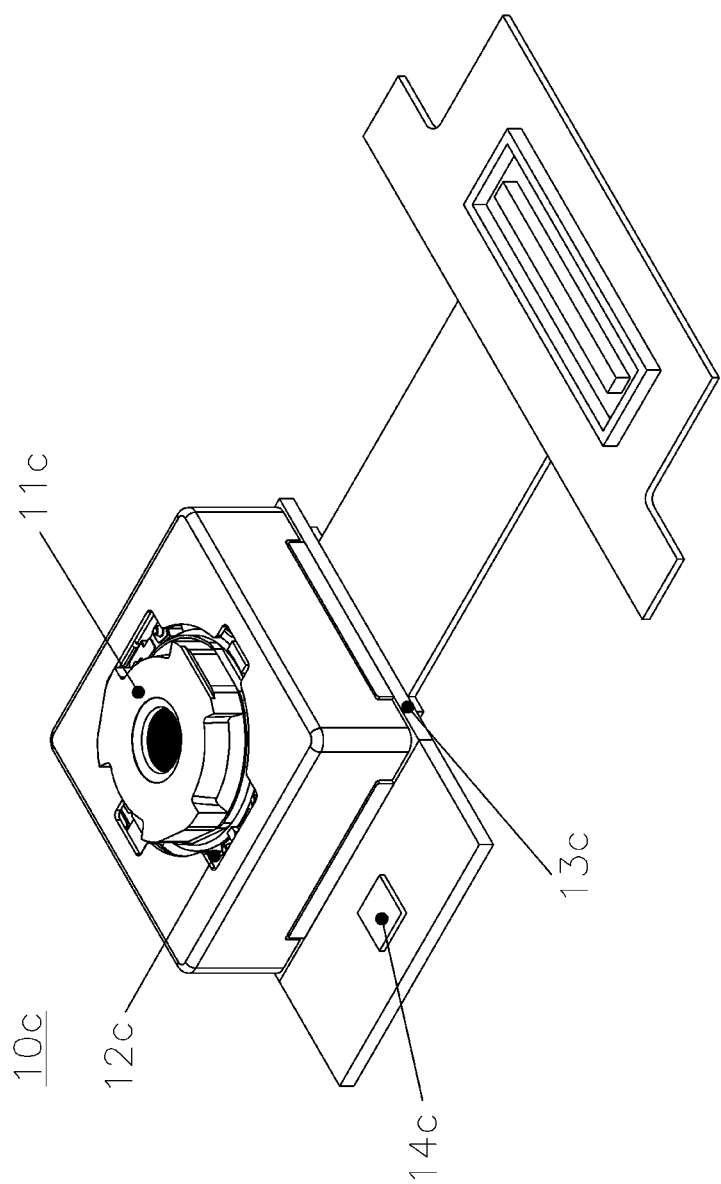
FIG. 12 is a 3-dimensional schematic view of an imaging apparatus according to the 11th embodiment of the present disclosure.

FIG. 12 is a 3-dimensional schematic view of an imaging apparatus 10c according to the 11th embodiment of the present disclosure. In the present embodiment, the imaging apparatus 10c is a camera module. The imaging apparatus 10c includes a lens unit 11c, a driving device 12c, and an image sensor 13c. The lens unit 11c includes the photographing optical lens system of the 1st embodiment described above and a lens barrel (not otherwise herein labeled) for carrying the photographing optical lens system. The imaging apparatus 10c retrieves light and generates an image by using the lens unit 11c, using the driving device 12c to adjust the focus to photograph on the image sensor 13c and outputs the image data thereafter.

The driving device 12c may be an auto-focus model that can be driven by a voice coil motor (VCM), a micro electro-mechanical system (MEMS), a piezoelectric system, shape memory metal or other driving systems. The driving device 12c allows the lens unit 11c to obtain a better imaging position, providing a clear image wherever an imaged object 30 (Please refer to FIG. 13B) being positioned with different object distances.

The imaging apparatus 10c may be configured to equip the image sensor 13c (e.g., CMOS, CCD) with high sensitivity and low noise on the image surface of the photographing optical lens system to truly provide the satisfactory image quality obtained from the photographing optical lens system.

In addition, the imaging apparatus 10c may further include an image stabilizer 14c, which may be a dynamic sensing element such as accelerometer, a gyro sensor or a Hall Effect sensor. The image stabilizer 14c in the 11th embodiment is a gyro sensor but not limited. By adjusting the photographing optical lens system in different axial directions to provide a compensation for image blurs due to motion during exposures, the image quality under dynamic and low-light circumstances can be further improved and enhanced image compensation functions such as optical image stabilization (OIS) or electronic image stabilization (EIS) can also be provided.

12th Embodiment

Figure 13A:
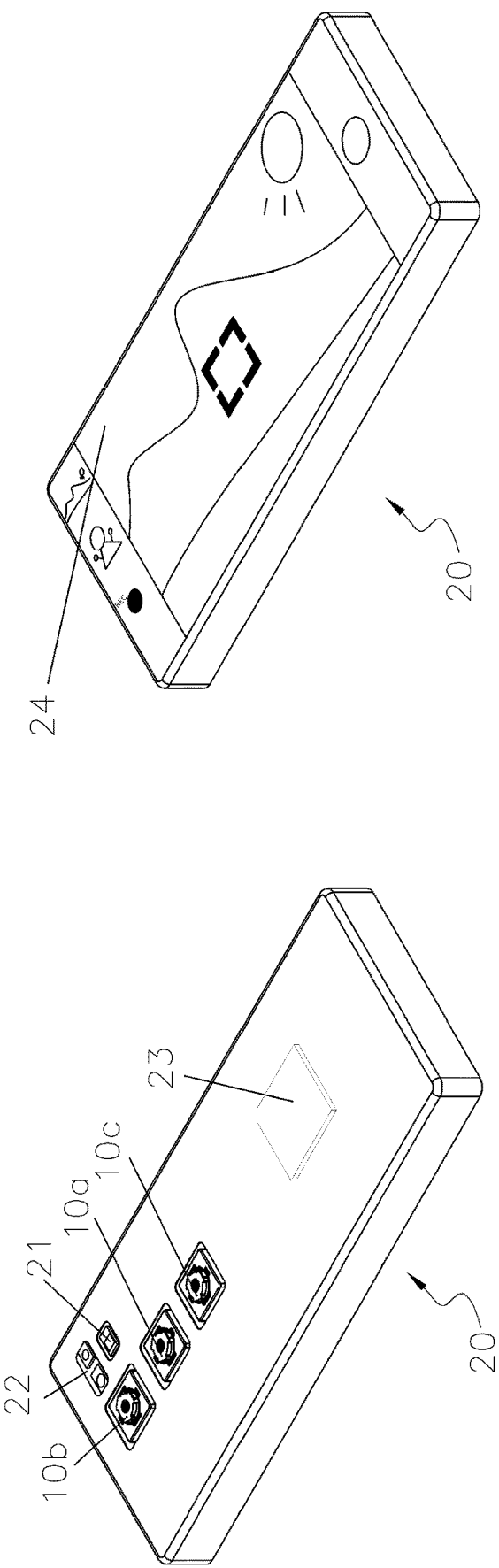
FIG. 13A is a 3-dimensional schematic view of an electronic device according to the 12th embodiment of the present disclosure.
Figure 13B:
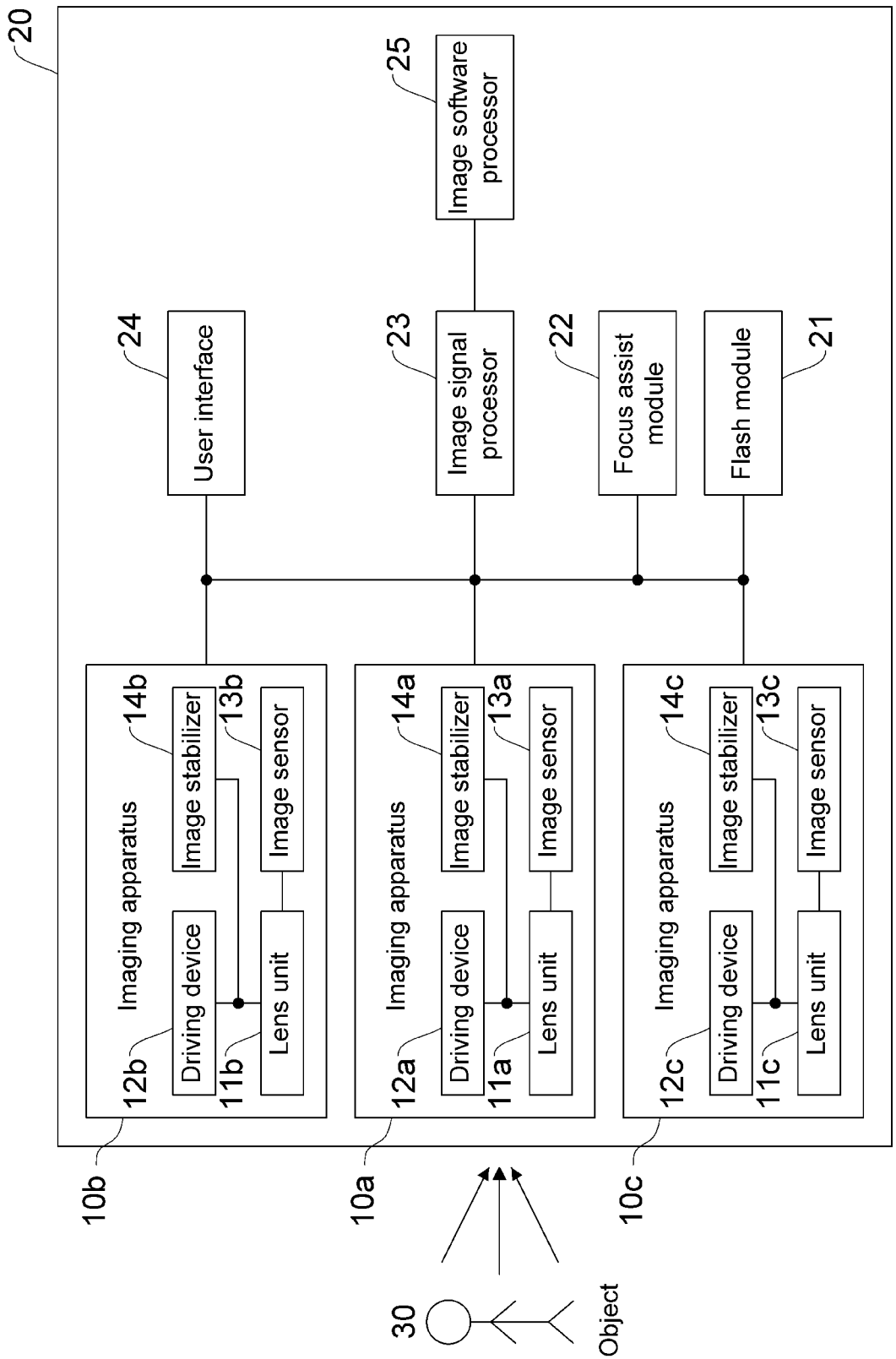
FIG. 13B is a schematic view of the electronic device according to the 12th embodiment of the present disclosure.

Please refer to FIG. 13A and FIG. 13B. FIG. 13A is a 3-dimensional schematic view of an electronic device 20 according to the 12th embodiment of the present disclosure. FIG. 13B is a schematic view of the electronic device 20 shown in the FIG. 13A. In the present embodiment, the electronic device 20 is a smart phone. The electronic device 20 includes the imaging apparatus 10a, an imaging apparatus 10b, an imaging apparatus 10c of the 11th embodiment, a flash module 21, a focus assist module 22, an image signal processor 23, a user interface 24, and an image software processor 25 (Please refer to FIG. 13B). In the present embodiment, the electronic device 20 includes has the three imaging apparatuses 10a, 10b, 10c facing toward same direction. The imaging apparatus 10a is a primary lens unit, the imaging apparatus 10b is a wide angle of view lens unit, the imaging apparatus 10c is a telephoto lens unit but not limited. For example, the three imaging apparatuses can be the imaging apparatus 10a, the imaging apparatus 10a, and the imaging apparatus 10b or other combinations. Besides, the electronic device 20 may include only one imaging apparatus 10a or may include two or more imaging apparatuses.

When a user utilizes the user interface 24 to capture images of the object 30 (Please refer to FIG. 13B), the electronic device 20 retrieves the light and captures an image via at least one of the imaging apparatuses 10a, imaging apparatus 10b, and imaging apparatus 10c, triggering the flash module 21 to compensate insufficient light level, and focuses instantly according to the distance information of the object 30 provided by the focus assist module 22. The images are further optimized by the image signal processor 23 to further enhance the image quality generated by the photographing optical lens system. The focus assist module 22 may adopt an infrared ray or laser focus assist system to achieve quick focusing. The user interface 24 may use a touch screen or a physical shooting button cooperated with various functions of the image software processor 25 to perform image capturing and image processing.

The imaging apparatus 10c of the present disclosure is not limited to be applied to the smart phone. The imaging apparatus 10c may be used in a system of moving focus and features in both excellent aberration correction and satisfactory image quality. For example, the imaging apparatus 10c may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices. The aforementioned electronic apparatus is merely exemplary of practical use of the present disclosure and does not limit the scope of application of the imaging apparatus of the present disclosure.

13th Embodiment

Figure 14A:
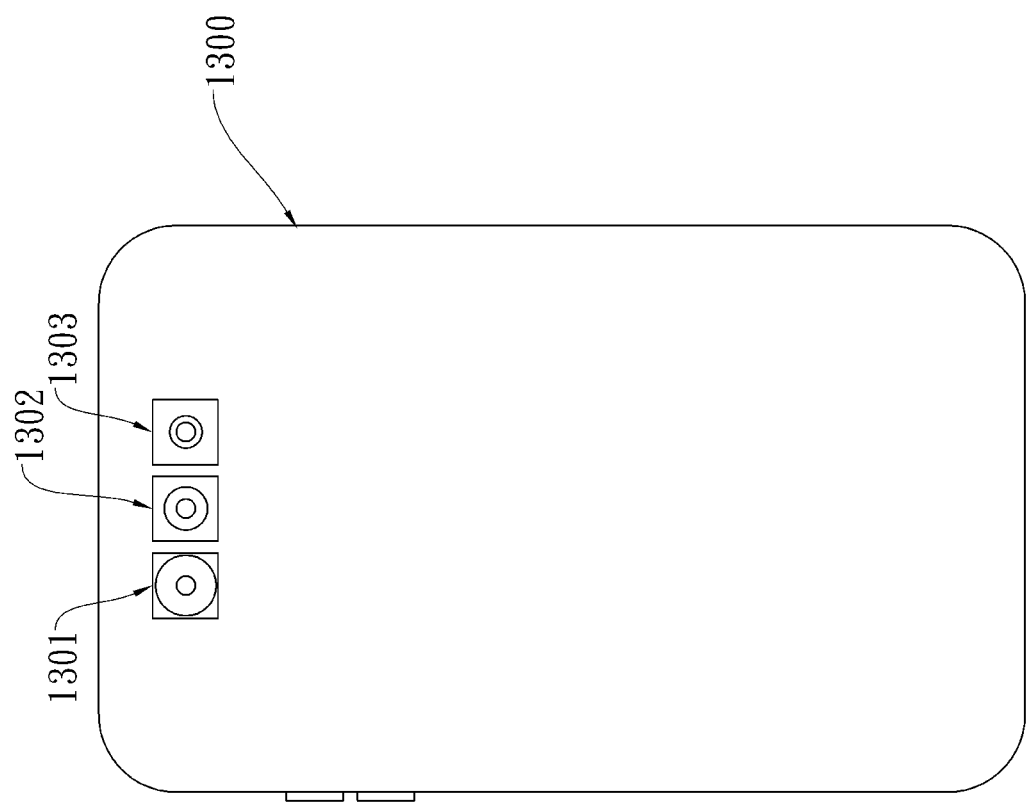
FIG. 14A is a rear view of an electronic device according to the 13th embodiment of the present disclosure.
Figure 14B:
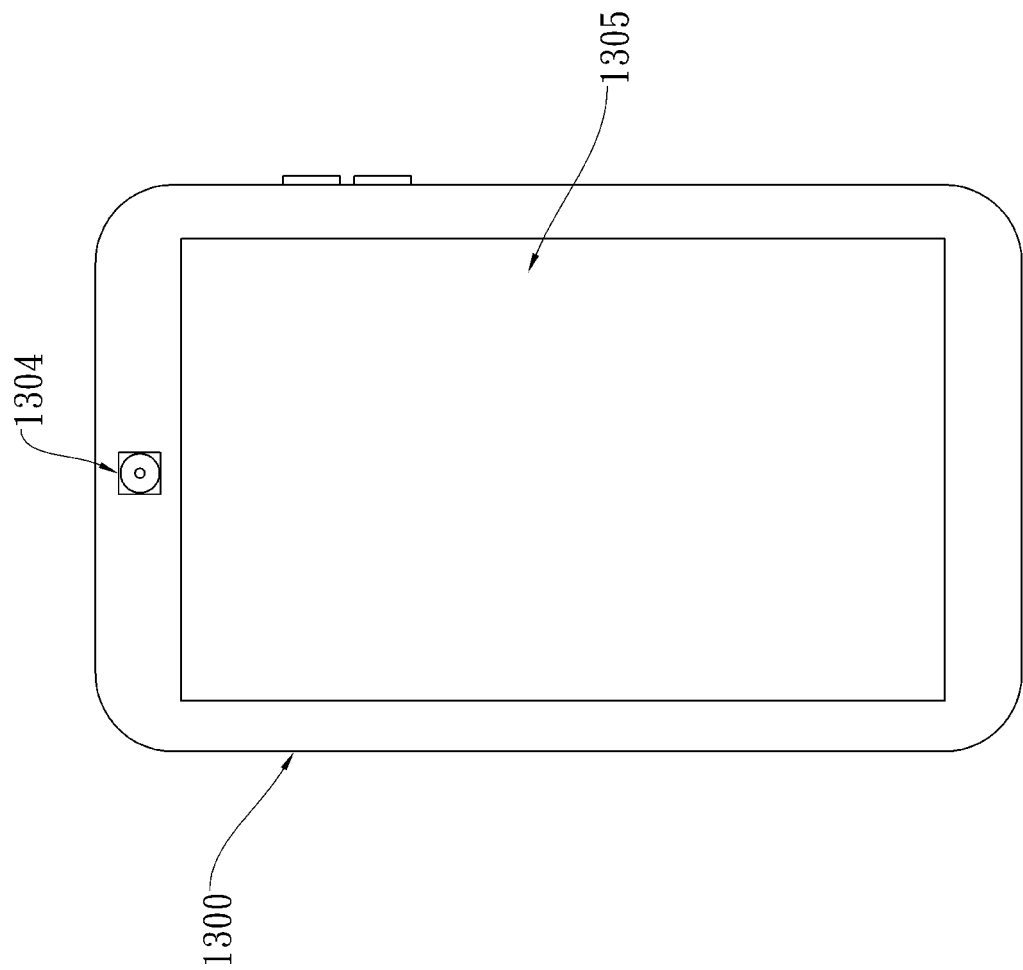
FIG. 14B is a front view of the electronic device according to the 13th embodiment of the present disclosure.

Please refer to FIG. 14A and FIG. 14B. FIG. 14A is a rear view of an electronic device 1300. FIG. 14B is a front view of the electronic device 1300 shown in the FIG. 14A. In the present embodiment, the electronic device 1300 is a smart phone. The electronic device 1300 includes an imaging apparatus 1301, an imaging apparatus 1302, an imaging apparatus 1303, an imaging apparatus 1304, and a display device 1305. As shown in FIG. 14a, the imaging apparatus 1301, the imaging apparatus 1302, and the imaging apparatus 1303 face toward the same direction and are horizontally disposed on an upper edge of the back surface of the electronic device 1300. The imaging apparatus 1301 is a wide angle of view lens unit, the imaging apparatus 1303 is a telephoto lens unit, and the angle of view of the imaging apparatus 1302 is set in between the imaging apparatus 1301 and the imaging apparatus 1303. As shown in FIG. 14b, the imaging apparatus 1304, which is the imaging apparatus according to the embodiment 1 of the present disclosure, is located above the display device 1305 of the electronic device 1300.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. A photographing optical lens system comprising seven lens elements, the seven lens elements being, in order from an object side to an image side: a first lens element, a second lens element, a third lens element, a fourth lens element, a fifth lens element, a sixth lens element, and a seventh lens element;

wherein at least one of the seven lens element has positive refractive power, each of the seven lens elements has an object-side surface facing toward the object side and an image-side surface facing toward the image side, each of at least two of the seven lens elements has at least one of the object-side surface and the image-side surface thereof being aspheric, an Abbe number of a lens element among the seven lens elements is V, at least one of the seven lens elements satisfies the following condition:

10.0<$V$<20.0;

wherein half of a maximal field of view of the photographing optical lens system is HFOV, a minimum among Abbe numbers of the seven lens elements is Vmin, a maximum among refractive indices of the seven lens elements is Nmax, and the following conditions are satisfied:

0.14<tan(HFOV)≤0.39;

10.0<$V$min<21.0; and 1.58<$N$max<1.72.

2. The photographing optical lens system of claim 1, wherein the first lens element has positive refractive power, the object-side surface of the first lens element is convex in a paraxial region thereof, the image-side surface of the first lens element is concave in a paraxial region thereof, and the object-side surface of the second lens element is convex in a paraxial region thereof.

3. The photographing optical lens system of claim 1, wherein the second lens element has positive refractive power.

4. The photographing optical lens system of claim 1, wherein the third lens element has negative refractive power, an Abbe number of a lens element with positive refractive power among the seven lens elements is Vp, at least one of the seven lens elements satisfies the following condition:

$V$p<25.0;

wherein an axial distance between the object-side surface of the first lens element and an image surface is TL, an f-number of the photographing optical lens system is Fno, a focal length of the photographing optical lens system is f, and the following condition is satisfied:

0.10<$TL*Fno/f$<3.0.

5. The photographing optical lens system of claim 1, wherein the sixth lens element has positive refractive power, the seventh lens element has negative refractive power, a maximum image height of the photographing optical lens system is ImgH, a focal length of the photographing optical lens system is f, and the following condition is satisfied:

0.10<Img$H/f$≤0.40.

6. The photographing optical lens system of claim 1, further comprising an aperture stop, a focal length of the first lens element is f1, a focal length of the second lens element is f2, an axial distance between the aperture stop and the image-side surface of the seventh lens element is SD, an axial distance between the object-side surface of the first lens element and the image-side surface of the seventh lens element is TD, and the following conditions are satisfied:

|$f2/f1$|<1.20; and 0.60<$SD/TD$<0.90.

7. The photographing optical lens system of claim 1, further comprising an aperture stop on the object side of the third lens element, wherein a curvature radius of the object-side surface of the second lens element is R3, a curvature radius of the image-side surface of the second lens element is R4, and the following condition is satisfied:

−1.50<(R3+R4)/(R3−R4)<0.0.

8. The photographing optical lens system of claim 1, wherein there is an air gap between each of adjacent lens elements of the seven lens elements, a minimum among central thicknesses of the seven lens elements is CTmin, a focal length of the photographing optical lens system is f, and the following condition is satisfied:

1.0<(CTmin/f)*100<3.70.

9. The photographing optical lens system of claim 1, wherein at least one lens surface of the seven lens elements has at least one inflection point thereon, a focal length of the photographing optical lens system is f, an entrance pupil diameter of the photographing optical lens system is EPD, and the following condition is satisfied:

1.0<f/EPD<1.90.

10. The photographing optical lens system of claim 1, wherein a focal length of the photographing optical lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a minimum among |f/f1|, |f/f2|, |f/f3|, |f/f4|, |f/f5|, |f/f6| and |f/f7| is |f/fi|min, and the following condition is satisfied:

|f/fi|min<0.10, i=1,2,3,4,5,6,7.

11. The photographing optical lens system of claim 1, wherein an entrance pupil diameter of the photographing optical lens system is EPD, a maximum among maximum effective radii on the object-side surfaces and the image-side surfaces of the seven lens elements is Ymax, and the following condition is satisfied:

1.40<EPD/Ymax<2.50.

12. The photographing optical lens system of claim 1, wherein a maximum effective radius on the object-side surface of the first lens element is Y11, a maximum image height of the photographing optical lens system is ImgH, and the following condition is satisfied:

0.88≤Y11/ImgH<1.50.

13. The photographing optical lens system of claim 1, wherein a distance in parallel with an optical axis from an axial vertex of the image-side surface of the seventh lens element to a maximum effective radius position thereof is SAG72, a central thickness of the seventh lens element is CT7, and the following condition is satisfied:

−3.50<SAG72/CT7<−0.20.

14. The photographing optical lens system of claim 1, wherein at least one lens surface of the sixth lens element and the seventh lens element has at least one inflection point thereon, a vertical distance between the at least one inflection point and an optical axis is Yp, a focal length of the photographing optical lens system is f, and the following condition is satisfied:

0.01<Yp/f<1.0.

15. The photographing optical lens system of claim 1, wherein at least one of the object-side surface and the image-side surface of the sixth lens element is aspheric, at least one of the object-side surface and the image-side surface of the seventh lens element is aspheric, at least two of the seven lens elements are plastic, an Abbe number of a lens element of the seven lens elements is V, and at least two lens elements of the seven lens elements satisfy the following condition:

10.0<V<20.0.

16. The photographing optical lens system of claim 1, further comprising a first lens group and a second lens group, wherein the first lens group comprises the first lens element and the second lens element, the second lens group comprises the third lens element, the fourth lens element and the fifth lens element, and there is a gap between the first lens group and the second lens group; a composite focal length of the first lens element and the second lens element is f12, a composite focal length of the third lens element, the fourth lens element, and the fifth lens element is f345, and the following condition is satisfied:

−1.0<f12/f345<0.

17. A photographing optical lens system comprising seven lens elements, the seven lens elements being, in order from an object side to an image side: a first lens element, a second lens element, a third lens element, a fourth lens element, a fifth lens element, a sixth lens element, and a seventh lens element;
wherein at least one of the seven lens element has positive refractive power, each of the seven lens elements has an object-side surface facing toward the object side and an image-side surface facing toward the image side, at least two lens elements among the seven lens element are plastic, half of a maximal field of view of the photographing optical lens system is HFOV, a minimum among Abbe numbers of the seven lens elements is Vmin, an axial distance between the object-side surface of the first lens element and an image surface is TL, a focal length of the photographing optical lens system is f, and the following conditions are satisfied:

0.14<tan(HFOV)≤0.39;

10.0≤Vmin≤19.5; and 0.30<TL/f<1.25.

18. The photographing optical lens system of claim 17, wherein the third lens element has negative refractive power and the image-side surface of the third lens element is concave in a paraxial region thereof.

19. The photographing optical lens system of claim 17, wherein the fourth lens element has negative refractive power, the object-side surface of the fourth lens element is convex in a paraxial region thereof and the image-side surface of the fourth lens element is concave in a paraxial region thereof.

20. The photographing optical lens system of claim 17, wherein the object-side surface of the second lens element is convex in a paraxial region thereof, the image-side surface of the seventh lens element is concave in a paraxial region thereof and has at least one convex shape in an off-axis region thereof.

21. The photographing optical lens system of claim 17, wherein the image-side surface of the seventh lens element is convex in a paraxial region thereof.

22. The photographing optical lens system of claim 17, wherein there is an air gap between each of adjacent lens elements of the seven lens elements, an Abbe number of the fourth lens element is V4, an Abbe number of the sixth lens element is V6, and the following conditions are satisfied:

$8.0<V4<30.0$; and $8.0<V6<30.0$.

23. The photographing optical lens system of claim 17, wherein a curvature radius of the object-side surface of the second lens element is R3, a curvature radius of the image-side surface of the second lens element is R4, and the following condition is satisfied:

$-2.0<(R3+R4)/(R3-R4)<0.30$.

24. The photographing optical lens system of claim 17, wherein a maximum among central thicknesses of the seven lens elements is CTmax, a central thickness of the second lens element is CT2, and the following condition is satisfied:

$1.0 \leq CTmax/CT2<1.20$.

25. The photographing optical lens system of claim 17, wherein an Abbe number of a lens element of the seven lens elements is V, and at least two lens elements of the seven lens elements satisfy the following condition:

$10.0<V<20.0$.

26. The photographing optical lens system of claim 17, wherein at least one lens surface of the seven lens element has at least one inflection point thereon, the axial distance between the object-side surface of the first lens element and the image surface is TL, the focal length of the photographing optical lens system is f, and the following condition is satisfied:

$0.50<TL/f<1.15$.

27. The photographing optical lens system of claim 17, wherein the axial distance between the object-side surface of the first lens element and the image surface is TL, the focal length of the photographing optical lens system is f, and the following condition is satisfied:

$0.50<TL/f \leq 0.99$.

28. The photographing optical lens system of claim 17, wherein a maximum effective radius on the object-side surface of the first lens element is Y11, a maximum image height of the photographing optical lens system is ImgH, and the following condition is satisfied:

$0.65<Y11/ImgH<1.50$.

29. The photographing optical lens system of claim 17, wherein an axial distance between the image-side surface of the seventh lens element and the image surface is BL, an axial distance between the object-side surface of the first lens element and the image-side surface of the seventh lens element is TD, and the following condition is satisfied:

$0.03<BL/TD<0.70$.

30. The photographing optical lens system of claim 17, wherein one of the fourth lens element and the fifth lens element has a minimum among effective radii of the seven lens elements.

31. An imaging apparatus, comprising the photographing optical lens system of claim 17 and an image sensor disposed on the image surface of the photographing optical lens system.

32. An electronic device, comprising at least two imaging apparatuses facing a same direction, the at least two imaging apparatuses comprising a first imaging apparatus and a second imaging apparatus;
wherein the first imaging apparatus comprises:
the photographing optical lens system and the image sensor of claim 31;
the second imaging apparatus comprises:
an optical lens system and an image sensor disposed on an image surface of the optical lens system;
wherein the first imaging apparatus has an angle of view between 25 to 60 degrees, the second imaging apparatus has an angle of view between 60 to 150 degrees.

* * * * *